United States Patent
Snow

(10) Patent No.: US 11,676,132 B2
(45) Date of Patent: *Jun. 13, 2023

(54) SMART CONTRACTS IN BLOCKCHAIN ENVIRONMENTS

(71) Applicant: Inveniam Capital Partners, Inc., New York, NY (US)

(72) Inventor: Paul Snow, Austin, TX (US)

(73) Assignee: Inveniam Capital Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/323,036

(22) Filed: May 18, 2021

(65) Prior Publication Data

US 2021/0272103 A1    Sep. 2, 2021

Related U.S. Application Data

(63) Continuation of application No. 16/191,595, filed on Nov. 15, 2018, now Pat. No. 11,042,871.
(Continued)

(51) Int. Cl.
*H04L 9/00* (2022.01)
*G06Q 20/36* (2012.01)
(Continued)

(52) U.S. Cl.
CPC ......... *G06Q 20/367* (2013.01); *G06Q 20/065* (2013.01); *G06Q 20/0658* (2013.01);
(Continued)

(58) Field of Classification Search
CPC ....... H04L 9/06; H04L 9/0618; H04L 9/0637; H04L 9/0643; H04L 9/32; H04L 9/3236;
(Continued)

(56) References Cited

U.S. PATENT DOCUMENTS 4,309,569 A    6/1982    Merkel
5,499,294 A    3/1996    Friedman
(Continued)

FOREIGN PATENT DOCUMENTS

CN    107392618 A    11/2017
CN    110392052       10/2019
(Continued)

OTHER PUBLICATIONS

Why offchain storage is needed for blockchain_V4_1 Final (Year: 2018), by IBM, 13 pages.
(Continued)

*Primary Examiner* — Shaqueal D Wade-Wright
(74) *Attorney, Agent, or Firm* — Koffsky Schwalb LLC

(57) ABSTRACT

Digital or "smart" contracts execute in a blockchain environment. Any entity (whether public or private) may specify a digital contract via a blockchain. Because there may be many digital contracts offered as virtual services, the contract identifier uniquely identifies a particular decision table and/or the digital contract offered by a virtual machine, vendor or supplier. The blockchain is thus not burdened with the programming code that is required to execute the decision table and/or the digital contract. The blockchain need only include or specify the contract identifier (and perhaps one or more contractual parameters), thus greatly simplifying the blockchain and reducing its size (in bytes) and processing requirements.

17 Claims, 41 Drawing Sheets

Related U.S. Application Data

(60) Provisional application No. 62/714,909, filed on Aug. 6, 2018.

(51) Int. Cl.
| | |
|---|---|
| *G06Q 20/06* | (2012.01) |
| *H04L 9/06* | (2006.01) |
| *G06Q 20/38* | (2012.01) |
| *G06Q 20/12* | (2012.01) |
| *G06Q 20/40* | (2012.01) |
| *H04L 67/12* | (2022.01) |
| *G06F 21/53* | (2013.01) |
| *H04L 9/32* | (2006.01) |
| *G06F 21/64* | (2013.01) |
| *H04L 67/10* | (2022.01) |

(52) U.S. Cl.
CPC ......... *G06Q 20/12* (2013.01); *G06Q 20/3674* (2013.01); *G06Q 20/3829* (2013.01); *G06Q 20/401* (2013.01); *H04L 9/0637* (2013.01); *G06F 21/53* (2013.01); *G06F 21/645* (2013.01); *H04L 9/0618* (2013.01); *H04L 9/3236* (2013.01); *H04L 9/50* (2022.05); *H04L 67/10* (2013.01); *H04L 67/12* (2013.01); *H04L 2209/56* (2013.01)

(58) Field of Classification Search
CPC ... H04L 9/3239; H04L 63/08; H04L 63/0807; H04L 2209/38; H04L 2209/56
See application file for complete search history.

(56) References Cited

U.S. PATENT DOCUMENTS

| | | |
|---|---|---|
| 5,606,609 A | 2/1997 | Houser |
| 5,862,218 A | 1/1999 | Steinberg |
| 5,920,629 A | 7/1999 | Rosen |
| 5,966,446 A | 10/1999 | Davis |
| 6,363,481 B1 | 3/2002 | Hardjono |
| 7,028,263 B2 | 4/2006 | Maguire |
| 7,212,808 B2 | 5/2007 | Engstrom |
| 7,272,179 B2 | 9/2007 | Siemens et al. |
| 7,572,179 B2 | 8/2009 | Choi et al. |
| 7,729,950 B2 | 6/2010 | Mendizabal et al. |
| 7,730,113 B1 | 6/2010 | Payette |
| 8,245,038 B2 | 8/2012 | Golle et al. |
| 8,266,439 B2 | 9/2012 | Haber et al. |
| 8,359,361 B2 | 1/2013 | Thornton |
| 8,442,903 B2 | 5/2013 | Zadoorian et al. |
| 8,560,722 B2 | 10/2013 | Gates et al. |
| 8,612,477 B2 | 12/2013 | Becker |
| 8,706,616 B1 | 4/2014 | Flynn |
| 8,712,887 B2 | 4/2014 | DeGroeve et al. |
| 8,867,741 B2 | 10/2014 | McCorkindale et al. |
| 8,943,332 B2 | 1/2015 | Horne et al. |
| 8,990,322 B2 | 3/2015 | Cai |
| 9,124,423 B2 | 9/2015 | Jennas, II et al. |
| 9,378,343 B1 | 6/2016 | David |
| 9,396,006 B2 | 7/2016 | Kundu et al. |
| 9,398,018 B2 | 7/2016 | Macgregor |
| 9,407,431 B2 | 8/2016 | Bellare et al. |
| 9,411,524 B2 | 8/2016 | O'Hare et al. |
| 9,411,976 B2 | 8/2016 | Irvine |
| 9,411,982 B1 | 8/2016 | Dippenaar et al. |
| 9,424,576 B2 | 8/2016 | Vandervort |
| 9,436,923 B1 | 9/2016 | Sriram |
| 9,436,935 B2 | 9/2016 | Hudon |
| 9,472,069 B2 | 10/2016 | Roskowski |
| 9,489,827 B2 | 11/2016 | Quinn et al. |
| 9,584,493 B1 | 2/2017 | Leavy |
| 9,588,790 B1 | 3/2017 | Wagner |
| 9,647,977 B2 | 5/2017 | Levasseur |
| 9,722,790 B2 | 8/2017 | Ebrahimi |
| 9,818,109 B2 | 11/2017 | Loh |
| 9,830,580 B2 | 11/2017 | Macgregor |
| 9,875,510 B1 | 1/2018 | Kasper |
| 9,876,646 B2 | 1/2018 | Ebrahimi |
| 9,882,918 B1 | 1/2018 | Ford et al. |
| 10,025,941 B1 | 7/2018 | Griffin |
| 10,046,228 B2 | 8/2018 | Tran |
| 10,102,265 B1 | 10/2018 | Madisetti |
| 10,102,526 B1 | 10/2018 | Madisetti |
| 10,108,954 B2 | 10/2018 | Dunlevy |
| 10,135,607 B1 | 11/2018 | Roets |
| 10,163,080 B2 | 12/2018 | Chow |
| 10,270,599 B2 | 4/2019 | Nadeau |
| 10,346,815 B2 | 7/2019 | Glover |
| 10,355,869 B2 | 7/2019 | Bisti |
| 10,366,204 B2 | 7/2019 | Tanner, Jr. |
| 10,373,129 B1 | 8/2019 | James |
| 10,411,897 B2 | 9/2019 | Paolini-Subramanya |
| 10,419,225 B2 | 9/2019 | Deery |
| 10,438,285 B1 | 10/2019 | Konstantinides |
| 10,476,847 B1 | 11/2019 | Smith |
| 10,532,268 B2 | 1/2020 | Tran |
| 10,586,270 B2 | 3/2020 | Reddy |
| 10,628,268 B1 | 4/2020 | Baruch |
| 10,685,399 B2 | 6/2020 | Snow |
| 10,693,652 B2 | 6/2020 | Nadeau |
| 10,749,848 B2 | 8/2020 | Voell |
| 10,764,752 B1 | 9/2020 | Avetisov |
| 10,783,164 B2 | 9/2020 | Snow |
| 10,817,873 B2 | 10/2020 | Paolini-Subramanya |
| 10,826,685 B1 | 11/2020 | Campagna |
| 10,855,446 B2 | 12/2020 | Ow |
| 10,873,457 B1 | 12/2020 | Beaudoin |
| 10,915,895 B1 | 2/2021 | Fogg |
| 10,929,842 B1 | 2/2021 | Arvanaghi |
| 10,949,926 B1 | 3/2021 | Call |
| 10,956,973 B1 | 3/2021 | Chang |
| 10,958,418 B2 | 3/2021 | Ajoy |
| 10,997,159 B2 * | 5/2021 | Iwama ............... H04L 9/0637 |
| 11,042,871 B2 | 6/2021 | Snow |
| 11,044,095 B2 | 6/2021 | Lynde |
| 11,044,097 B2 | 6/2021 | Snow |
| 11,044,100 B2 | 6/2021 | Deery |
| 11,063,770 B1 | 7/2021 | Peng |
| 11,075,744 B2 | 7/2021 | Tormasov |
| 11,093,933 B1 | 8/2021 | Peng |
| 11,134,120 B2 | 9/2021 | Snow |
| 11,164,250 B2 | 11/2021 | Snow |
| 11,164,254 B1 | 11/2021 | Gordon, III |
| 11,170,366 B2 | 11/2021 | Snow |
| 11,205,172 B2 | 12/2021 | Snow |
| 11,276,056 B2 | 3/2022 | Snow |
| 11,295,296 B2 | 4/2022 | Snow |
| 11,296,889 B2 | 4/2022 | Snow |
| 11,328,290 B2 | 5/2022 | Snow |
| 11,334,874 B2 | 5/2022 | Snow |
| 11,347,769 B2 | 5/2022 | Snow |
| 11,348,097 B2 | 5/2022 | Snow |
| 11,348,098 B2 | 5/2022 | Snow |
| 11,423,398 B1 | 8/2022 | Mullins |
| 11,443,370 B2 | 9/2022 | Snow |
| 11,531,981 B2 | 12/2022 | Snow |
| 2001/0029482 A1 | 10/2001 | Tealdi |
| 2003/0018563 A1 | 1/2003 | Kilgour et al. |
| 2004/0085445 A1 | 5/2004 | Park |
| 2005/0206741 A1 | 9/2005 | Raber |
| 2006/0075228 A1 | 4/2006 | Black et al. |
| 2006/0184443 A1 | 8/2006 | Erez et al. |
| 2007/0027787 A1 | 2/2007 | Tripp |
| 2007/0094272 A1 | 4/2007 | Yeh |
| 2007/0174630 A1 | 7/2007 | Shannon |
| 2007/0296817 A1 | 12/2007 | Ebrahimi et al. |
| 2008/0010466 A1 | 1/2008 | Hopper |
| 2008/0028439 A1 | 1/2008 | Shevade |
| 2008/0059726 A1 | 3/2008 | Rozas |
| 2009/0025063 A1 | 1/2009 | Thomas |
| 2009/0287597 A1 | 11/2009 | Bahar |
| 2010/0049966 A1 | 2/2010 | Kato |
| 2010/0058476 A1 | 3/2010 | Isoda |

(56) References Cited

U.S. PATENT DOCUMENTS

| | | |
|---|---|---|
| 2010/0161459 A1 | 6/2010 | Kass et al. |
| 2010/0228798 A1 | 9/2010 | Kodama |
| 2010/0241537 A1 | 9/2010 | Kass et al. |
| 2011/0061092 A1 | 3/2011 | Bailloeul |
| 2011/0161674 A1 | 6/2011 | Ming |
| 2011/0205896 A1* | 8/2011 | Salaun .................. H04L 69/24 370/231 |
| 2012/0203670 A1 | 8/2012 | Piersol |
| 2012/0264520 A1 | 10/2012 | Marsland |
| 2013/0142323 A1 | 6/2013 | Chiarella |
| 2013/0222587 A1 | 8/2013 | Roskowski |
| 2013/0275765 A1 | 10/2013 | Lay |
| 2013/0276058 A1 | 10/2013 | Buldas |
| 2014/0022973 A1 | 1/2014 | Kopikare |
| 2014/0201541 A1 | 7/2014 | Paul |
| 2014/0229738 A1 | 8/2014 | Sato |
| 2014/0282852 A1 | 9/2014 | Vestevich |
| 2014/0289802 A1 | 9/2014 | Lee |
| 2014/0297447 A1 | 10/2014 | O'Brien |
| 2014/0344015 A1 | 11/2014 | Puertolas-Montasnes et al. |
| 2015/0193633 A1 | 7/2015 | Chida |
| 2015/0206106 A1 | 7/2015 | Yago |
| 2015/0242835 A1 | 8/2015 | Vaughan |
| 2015/0244729 A1 | 8/2015 | Mao |
| 2015/0309831 A1 | 10/2015 | Powers |
| 2015/0332256 A1 | 11/2015 | Minor |
| 2015/0363769 A1 | 12/2015 | Ronca |
| 2015/0378627 A1 | 12/2015 | Kitazawa |
| 2015/0379484 A1 | 12/2015 | McCarthy |
| 2016/0002923 A1 | 1/2016 | Alobily |
| 2016/0012240 A1 | 1/2016 | Smith |
| 2016/0021743 A1 | 1/2016 | Pai |
| 2016/0071096 A1 | 3/2016 | Rosca |
| 2016/0098578 A1 | 4/2016 | Hincker |
| 2016/0119134 A1 | 4/2016 | Hakoda et al. |
| 2016/0148198 A1 | 5/2016 | Kelley |
| 2016/0162897 A1 | 6/2016 | Feeney |
| 2016/0217436 A1 | 7/2016 | Brama |
| 2016/0239653 A1 | 8/2016 | Loughlin-Mchugh |
| 2016/0253663 A1 | 9/2016 | Clark et al. |
| 2016/0260091 A1 | 9/2016 | Tobias |
| 2016/0267472 A1 | 9/2016 | Lingham et al. |
| 2016/0267558 A1 | 9/2016 | Bonnell et al. |
| 2016/0275294 A1 | 9/2016 | Irvine |
| 2016/0283920 A1 | 9/2016 | Fisher et al. |
| 2016/0292396 A1 | 10/2016 | Akerwall |
| 2016/0292672 A1 | 10/2016 | Fay et al. |
| 2016/0292680 A1 | 10/2016 | Wilson, Jr. et al. |
| 2016/0294783 A1 | 10/2016 | Piqueras Jover |
| 2016/0300200 A1 | 10/2016 | Brown et al. |
| 2016/0300234 A1 | 10/2016 | Moss-Pultz et al. |
| 2016/0321675 A1 | 11/2016 | McCoy et al. |
| 2016/0321751 A1 | 11/2016 | Creighton, IV et al. |
| 2016/0321769 A1 | 11/2016 | McCoy |
| 2016/0328791 A1 | 11/2016 | Parsells et al. |
| 2016/0330031 A1 | 11/2016 | Drego et al. |
| 2016/0330244 A1 | 11/2016 | Denton |
| 2016/0337119 A1 | 11/2016 | Hosaka et al. |
| 2016/0342977 A1 | 11/2016 | Lam |
| 2016/0342989 A1 | 11/2016 | Davis |
| 2016/0344737 A1 | 11/2016 | Anton et al. |
| 2016/0371771 A1 | 12/2016 | Serrano |
| 2017/0000613 A1 | 1/2017 | Lerf |
| 2017/0005797 A1 | 1/2017 | Lanc et al. |
| 2017/0005804 A1 | 1/2017 | Zinder |
| 2017/0033933 A1 | 2/2017 | Haber |
| 2017/0053249 A1 | 2/2017 | Tunnell et al. |
| 2017/0061396 A1 | 3/2017 | Melika et al. |
| 2017/0075938 A1 | 3/2017 | Black |
| 2017/0103167 A1 | 4/2017 | Shah |
| 2017/0124534 A1 | 5/2017 | Savolainen |
| 2017/0124535 A1 | 5/2017 | Juels et al. |
| 2017/0134162 A1 | 5/2017 | Code |
| 2017/0148016 A1 | 5/2017 | Davis |
| 2017/0161439 A1 | 6/2017 | Raduchel |
| 2017/0177898 A1 | 6/2017 | Dillenberger |
| 2017/0178237 A1 | 6/2017 | Wong |
| 2017/0213287 A1 | 7/2017 | Bruno |
| 2017/0221052 A1 | 8/2017 | Sheng |
| 2017/0228731 A1 | 8/2017 | Sheng |
| 2017/0236123 A1 | 8/2017 | Ali |
| 2017/0243208 A1 | 8/2017 | Kurian et al. |
| 2017/0243289 A1 | 8/2017 | Rufo |
| 2017/0244757 A1 | 8/2017 | Castinado et al. |
| 2017/0330279 A1 | 11/2017 | Ponzone |
| 2017/0344983 A1 | 11/2017 | Muftic |
| 2017/0346693 A1 | 11/2017 | Dix |
| 2017/0352031 A1 | 12/2017 | Collin |
| 2017/0353309 A1 | 12/2017 | Gray |
| 2017/0359374 A1 | 12/2017 | Smith |
| 2017/0364642 A1 | 12/2017 | Bogdanowicz |
| 2017/0373859 A1 | 12/2017 | Shors et al. |
| 2018/0005186 A1 | 1/2018 | Hunn |
| 2018/0048599 A1 | 2/2018 | Arghandiwal |
| 2018/0075239 A1 | 3/2018 | Boutnaru |
| 2018/0075527 A1 | 3/2018 | Nagla et al. |
| 2018/0082043 A1 | 3/2018 | Witchey |
| 2018/0088928 A1 | 3/2018 | Smith |
| 2018/0091524 A1 | 3/2018 | Setty |
| 2018/0097779 A1 | 4/2018 | Karame et al. |
| 2018/0101701 A1 | 4/2018 | Barinov |
| 2018/0101842 A1 | 4/2018 | Ventura |
| 2018/0108024 A1 | 4/2018 | Greco |
| 2018/0117446 A1 | 5/2018 | Tran |
| 2018/0123779 A1 | 5/2018 | Zhang |
| 2018/0139042 A1 | 5/2018 | Binning |
| 2018/0144292 A1 | 5/2018 | Mattingly |
| 2018/0157700 A1 | 6/2018 | Roberts |
| 2018/0158034 A1 | 6/2018 | Hunt |
| 2018/0167201 A1 | 6/2018 | Naqvi |
| 2018/0173906 A1 | 6/2018 | Rodriguez |
| 2018/0176017 A1 | 6/2018 | Rodriguez |
| 2018/0181768 A1 | 6/2018 | Leporini |
| 2018/0182042 A1 | 6/2018 | Vinay |
| 2018/0189333 A1 | 7/2018 | Childress |
| 2018/0189781 A1 | 7/2018 | McCann |
| 2018/0204213 A1 | 7/2018 | Zappier |
| 2018/0219683 A1 | 8/2018 | Deery |
| 2018/0219685 A1 | 8/2018 | Deery |
| 2018/0225640 A1 | 8/2018 | Chapman |
| 2018/0225649 A1 | 8/2018 | Babar |
| 2018/0241565 A1 | 8/2018 | Paolini-Subramanya |
| 2018/0260888 A1 | 9/2018 | Paolini-Subramanya |
| 2018/0260889 A1 | 9/2018 | Paolini-Subramanya |
| 2018/0268162 A1 | 9/2018 | Dillenberger |
| 2018/0268382 A1 | 9/2018 | Wasserman |
| 2018/0268504 A1 | 9/2018 | Paolini-Subramanya |
| 2018/0276270 A1 | 9/2018 | Bisbee |
| 2018/0276668 A1 | 9/2018 | Li |
| 2018/0276745 A1 | 9/2018 | Paolini-Subramanya |
| 2018/0285879 A1 | 10/2018 | Gadnis |
| 2018/0285970 A1 | 10/2018 | Snow |
| 2018/0285971 A1 | 10/2018 | Rosenoer |
| 2018/0288022 A1 | 10/2018 | Madisetti |
| 2018/0315051 A1 | 11/2018 | Hurley |
| 2018/0316502 A1 | 11/2018 | Nadeau |
| 2018/0356236 A1 | 12/2018 | Lawrenson |
| 2018/0365201 A1 | 12/2018 | Hunn |
| 2018/0365686 A1 | 12/2018 | Kondo |
| 2018/0365764 A1 | 12/2018 | Nelson |
| 2018/0367298 A1 | 12/2018 | Wright |
| 2019/0012637 A1 | 1/2019 | Gillen |
| 2019/0013948 A1 | 1/2019 | Mercuri |
| 2019/0018947 A1 | 1/2019 | Li |
| 2019/0034459 A1 | 1/2019 | Qiu |
| 2019/0036887 A1 | 1/2019 | Miller |
| 2019/0036957 A1 | 1/2019 | Smith |
| 2019/0043048 A1 | 2/2019 | Wright |
| 2019/0044727 A1 | 2/2019 | Scott |
| 2019/0050855 A1 | 2/2019 | Martino |
| 2019/0057382 A1 | 2/2019 | Wright |
| 2019/0065709 A1 | 2/2019 | Salomon |
| 2019/0073666 A1 | 3/2019 | Ortiz |
| 2019/0080284 A1 | 3/2019 | Kim |

(56) References Cited

U.S. PATENT DOCUMENTS

| | | |
|---|---|---|
| 2019/0081793 A1 | 3/2019 | Martino |
| 2019/0081796 A1 | 3/2019 | Chow |
| 2019/0087446 A1* | 3/2019 | Sharma .............. G06F 16/245 |
| 2019/0123889 A1 | 4/2019 | Schmidt-Karaca |
| 2019/0132350 A1 | 5/2019 | Smith |
| 2019/0188699 A1 | 6/2019 | Thibodeau |
| 2019/0197532 A1 | 6/2019 | Jayachandran |
| 2019/0205563 A1 | 7/2019 | Gonzales, Jr. |
| 2019/0236286 A1 | 8/2019 | Scriber |
| 2019/0251557 A1 | 8/2019 | Jin |
| 2019/0253240 A1 | 8/2019 | Treat |
| 2019/0253258 A1 | 8/2019 | Thekadath |
| 2019/0268141 A1 | 8/2019 | Pandurangan |
| 2019/0268163 A1 | 8/2019 | Nadeau |
| 2019/0281259 A1 | 9/2019 | Palazzolo |
| 2019/0287107 A1 | 9/2019 | Gaur |
| 2019/0287199 A1 | 9/2019 | Messerges |
| 2019/0287200 A1 | 9/2019 | Schuler |
| 2019/0288832 A1 | 9/2019 | Dang |
| 2019/0296915 A1 | 9/2019 | Lancashire |
| 2019/0303623 A1 | 10/2019 | Reddy |
| 2019/0303887 A1 | 10/2019 | Wright |
| 2019/0306150 A1 | 10/2019 | Letz |
| 2019/0311357 A1 | 10/2019 | Madisetti |
| 2019/0324867 A1 | 10/2019 | Tang |
| 2019/0332691 A1 | 10/2019 | Beadles |
| 2019/0333054 A1 | 10/2019 | Cona |
| 2019/0334715 A1 | 10/2019 | Gray |
| 2019/0334912 A1 | 10/2019 | Sloane |
| 2019/0340586 A1 | 11/2019 | Sheng |
| 2019/0340607 A1 | 11/2019 | Lynn |
| 2019/0342422 A1 | 11/2019 | Li |
| 2019/0347444 A1 | 11/2019 | Lowagie |
| 2019/0347628 A1 | 11/2019 | Al-Naji |
| 2019/0349190 A1 | 11/2019 | Smith |
| 2019/0349426 A1 | 11/2019 | Smith |
| 2019/0354606 A1 | 11/2019 | Snow |
| 2019/0354607 A1 | 11/2019 | Snow |
| 2019/0354611 A1 | 11/2019 | Snow |
| 2019/0354724 A1 | 11/2019 | Lowagie |
| 2019/0354725 A1 | 11/2019 | Lowagie |
| 2019/0354964 A1 | 11/2019 | Snow |
| 2019/0356733 A1 | 11/2019 | Snow |
| 2019/0361917 A1 | 11/2019 | Tran |
| 2019/0372770 A1 | 12/2019 | Xu |
| 2019/0378128 A1 | 12/2019 | Moore |
| 2019/0385165 A1 | 12/2019 | Castinado |
| 2019/0386940 A1 | 12/2019 | Hong |
| 2019/0391540 A1 | 12/2019 | Westervelt |
| 2019/0391858 A1 | 12/2019 | Studnicka |
| 2019/0394044 A1 | 12/2019 | Snow |
| 2019/0394048 A1 | 12/2019 | Deery |
| 2020/0004263 A1 | 1/2020 | Dalla Libera |
| 2020/0004946 A1 | 1/2020 | Gilpin |
| 2020/0005290 A1 | 1/2020 | Madisetti |
| 2020/0019937 A1 | 1/2020 | Edwards |
| 2020/0034571 A1 | 1/2020 | Fett |
| 2020/0034813 A1 | 1/2020 | Calinog |
| 2020/0042635 A1 | 2/2020 | Douglass |
| 2020/0042960 A1 | 2/2020 | Cook |
| 2020/0042982 A1 | 2/2020 | Snow |
| 2020/0042983 A1 | 2/2020 | Snow |
| 2020/0042984 A1 | 2/2020 | Snow |
| 2020/0042985 A1 | 2/2020 | Snow |
| 2020/0042986 A1 | 2/2020 | Snow |
| 2020/0042987 A1 | 2/2020 | Snow |
| 2020/0042988 A1 | 2/2020 | Snow |
| 2020/0042990 A1 | 2/2020 | Snow |
| 2020/0042995 A1 | 2/2020 | Snow et al. |
| 2020/0044827 A1 | 2/2020 | Snow |
| 2020/0044856 A1 | 2/2020 | Lynde |
| 2020/0044857 A1 | 2/2020 | Snow |
| 2020/0065761 A1 | 2/2020 | Tatchell |
| 2020/0067907 A1 | 2/2020 | Avetisov |
| 2020/0075056 A1 | 3/2020 | Yang |
| 2020/0089690 A1 | 3/2020 | Qiu |
| 2020/0099524 A1 | 3/2020 | Schiatti |
| 2020/0099534 A1 | 3/2020 | Lowagie |
| 2020/0104712 A1 | 4/2020 | Katz |
| 2020/0118068 A1 | 4/2020 | Turetsky |
| 2020/0127812 A1 | 4/2020 | Schuler |
| 2020/0134760 A1 | 4/2020 | Messerges |
| 2020/0145219 A1 | 5/2020 | Sebastian |
| 2020/0167870 A1 | 5/2020 | Isaacson |
| 2020/0175506 A1 | 6/2020 | Snow |
| 2020/0195441 A1 | 6/2020 | Suen |
| 2020/0211011 A1 | 7/2020 | Anderson |
| 2020/0234386 A1 | 7/2020 | Blackman |
| 2020/0258061 A1 | 8/2020 | Beadles |
| 2020/0279324 A1 | 9/2020 | Snow |
| 2020/0279325 A1 | 9/2020 | Snow |
| 2020/0279326 A1 | 9/2020 | Snow |
| 2020/0280447 A1 | 9/2020 | Snow |
| 2020/0302433 A1 | 9/2020 | Green |
| 2020/0320097 A1 | 10/2020 | Snow |
| 2020/0320514 A1 | 10/2020 | Snow |
| 2020/0320521 A1 | 10/2020 | Snow |
| 2020/0320522 A1 | 10/2020 | Snow |
| 2020/0320620 A1 | 10/2020 | Snow |
| 2020/0382480 A1 | 12/2020 | Isaacson |
| 2020/0389294 A1 | 12/2020 | Soundararajan |
| 2021/0035092 A1 | 2/2021 | Pierce |
| 2021/0042758 A1 | 2/2021 | Durvasula |
| 2021/0044976 A1 | 2/2021 | Avetisov |
| 2021/0073212 A1 | 3/2021 | Conley |
| 2021/0073750 A1 | 3/2021 | Ledford |
| 2021/0090076 A1 | 3/2021 | Wright |
| 2021/0097602 A1 | 4/2021 | Eichel |
| 2021/0119785 A1 | 4/2021 | Ben-Reuven |
| 2021/0144149 A1 | 5/2021 | Simons |
| 2021/0174353 A1 | 6/2021 | Snow |
| 2021/0200653 A1 | 7/2021 | Jetzfellner |
| 2021/0201321 A1 | 7/2021 | Studnitzer |
| 2021/0201328 A1 | 7/2021 | Gunther |
| 2021/0226769 A1 | 7/2021 | Snow |
| 2021/0226773 A1 | 7/2021 | Snow |
| 2021/0241282 A1 | 8/2021 | Gu |
| 2021/0248514 A1 | 8/2021 | Cella |
| 2021/0266167 A1 | 8/2021 | Lohe |
| 2021/0266174 A1 | 8/2021 | Snow |
| 2021/0273810 A1 | 9/2021 | Lynde |
| 2021/0273816 A1 | 9/2021 | Deery |
| 2021/0314136 A1* | 10/2021 | Huang .............. H04L 9/0618 |
| 2021/0326815 A1 | 10/2021 | Brody |
| 2021/0328804 A1 | 10/2021 | Snow |
| 2021/0342836 A1 | 11/2021 | Cella |
| 2021/0366586 A1 | 11/2021 | Ryan |
| 2022/0006641 A1 | 1/2022 | Snow |
| 2022/0012731 A1 | 1/2022 | Derosa-Grund |
| 2022/0019559 A1 | 1/2022 | Snow |
| 2022/0020001 A1 | 1/2022 | Snow |
| 2022/0023742 A1 | 1/2022 | Tran |
| 2022/0027893 A1 | 1/2022 | Snow |
| 2022/0027897 A1 | 1/2022 | Snow |
| 2022/0027994 A1 | 1/2022 | Snow |
| 2022/0027995 A1 | 1/2022 | Snow |
| 2022/0027996 A1 | 1/2022 | Snow |
| 2022/0029805 A1 | 1/2022 | Snow |
| 2022/0030054 A1 | 1/2022 | Snow |
| 2022/0034004 A1 | 2/2022 | Snow |
| 2022/0040557 A1 | 2/2022 | Tran |
| 2022/0043831 A1 | 2/2022 | Douglass |
| 2022/0058622 A1 | 2/2022 | Snow |
| 2022/0058623 A1 | 2/2022 | Snow |
| 2022/0083991 A1 | 3/2022 | Kemper |
| 2022/0103341 A1 | 3/2022 | Snow |
| 2022/0103343 A1 | 3/2022 | Snow |
| 2022/0103344 A1 | 3/2022 | Snow |
| 2022/0103364 A1 | 3/2022 | Snow |
| 2022/0141231 A1 | 5/2022 | Simons |
| 2022/0156737 A1 | 5/2022 | Wright |
| 2022/0172207 A1 | 6/2022 | Cella |
| 2022/0173893 A1 | 6/2022 | Basu |
| 2022/0198554 A1 | 6/2022 | Filter |

(56) References Cited

U.S. PATENT DOCUMENTS

| | | | |
|---|---|---|---|
| 2022/0215389 | A1 | 7/2022 | Balaraman |
| 2022/0239508 | A1* | 7/2022 | Liu .................. H04L 9/0643 |
| 2022/0245626 | A1 | 8/2022 | Sewell |
| 2022/0372673 | A9 | 11/2022 | Snow |
| 2022/0405260 | A1 | 12/2022 | Snow |
| 2022/0407728 | A1 | 12/2022 | Snow |

FOREIGN PATENT DOCUMENTS

| | | | |
|---|---|---|---|
| CN | 110599147 | A | 12/2019 |
| CN | 112329041 | A | 2/2021 |
| DE | 10128728 | | 1/2003 |
| EP | 3726438 | A1 | 10/2020 |
| EP | 3862947 | A1 | 8/2021 |
| JP | 5383297 | | 1/2014 |
| JP | 2021152931 | A | 9/2021 |
| KR | 100653512 | | 11/2006 |
| KR | 1747221 | | 5/2017 |
| KR | 101747221 | | 6/2017 |
| WO | WO 0049797 | | 8/2000 |
| WO | WO 2007069176 | | 6/2007 |
| WO | WO 2015077378 | | 5/2015 |
| WO | 2017190795 | A1 | 11/2017 |
| WO | WO 2018013898 | A1 | 1/2018 |
| WO | WO 2018109010 | | 6/2018 |
| WO | 2018127923072018 | | 7/2018 |
| WO | WO 2018127923 | | 7/2018 |
| WO | 2019180702 | | 9/2019 |
| WO | 2019207504 | | 10/2019 |
| WO | 2020125839 | A1 | 6/2020 |

OTHER PUBLICATIONS

Feng and Luo, "Evaluating Memory-Hard Proof-of-Work Algorithms on Three Processors," PVLDB, 13(6): 898-911, 2020.

Luther, "Do We Need a "Fedcoin" Cryptocurrency?," ValueWalk, Newstex Global Business Blogs, Dec. 30, 2015 (Year: 2015).

Iddo Bentov, Bitcoin and Secure Computation with Money, May 2016 (Year: 2016).

United States: New Generation cryptocurrency, USDX Protocol, Offers Crypto Advantages and Fiat Pegging, Apr. 2, 2018 (Year: 2018).

Ana Reyna et al.; On blockchain and its integration with IoT. Challenges and opportunities. Future generation computer systems. vol. 88, Nov. 2018, pp. 173-190. https://www.sciencedirect.com/science/article/pii/S0167739X17329205 (Year: 2018).

Krol, Michal et al., "SPOC: Secure Payments for Outsourced Computations" https://arxiv.org/pdf/1807.06462.pdf. (Year: 2018).

Dai et al. TrialChain: A Blockchain-Based Platform to Validate Data Integrity in Large, Biomedical Research Studies arXiv: 1807.03662 Jul. 10, 2018 (Year: 2018).

Eberhardt et al., "ZoKrates—Scalable Privacy-Preserving Off-Chain Computations," https://ieeexplore.ieee.org/stamp/JSP?tp:::&armumber:::8726497. (Year:2018).

Unknown, Xtrade White Paper, https://xtrade1-9649.kxcdn.com/wp-content/uploads/2017/09/xtrade-whitepaper.pdf Feb. 7, 2018, 37 pages.

Muhamed et al. EduCTX: A Blockchain-Based Higher Education Credit Platform, https://ieeexplore.ieee.org/stamp/stamp.jsp?arnumber=8247166. (Year: 2017) 16 pages.

Fernandez-Carames et al.; A Review on the Use of Blockchain for the Internet of Things. https://ieeexplore.ieee.org/stamp/stamp.jsp?arnumber=8370027 (Year: 2018). 23 pages.

Written Opinion in PCT/US2021/040207, Inventor Snow, dated Oct. 7, 2021, 14 pages.

ZoKrates—Scalable Privacy-Preserving Off-Chain Computations, by Jacob Eberhardt, Stefan Tai, 8 pages, Nov. 3, 2011 (Year: 2011).

Sokolowski, R. (2011). Signed, sealed, delivered: EMortgages are protected from unauthorized alteration by something called a tamper seal. Mortgage Banking, 71(6), 108(4). Retrieved from https://dialog.proquest.com/professional/docview/1068158815? accountid=131444 (Year: 2011).

Kroeger, T. et al., The Case for Distributed Data Archival Using Secret Splitting with Percival, 6th International Symposium on Resilient Control Systems (available at IEEE Xplore), p. 204-209 (Year: 2013).

"Money in programmable applications: Cross-sector perspectives from the German economy", Deutsche Bundesbank Eurosystem, https://www.bundesbank.de, 18 pages, 2020.

Watanabe, Hiroki, et al. "Blockchain contract: Securing a blockchain applied to smart contracts." *2016 IEEE International Conference on Consumer Electronics (ICCE)*. IEEE, 2016.

Crosby, Michael et al., "BlockChain Technology, Beyond Bitcoin", Sutardja Center for Entrepreneurship & Technology, Berkeley Engineering, Oct. 16, 2015, 35 pages.

Alsolami, Fahad, and Terrance E. Boult. "CloudStash: using secret-sharing scheme to secure data, not keys, in multi-clouds." *Information Technology: New Generations (ITNG), 2014 11th International Conference on*. IEEE, 2014.

Unknown, "Midex", https://promo.midex.com/Midex_EN.pdf, 25 Pages.

Unknown, Xtrade White Paper, https://xtrade1-9649.kxcdn.com/wp-content/uploads/2017/09/xtrade-whitepaper.pdf Feb. 7, 2018, 37 Pages.

Haarmann, et al., "DMN Decision Execution on the Ethereum Blockchain," Hasso Plattner Institute, University of Potsdam, 15 pages.

Kim et al., "A Perspective on Blockchain Smart Contracts," Schulich School of Business, York University, Toronto, Canada, 6 pages.

Chakravorty, Antorweep, and Chunming Rong, "Ushare: user controlled social media based on blockchain." Proceedings of the 11th International Conference on Ubiquitous Information Management and Communication. ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.

Al-Naji, Nader et al., "Basis: A Price-Stable Cryptocurrency with an Algorithmic Central Bank" www.basis.io Jun. 20, 2017, 27 pages.

Unkown, "Federated Learning: Collaborative Machine Learning without Centralized Training Data" Apr. 6, 2017, 11 pages.

Casey, "BitBeat: Factom Touts Blockchain Tool for Keeping Record Keepers Honest", Wall Street Journal, Nov. 5, 2014.

Menezes, Alfred. J., et al. "Handbook of Applied Cryptography," 1997, CRC Press, p. 527-28.

White, Ron, "How Computers Work," Oct. 2003, QUE, Seventh Edition (Year: 2003), 23 pages.

Luu et al., Making Smart Contracts Smarter, 2016.

Merkle Mountain Ranges (MMRs)-Grin Documentation, https://quentinlesceller.github.io/grin-docs/technical/building-blocks/merkle-mountain-ranges/, 5 pages, printed Jun. 1, 2022.

Merkle Mountain Ranges, https://github.com/opentimestamps/opentimestamps-server/blob/master/doc/merkle-mountain-range.md, 3 pages, printed Jun. 1, 2022.

Michelson, Kyle, et al., "Accumulate: An identity-based blockchain protocol with cross-chain support, human-readable addresses, and key management capabilities", Accumulate Whitepaper, v1.0, Jun. 12, 2022, 28 pages.

MOF-BC: A Memory Optimized and Flexible BlockChain for Large Scale Networks. lle:///C:/Users/eoussir/Documents/e-Red%20Folder/16905961/NPL_MOF_BC_A%20Memory%20Optimized%20and%20Flexible%20Blockchain.pdf (Year:2018).

* cited by examiner

_US 11,676,132 B2_

SMART CONTRACTS IN BLOCKCHAIN ENVIRONMENTS

CROSS-REFERENCE TO RELATED APPLICATIONS

This patent application is a continuation of U.S. application Ser. No. 16/191,595 filed Nov. 15, 2018 and since issued as U.S. Pat. No. 11,042,871, which claims domestic benefit of U.S. Provisional Application No. 62/714,909 filed Aug. 6, 2018, with both patent applications incorporated herein by reference in their entireties.

BACKGROUND

Blockchain usage is growing. As cryptographic blockchain gains acceptance, improved techniques are needed for executing digital contracts.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
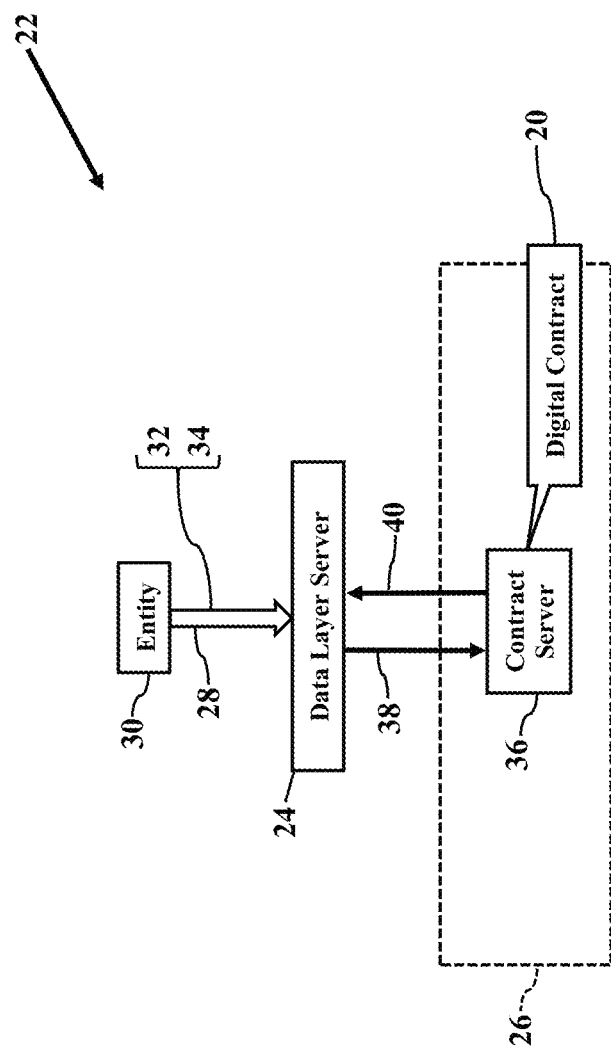
FIGS. 1-9 are simplified illustrations of a digital contract in a blockchain environment, according to exemplary embodiments.

FIGS. 1-9 are simplified illustrations of a digital contract 20 in a blockchain environment 22, according to exemplary embodiments. The digital contract 20 is sometimes referred to as a self-executing or "smart" contract between parties to a transaction. A data layer server 24 manages the execution of the digital contract 20. That is, the data layer server 24 may outsource the execution of the digital contract 20 to a contract layer 26. The contract layer 26 may represent a vendor, supplier, or service as a subcontractor process. The data layer server 24 receives a blockchain 28 sent from any entity 30. The data layer server 24 inspects the blockchain 28 to identify a contract identifier 32 and/or any contractual parameters 34 associated with the digital contract 20. The contract identifier 32 may be used to identify a destination, network address, server, or other processing component in the contract layer 26 that processes the digital contract 20, perhaps according to the contractual parameters 34. For simplicity, FIG. 1 illustrates the destination as a remote, contract server 36 operating within, or associated with, the contract layer 26.

Once the contract server 36 is identified, the data layer server 24 may send a service request 38 to the contract server 36. The service request 38 requests that the contract server 66 execute the digital contract 20, based on the contract identifier 32 and/or the contractual parameters 34.

The service request 38 may thus specify the contract identifier 32 and/or the contractual parameters 34 as inputs for remote, off-chain execution of the digital contract 20. The contract server 36 applies the inputs to the programming code representing the digital contract 20. Once the digital contract 20 is executed, the contract server 36 may then send a service response 40 back to the data layer server 24, and the service response 40 comprises data or information describing an outcome of the digital contract 20 based on the supplied inputs (such as consideration, payment, or performance terms).

Figure 2:
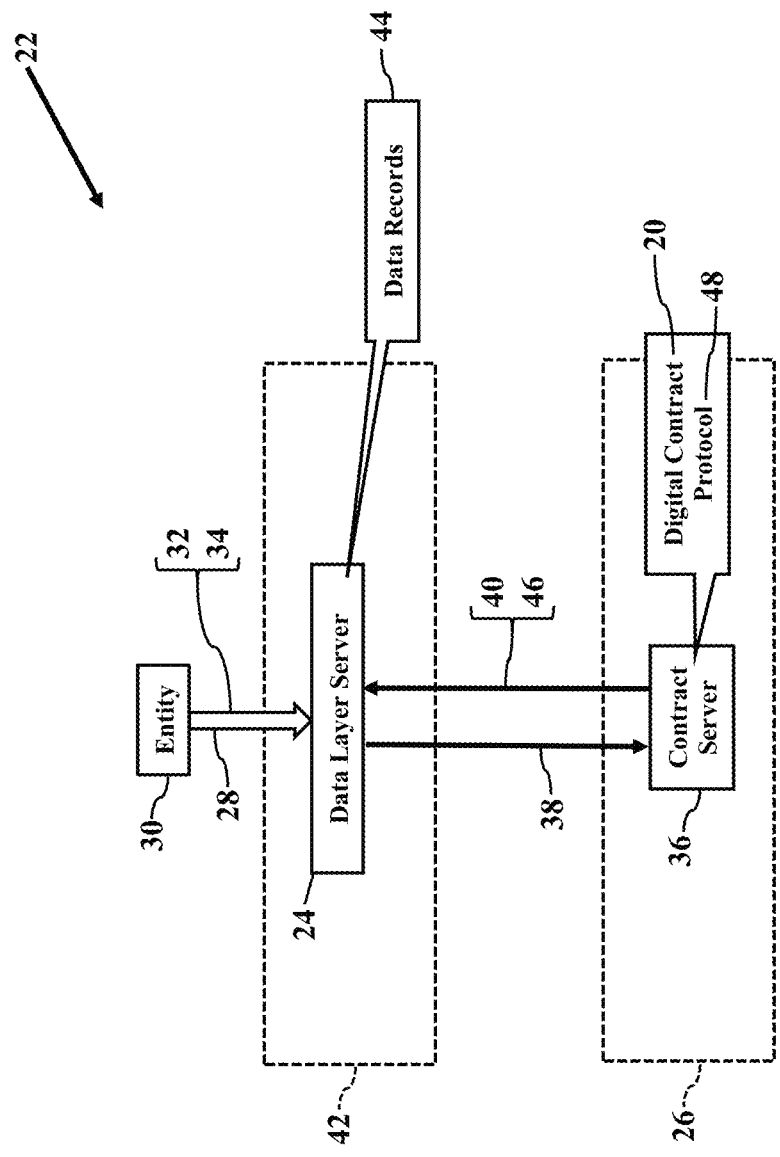

FIG. 2 illustrates a blockchain data layer 42. The data layer server 24 generates the blockchain data layer 42 to document the management and execution of the digital contract 20. For example, data records 44 in the blockchain data layer 42 may document the date and time that the blockchain 28 was received and the date and time that the service request 38 was sent to the contract server 36. Moreover, as the contract server 36 provides the digital contract 20 as a service, the contract server 36 may send periodic or random service updates 46 as the service is provided along with timestamps toward completion. The data layer server 24 may thus generate the data records 44 describing the service updates 46 received from the contract server 36. The data layer server 24 may also generate the data records 44 describing the service response 40 sent from the contract server 36 describing an outcome of the digital contract 20.

The contract layer 26 may thus be separate from the blockchain data layer 42. The contract layer 26 may have its own, smart contract protocols 48 for accessing and using its separate network of servers (such as the contract server 36). The protocols 48 may describe application programming interfaces (or "APIs"), input data formatting, and other processing requirements for using the services provided by the contract layer 26. The smart contract layer 26 may be implemented as a virtual machine, one or more decision tables, or some other state transition mechanism built within the protocol 48 of the smart contract layer 26. Moreover, the contract layer 26 may implement a consensus process such that the smart, digital contract 20 only proceeds when consensus is achieved by multiple servers within the smart contract layer 26. Moreover, the consensus process within the smart contract layer 26 need not match any consensus process used by the blockchain data layer 42. Regardless, the contract layer 26 may be a third-party and/or online, cloud-based service for remote execution of the smart, digital contract 20 in the blockchain environment 22.

Figure 3:
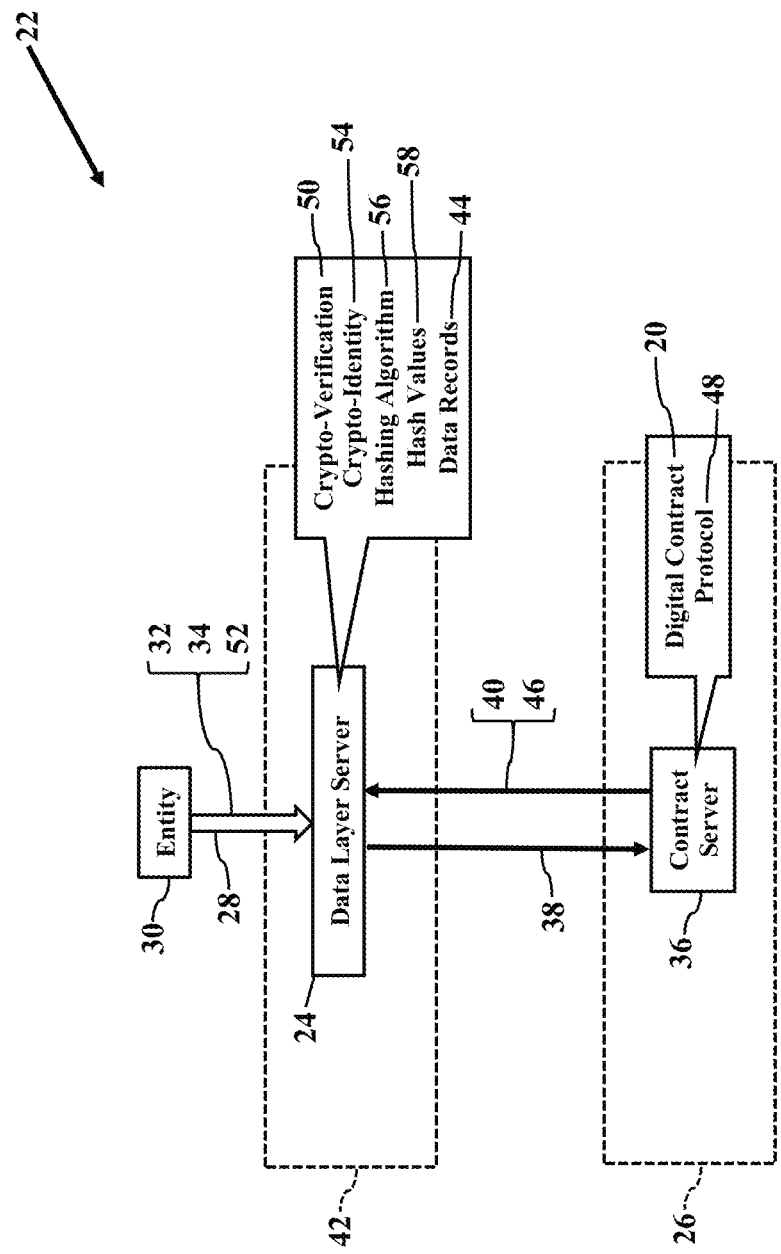

FIG. 3 illustrates a cryptographic verification 50. Before the contract layer 26 processes the digital contract 20, exemplary embodiments may require the cryptographic verification 50. If the cryptographic verification 50 is satisfied, then the data layer server 24 may be authorized to send the service request 38 to the contract layer 26. However, if the cryptographic verification 50 is not verified, then the data layer server 24 may decline to send the service request 38. While any cryptographic mechanism may be used, FIG. 3 illustrates hashing identities. That is, when the data layer server 24 receives the blockchain 28, the blockchain 28 may also specify or include one or more verification values 52. Each verification value 52 may represent any alphanumeric combination that must favorably compare to a cryptographic identity 54. As a simple example, suppose the verification value 52 is some alphanumeric identifier that reportedly represents the entity 30 sending the blockchain 28. The data layer server 24 applies a hashing algorithm 56 to the verification value 52 to generate one or more hash values 58.

The data layer server 24 may then compare the hash value(s) 58 to the cryptographic identity 54. The cryptographic identity 54 may thus be another hash value that is known to be uniquely associated with the entity 30. If the hash value 58 matches the cryptographic identity 54, then the data layer server 24 verifies that the blockchain 28 is truly sent from the entity 30. The entity 30 and/or the blockchain 20, in other words, is legitimately authorized or subscribed to use the services provided by the data layer server 24 (such as managing the execution of the digital contract 20). Because the entity 30 and/or the blockchain 20 is verified, the data layer server 24 may be authorized to send the service request 38 to the contract server 36 requesting execution of the digital contract 20. The data layer server 24 may also generate the data records 44 describing the successful cryptographic verification 50.

Service may also be declined. If the cryptographic verification 50 fails, then the data layer server 24 may reject execution of the digital contract 20. For example, if the hash value 58 (representing the verification value 52 specified by the blockchain 20) does not match the cryptographic identity 54, then the data layer server 24 cannot verify the entity 30 and/or the blockchain 28. The entity 30 and/or the blockchain 20 is not a legitimate subscriber of the services provided by the data layer server 24. Because the entity 30 and/or the blockchain 20 is unverified, the data layer server 24 may ignore or reject execution of the digital contract 20. The data layer server 24 may also generate the data records 44 describing the failed cryptographic verification 50.

The cryptographic verification 50 may verify any identity. The above simple example verifies the verification value 52 representing the entity 30 sending the blockchain 28. The verification value 52 may thus be any alphanumeric or binary value representing the entity 30, the blockchain 28, and/or a server or other device sending the blockchain 28. The verification value 52 may additionally or alternatively be any alphanumeric or binary value representing any party, or multiple parties, to the digital contract 20. As another simple example, the verification value 52 may represent a buyer and/or a seller/supplier in a contractual relationship described by the digital contract 20. The verification value 52 may represent a good or service described by the digital contract 20 or consideration described by the digital contract 20. The verification value 52 may represent any of the contractual parameters 34 associated with the digital contract 20. Whatever the verification value 52, if the verification value 52 can be verified, then the data layer server 24 may be authorized to execute the digital contract 20.

Figure 4:
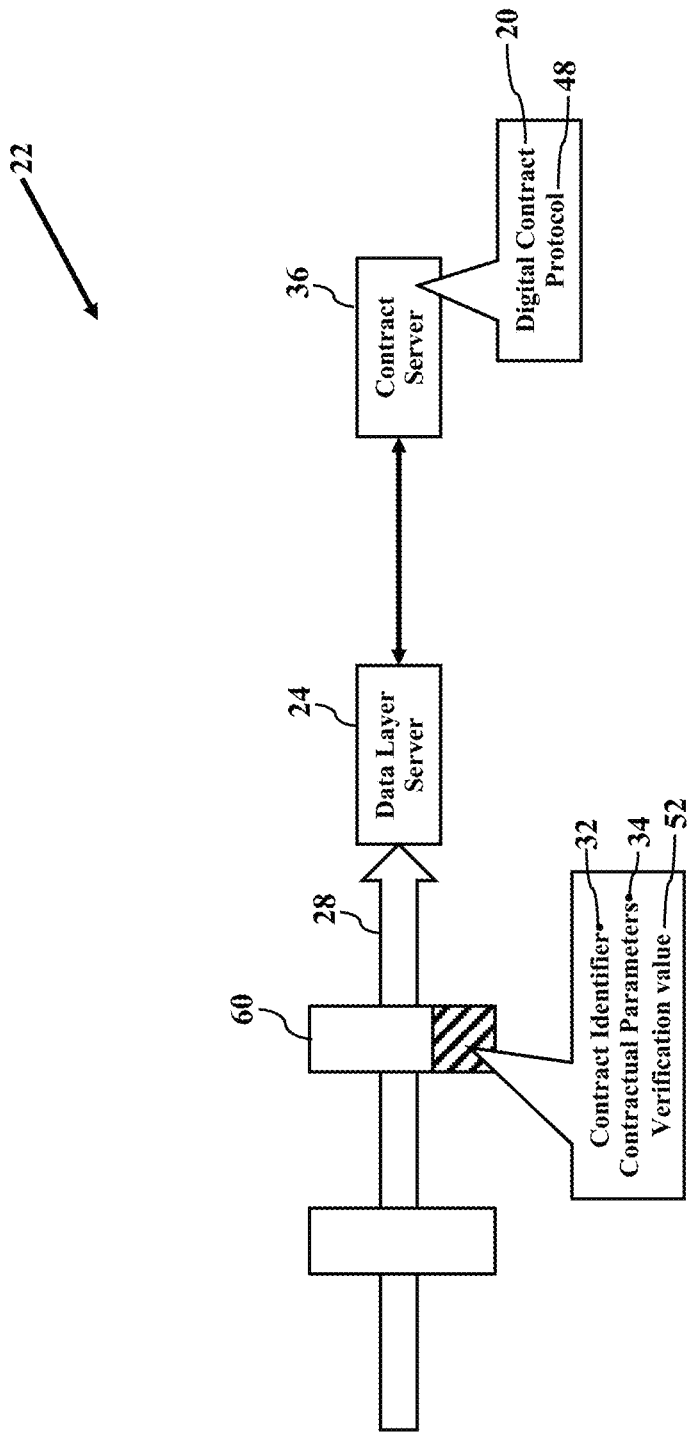

FIG. 4 further illustrates the blockchain 28. The digital contract 20 is sometimes referred to as a self-executing or "smart" contract between parties to a transaction. The blockchain 28 has one or more blocks 60 of data. The digital contract 20 facilitates, executes, and/or enforces the terms of an agreement. Whatever the terms, the digital contract 20 may automatically execute the terms once predetermined logical rules, conditions, or code is satisfied. The digital contract 20 may thus be expressed in a programming language. Smart contracts are generally known, so this disclosure will not dwell on the known aspects.

Here, though, the blockchain 28 need only reference the digital contract 20. That is, the actual programming language defining the digital contract 20 need not be included within or attached to the blockchain 28. Instead, the blockchain 28 need only include or specify the contract identifier 32, the one or more contractual parameters 34, and perhaps the one or more verification values 52. The contract identifier 32 is any digital identifying information that uniquely identifies or references the digital contract 20. Similarly, the contractual parameters 34 may digitally identify the parties to the digital contract 20, their respective performance obligations and terms, and even consideration. The data layer server 24 may use the one or more verification values 52 in the cryptographic verification 50 to authorize the contract layer 26 to process the digital contract 20. So, instead of the blockchain 28 carrying or conveying the actual code representing the digital contract 20, exemplary embodiments need only specify the contract identifier 32, the contractual parameters 34, and/or the verification value 52. The blocks 60 of data within the blockchain 28 are thus not burdened with the programming code that is required to execute the digital contract 20. The blockchain 28 need only include or specify the contract identifier 32, the contractual parameters 34, and/or the verification value 52 (or their respective hash values), thus greatly simplifying the blockchain 28 and reducing its size (in bytes) and processing requirements.

Figure 5:
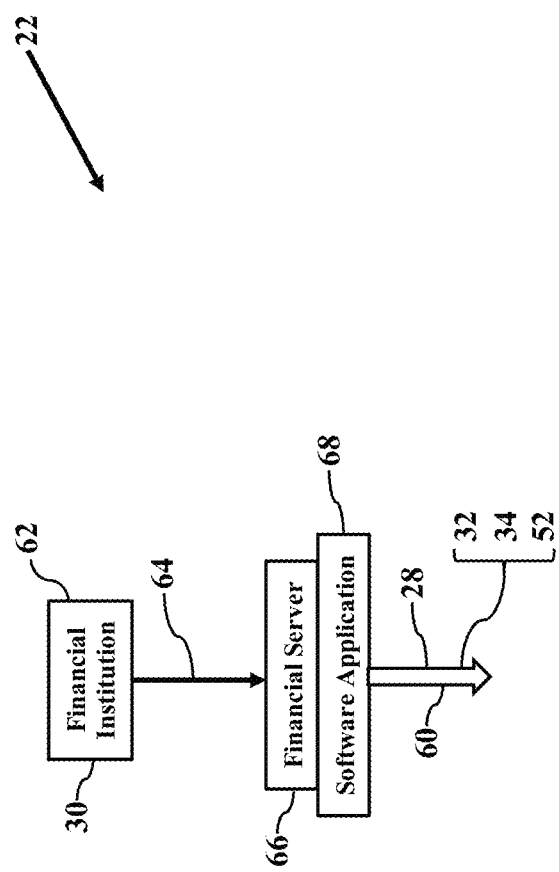

FIG. 5 further illustrates the blockchain 28. Here any entity 30 may generate the blockchain 28. While exemplary embodiments may be applied to any entity 30, most readers are familiar with financial services. That is, suppose the entity 30 is a bank, lender, or other financial institution 62 (such as PIMCO®, CITI®, or BANK OF AMERICA®). As the reader likely understands, the financial institution 62 creates a massive amount of banking records, transaction records, mortgage instruments, and other private data 64. The financial institution 62 thus has a financial server 66 executing a software application 68 that encrypts its private data 64. While the software application 68 may use any encryption scheme, FIG. 5 illustrates the private blockchain 28. That is, the software application 68 causes the financial server 66 to cryptographically hash the private data 64 and to integrate the resulting hash value(s) into the block 60 of data within the private blockchain 28. Moreover, because the private data 64 may represent contractual obligations between parties, the software application 68 may further cause the blockchain 28 to include the contract identifier 32, the contractual parameters 34, and/or the verification value 52. The contract identifier 32, the contractual parameters 34, and/or the verification value 52 may be encoded as data or information contained within the block 60 of data, or the contract identifier 32, the contractual parameters 34, and/or the verification value 52 may be data or information that is separate from the block 60 of data (such as informational content in metadata or in a packet header/body). Regardless, the blockchain 28 need not include the programming code representing the digital contract 20. The blockchain 28 need only specify the contract identifier 32, the contractual parameters 34, and/or the verification value 52.

Figure 6:
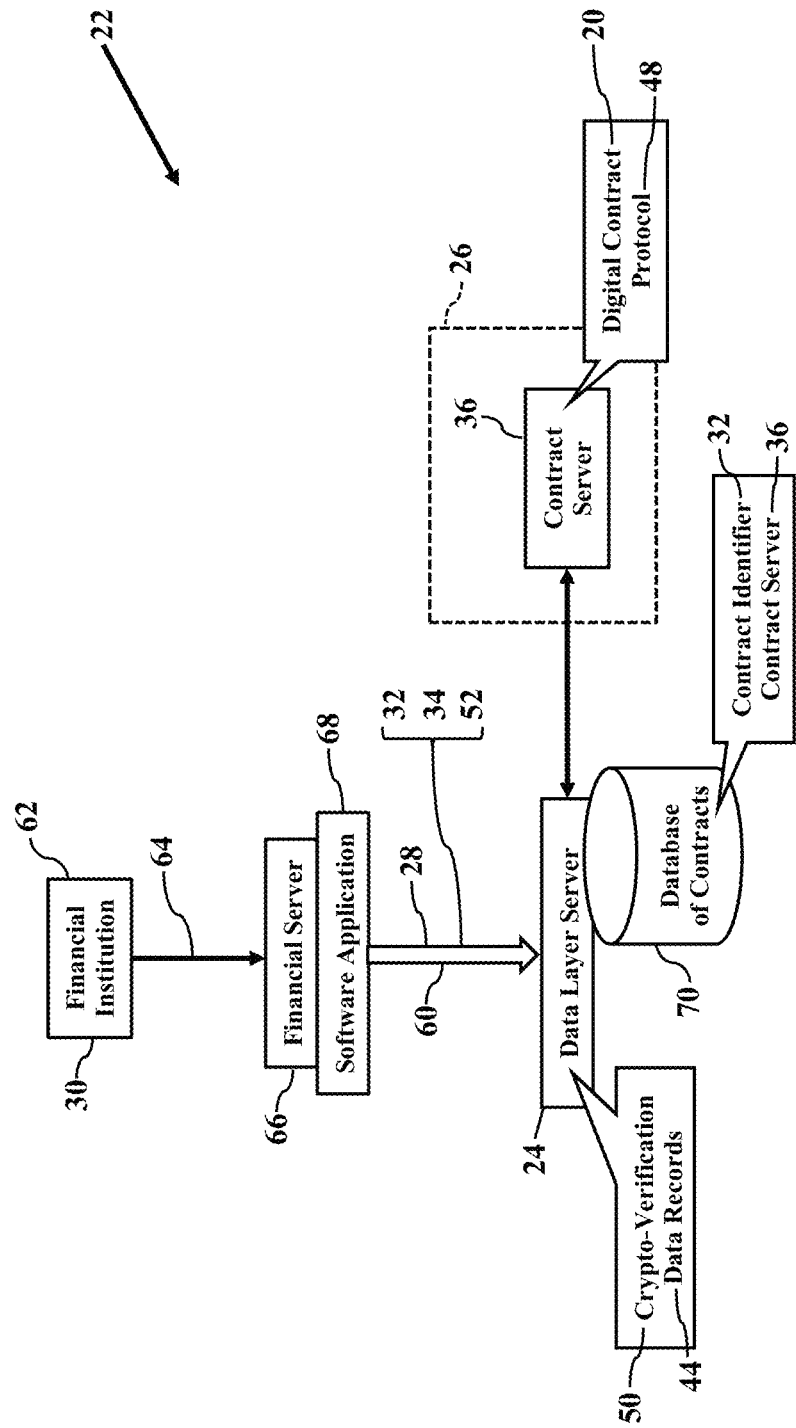

FIG. 6 illustrates the data layer server 24. The data layer server 24 may manage the execution of the digital contract 20 referenced by the contract identifier 32, the contractual parameters 34, and/or the verification value 52. For example, after the financial server 66 (executing the software application 68) generates the block 60 of data within the blockchain 28, the financial server 66 may send the blockchain 28 to the network address (e.g., Internet protocol address) associated with the data layer server 24. When the data layer server 24 receives the blockchain 28, the data layer server 24 inspects the blockchain 28 to identify the contract identifier 32, the contractual parameters 34, and/or the verification value 52. The data layer server 24 may be required to perform the cryptographic verification 50. If the cryptographic verification 50 passes, the data layer server 24 may consult an electronic database 70 of contracts. The database 70 of contracts has entries that map or relate the contract identifier 32 to its corresponding contract executioner or processor in the contract layer 26. As a simple example, suppose the contract identifier 32 maps to the network address assigned to the contract server 36. The database 70 of contracts, in other words, may identify the contract server 36 that receives the inputs associated with the digital contract 20 identified by the contract identifier 32. So, once the contract server 36 is determined, the data layer server 24 sends the inputs (e.g., the contract identifier 32, the contractual parameters 34, and/or the verification value 52) to the contract server 36. The contract server 36 thus applies the inputs (such as party names, parameters associated with their respective performance obligations and terms, and consideration) to the computer file or other programming code representing the digital contract 20. Again, then, the blockchain 28 need only reference the digital contract 20 (using the contract identifier 32 and/or the contractual parameters 34). The actual execution of the digital contract 20 may be offloaded or outsourced to the contract server 36. The data layer server 24 may also generate the data records 44 describing the remote assignment to the contract server 36.

The data layer server 24 may thus outsource contractual performance. The data layer server 24 may only manage the execution of the digital contract 20 referenced by the contract identifier 32 and/or the contractual parameters 34. That is, the data layer server 24 may outsource the execution of the digital contract 20 to the contract layer 26 as a vendor, a supplier, or a subcontractor process. Again, when the data layer server 24 receives the blockchain 28, the data layer server 24 inspects the blockchain 28 to identify the contract identifier 32 and/or the contractual parameters 34. The data layer server 24 may then consult the database 70 of contracts. Here, though, the database 70 of contracts has entries that map or relate the contract identifier 32 to a network resource within the contract layer 26 that processes and/or executes the digital contract 20 as a service (perhaps as a software-as-a-service or "SAAS"). The network resource may thus be a remote server, a virtual machine, a web page or web server, a client device/machine, or other resource that executes the digital contract 20. Once the network resource is determined, the data layer server 24 may retrieve and send the contractual parameters 34 to the network resource for execution. The network resource 232 (perhaps operated on behalf of a third party) applies the parameters defined or described by the contractual parameters 34 to the programming code representing the digital contract 20.

Exemplary embodiments thus only need to identify the digital contract 20. The contract identifier 32 and the contractual parameters 34 need only be informational content in the private blockchain 28. The contract identifier 32 is any digital identifying information that uniquely identifies or references the digital contract 20. The contract identifier 32 may be an alphanumeric combination that uniquely identifies a vendor and/or version of the digital contract 20 and/or a processor or executioner of the digital contract 20. The contract identifier 32 may be expressed as a unique hash value that is included within, or specified by, the private blockchain 28. Similarly, the contractual parameters 34 may identify the parties to the digital contract 20, their respective performance obligations and terms, and consideration.

Figure 7:
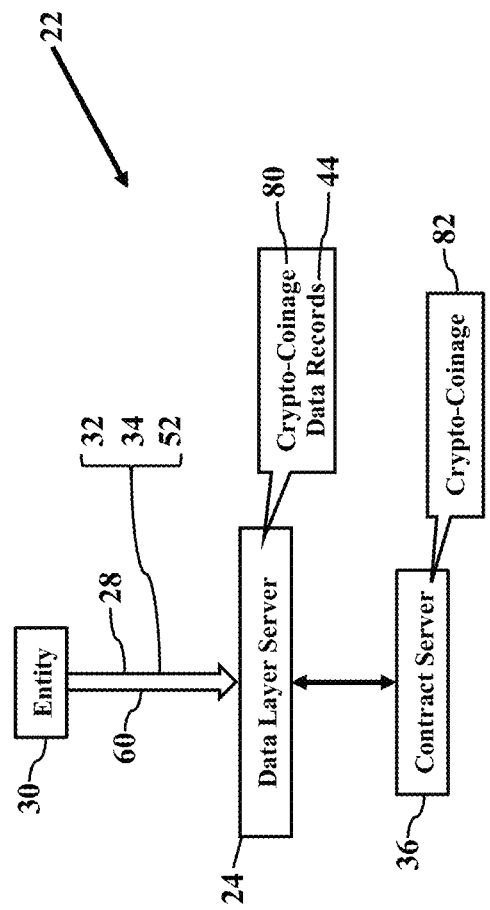

FIG. 7 illustrates service compensation. When the digital contract 20 is executed, the contract layer 26 and/or the contract server 36 may be paid for rendering or providing the processing service. While there are many compensation schemes, this disclosure mostly explains crypto-compensation. That is, as the digital contract 20 is processed, the data layer server 24 and the contract server 36 may exchange, trade, or transfer cryptographic currencies. Suppose, for example, that the data layer server 24 has its own cryptographic coinage 80, and also suppose that the contract layer 26 may have its own cryptographic coinage 82. The data layer server 24 and the contract server 36 may establish entity-specific electronic tokens 80 and 82 to access and/or to use the data records 44 and/or other processing services.

The cryptographic coinage 80 and 82 may thus be control mechanisms. While the cryptographic coinage 80 and 82 may have any functional scheme, private credit tokens and private tradeable tokens may be used. The cryptographic coinage 80 and 82 may be acquired and then spent or burned when accessing the data layer server 24 and the contract server 36. The credit tokens, in other words, represents any credit-based entry system, and the tradeable token, on the other hand, may be generated for transfer among others. The cryptographic coinage 80 and 82 may be generated to be traded and/or spent. Exemplary embodiments may thus trade or exchange crypto-compensation. That is, when the digital contract 20 is executed, perhaps the data layer server 24 and the contract server 36 exchange, trade, or transfer their respective cryptographic coinage 80 and 82.

The digital contract 20 is thus a computer program or code that verifies and/or enforces negotiation and/or performance of a contract between parties. One fundamental purpose of so-called smart contracts is to integrate the practice of contract law and related business practices with electronic commerce protocols between parties or devices via the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others. Smart contract infrastructure can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators.

Figure 8:
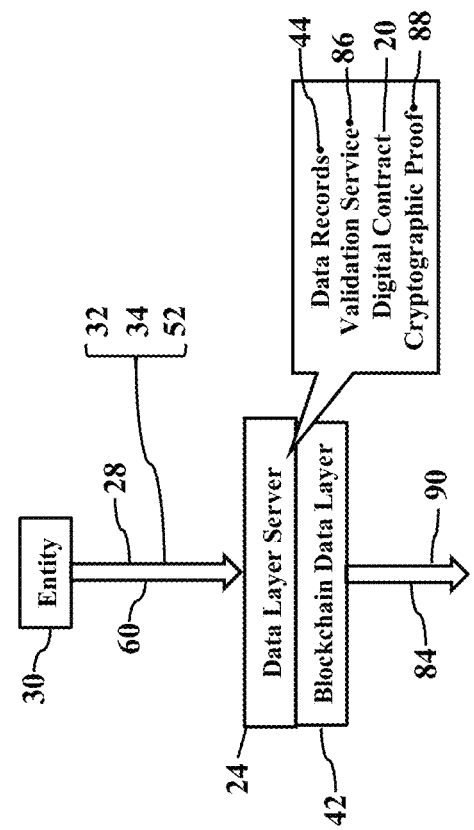

FIG. 8 further illustrates the data layer server 24. When the data layer server 24 receives the blockchain 28, the data layer server 24 may generate the data records 44 in the blockchain data layer 42, as later paragraphs will explain. Moreover, the blockchain data layer 42 may also add another layer of cryptographic hashing to generate a public blockchain 84. The blockchain data layer 42 acts as a validation service 86 that validates the digital contract 20 was executed. Moreover, the blockchain data layer 42 may generate a cryptographic proof 88. The public blockchain 84 thus publishes the cryptographic proof 88 as a public ledger 90 that establishes chains of blocks of immutable evidence.

The data layer server 24 documents transactions. The data records 44 in the blockchain data layer 42 log whenever the data layer server 24 calls or requests the contract layer 26. The data records 44 also log the service responses 40 and service updates 46 (as explained with reference to FIG. 3). The data records 44 also log any cryptographic coinage 80 and 82 paid or exchanged between the data layer server 24 and the contract server 36. The data records 44 in the blockchain data layer 42 document any transactions and publishes ownership and transfer proofs 88. The data records 44 may document any payments, earnings, or awards for processing or executing a portion of, or entirely, the digital contract 20. The cryptographic coinage 80 and 82 may thus be uniquely associated with a party to the digital contract 20 and/or with a service provider/processor of the digital contract 20. The data records 44 may document the parties to the digital contract 20, a transactional description describing a transaction governed by the digital contract 20, and any financial or performance terms. The data records 44 may thus document an offer, an acceptance, a consideration, and terms. The data records 44 may document any creation, generation, and/or conveyance of the cryptographic coinage 80 and 82. The blockchain data layer 42 may thus publish the proofs 88 of the digital contract 20 and any cryptographic coinage 80 and 82 paid or exchanged for execution and performance.

Exemplary embodiments thus present elegant solutions. Any entity 30 may create its own private blockchain 28 and offer or present the digital contract 20 for self-execution. The entity 30 may then establish or create cryptographic coinage for using, accessing, or processing the entity's private blockchain 28 and/or the digital contract 20. The entity's cryptographic coinage may have value, thus fostering a market for entity-specific tradeable assets in the blockchain environment 22. The entity's cryptographic coinage may thus drive demand to use the digital contracts 20.

Figure 9:
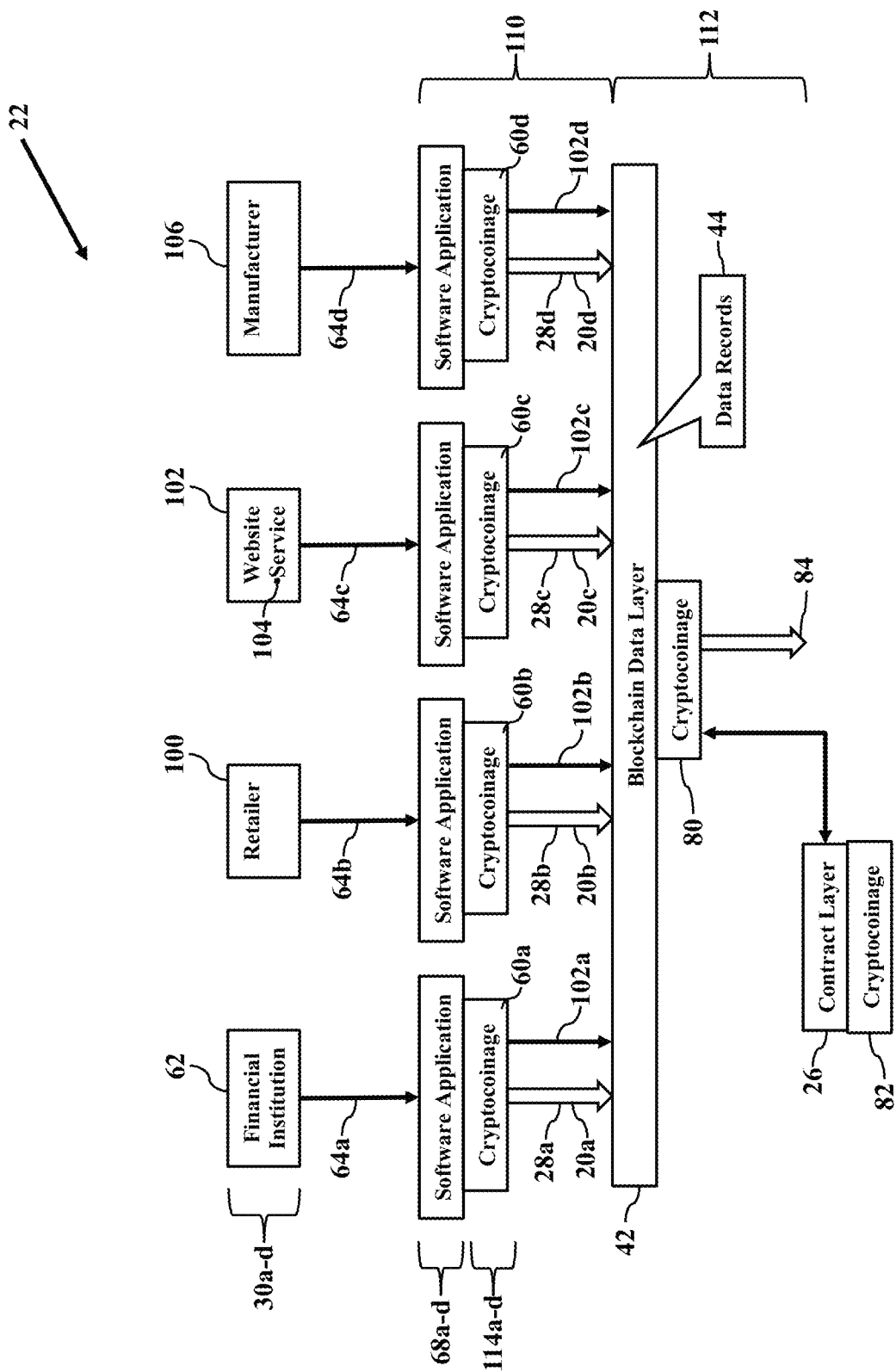

FIG. 9 expands the entity concept. Here multiple, different entities 30a-d provide their respective software applications 68a-d that encrypt their respective private data 64a-d as their individual, private blockchains 28a-d. While exemplary embodiments may be applied to any number of industries or services, FIG. 9 illustrates a simple example of four (4) different entities 30a-d. First entity 30a, for example, again represents the bank, lender, or other financial institution 62 that encrypts its private data 64a as its private blockchain 28a. Second entity 30b represents any retailer 100 (such as HOME DEPOT®, KOHL'S®, or WALMART®) that encrypts its private data 64b as its private blockchain 28b. Third entity 30c represents a website 102 offering a service 104 (such as AMAZON®, NETFLIX®, or GOOGLE®) that encrypts its private data 64c as the private blockchain 28c. Fourth entity 30d represents an automotive or other manufacturer or supplier 106 (such as FORD®, TOYOTA®, or DELPHI®) that encrypts its private data 64d as the private blockchain 28d. The entities 30a-d thus use their respective software applications 68a-d to provide a first layer 110 of cryptographic hashing. The entities 30a-d may also use their respective software applications 68a-d to issue their own private and entity-specific cryptocoinage 80a-d. Each entity 30a-d may then send their respective private blockchains 28a-d to the blockchain data layer 42, and the blockchain data layer 42 may outsource or subcontract execution of their respective digital contracts 20a-d to the contract layer 26. Moreover, the blockchain data layer 42 may add a second layer 112 of cryptographic hashing to the data records 44. The blockchain data layer 42 thus generates the public blockchain 84 as a public resource or utility for record keeping. Any entity 30 that subscribes to the blockchain data layer 42 (such as by acquiring and/or spending the cryptocoinage 80) may thus access, read, and/or download the data records 44 or their proofs 88 of its private data 64 to the public blockchain 84. The blockchain data layer 42, in other words, acts as the public ledger 90 that establishes chain of blocks of immutable evidence.

As FIG. 9 also illustrates, each entity 30a-d may establish its own private cryptocoinage 114a-d. Each entity's private software application 68a-d may create and/or issue its cryptocoinage 114a-d. Each entity 30a-d may also establish its own usage restrictions and value according to rules governing ownership, trade, and other policies. Each entity 30a-d may generate and sends its respective transaction records to the blockchain data layer 42 for documentation.

As FIG. 9 further illustrates, each entity 30a-d may also specify their respective digital contract 20a-d. When any of the private blockchains 28a-d is received, the blockchain data layer 42 may coordinate execution of any digital contract 20a-d. The blockchain data layer 42, for example, may inspect any private blockchain 28a-d and identify any information associated with the digital contract 20a-d. The blockchain data layer 42 may then execute the digital contract 20a-d, and/or the blockchain data layer 42 may identify a service provider that executes the digital contract 20a-d. The blockchain data layer 42, in other words, may manage the execution of the digital contracts 20a-d according to a subcontractor relationship. A provider of the blockchain data layer 42 may then be compensated via any entity's cryptocoinage 80a-d and/or the blockchain data layer's cryptocoinage 80. Moreover, the contract layer 26 may have its own cryptocoinage 82, and the contract layer 26 may be compensated via any entity's cryptocoinage 80a-d and/or the blockchain data layer's cryptocoinage 80.

Accounts may be agnostic. Any user of the blockchain data layer 42 and/or the contract layer 26 may authenticate. Once authenticated, the user need only enter or provide a cryptographic address to access any of the cryptocoinage 80, 82, and/or 114. The single cryptographic address, in other words, allows the user to access her account and balance for any of the cryptocoinage 80, 82, and/or 114. The user may thus easily conduct transactions between the cryptocoinage 80, 82, and/or 114. The user, for example, may fuel or replenish its supply of the cryptocoinage 80, 82, and/or 114, perhaps by redeeming or exchanging one for another (perhaps according to an exchange rate or other value). Similarly, the provider of the blockchain data layer 42 may fuel or replenish its supply of the cryptocoinage 80, 82, and/or 114 by purchase or exchange. The provider of the contract layer 26 may fuel or replenish its supply of the cryptocoinage 80, 82, and/or 114 by purchase or exchange. The data records 44 confirm the processing and/or execution of the digital contract 20a-d, so the data records 44 propagate into the blockchain data layer 42 for public disclosure via the public blockchain 84. Any user that successfully authenticates may access a full accounting of his or her digital cryptocoinages 80, 82, and/or 114 and any digital contracts 20, perhaps according to the respective single cryptographic address. The user may thus buy, sell, trade, and/or redeem any entity-specific cryptocoinages 80, 82, and/or 114. The user may buy or sell any entity's coins or replenish credits. The user may also track performance or obligations defined by the digital contracts 20a-d and any payments or consideration received or paid.

Exemplary embodiments thus present another elegant solution. Accounting balances and payments and transactions may utilize a filling station as another service offered by the blockchain data layer 42. Because all the data records 44 in the blockchain data layer 42 are identifiable (perhaps via a single cryptographic address), the filling station can present the summary of the user's credit tokens and tradeable tokens. The filling station may thus provide a single or universal electronic wallet for all of a user's digital coinage and credits, regardless of the issuing entity 30a-d. The user may thus only perform a single authentication to the blockchain data layer 42 and access all her cryptofunds.

Figure 10:
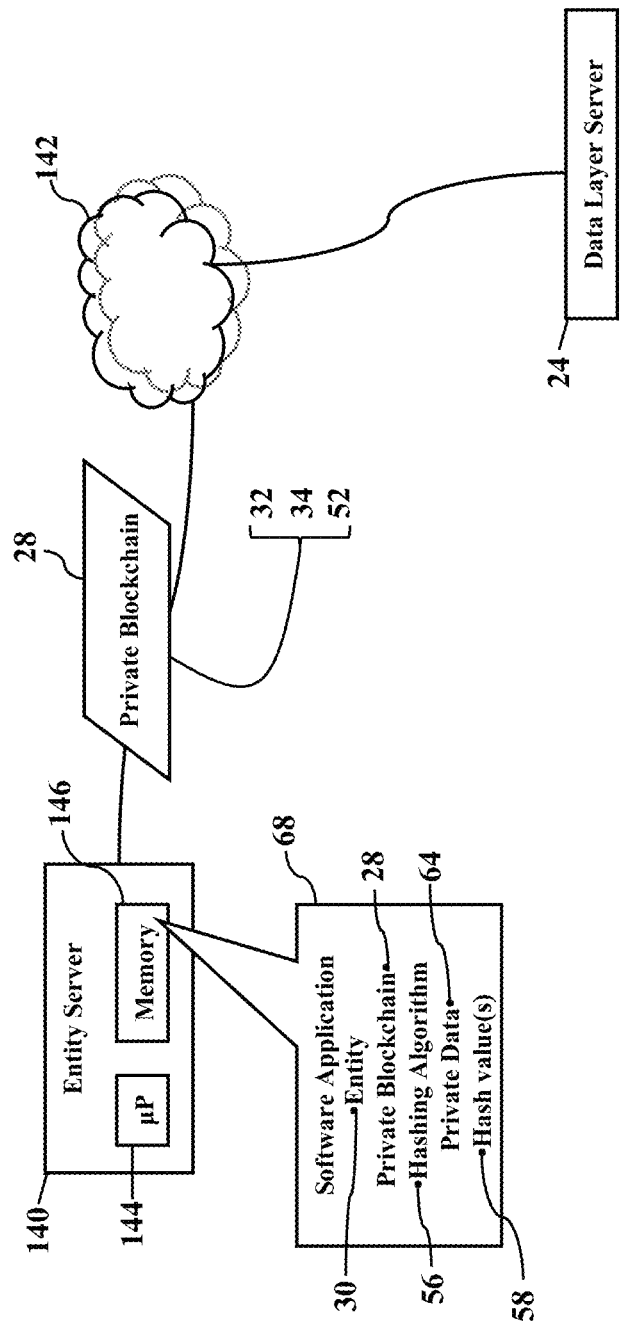
FIGS. 10-13 are more detailed illustrations of an operating environment, according to exemplary embodiments.

FIGS. 10-13 are more detailed illustrations of an operating environment, according to exemplary embodiments. FIG. 10 illustrates an entity server 140 communicating with the data layer server 24 via a communications network 142. The entity server 140 operates on behalf of the entity 30 and generates the entity's private blockchain 28 (such as the financial server 66 explained with reference to FIGS. 4-5 & 9). The entity server 140, in other words, has a processor 144 (e.g., "μP"), application specific integrated circuit (ASIC), or other component that executes the entity's software application 68 stored in a local solid-state memory device 146. The entity server 140 has a network interface to the communications network 142, thus allowing two-way, bidirectional communication with the data layer server 24. The entity's software application 68 includes instructions, code, and/or programs that cause the entity server 140 to perform operations, such as calling, invoking, and/or applying an electronic representation of the hashing algorithm 56 to the entity's private data 64. The hashing algorithm 56 thus generates one or more hash values 58, which are incorporated into the entity's private blockchain 28. The entity's software application 68 then instructs the entity server 140 to send the private blockchain 28 via the communications network 142 to a network address (e.g., Internet protocol address) associated with the data layer server 24.

The digital contract 20 may also be identified. The entity's software application 68 may also instruct the entity server 140 to specify the digital contract 20 as informational content in the private blockchain 28. For example, the digital contract 20 may be identified by the contract identifier 32 and contractual parameters 34. The contract identifier 32 is any digital identifying information that uniquely identifies or references the digital contract 20. The contract identifier 32 may be an alphanumeric combination that uniquely identifies a vendor and/or version of the digital contract 20 and/or a processor or executioner of the digital contract 20. The contract identifier 32 may also be one of the unique hash values 58 (perhaps generated by the hashing algorithm 56) that is included within, or specified by, the private blockchain 28. Similarly, the contractual parameters 34 may identify the parties to the digital contract 20, their respective performance obligations and terms, and consideration.

The verification value 52 may also be specified. The entity's software application 68 may also instruct the entity server 140 to specify the verification value 52 as informational content in the private blockchain 28. The verification value 52 preferably represents the entity 30 sending the blockchain 28. The verification value 52 may additionally or alternatively be any alphanumeric or binary value representing any party, or multiple parties, to the digital contract 20. As another simple example, the verification value 52 may represent a buyer and/or a seller/supplier in a contractual relationship described by the digital contract 20. The verification value 52 may represent a good or service described by the digital contract 20 or consideration described by the digital contract 20. The verification value 52 may represent any of the contractual parameters 34 associated with the digital contract 20. Whatever the verification value 52, if the verification value 52 can be verified, then the data layer server 24 may be authorized to execute the digital contract 20.

Figure 11:
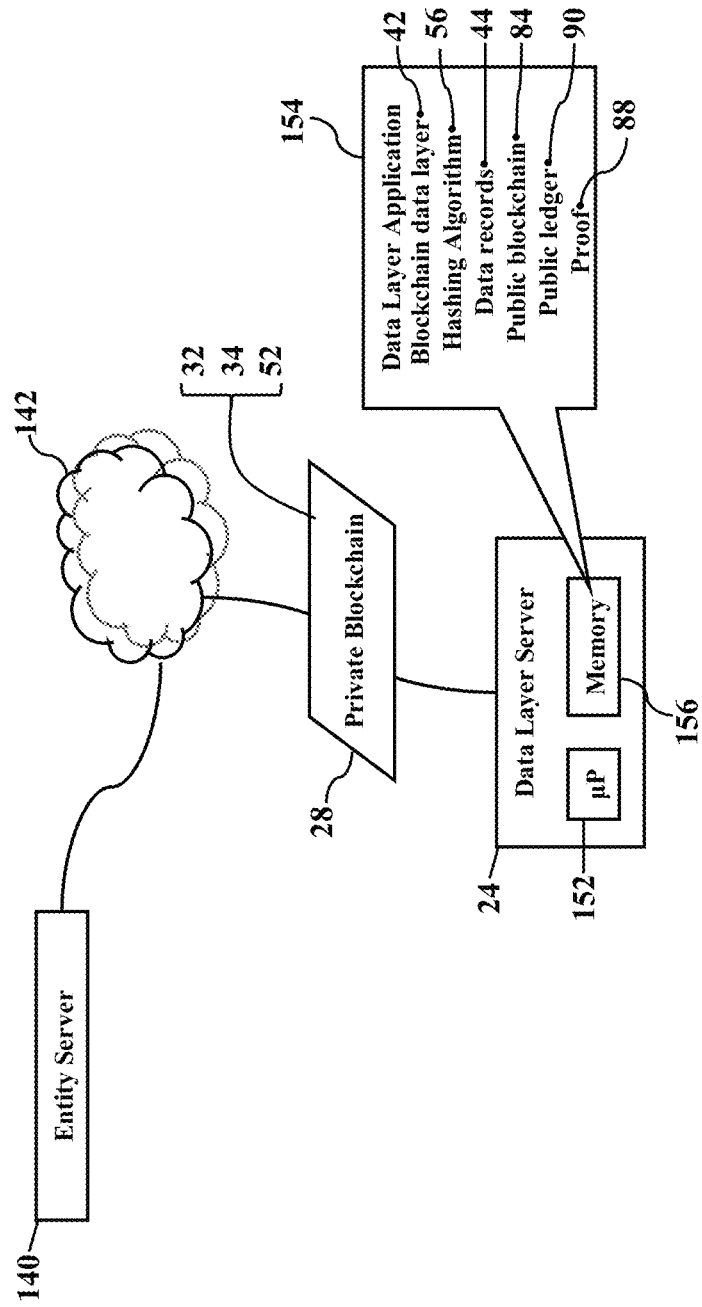

FIG. 11 illustrates the blockchain data layer 42. The data layer server 24 has a processor 152 (e.g., "μP"), application specific integrated circuit (ASIC), or other component that executes a data layer application 154 stored in a local solid-state memory device 156. The data layer server 24 has a network interface to the communications network 142. The data layer application 154 includes instructions, code, and/or programs that cause the data layer server 24 to perform operations, such as receiving the entity's private blockchain 28, the contract identifier 32, the contractual parameters 34, and/or the verification value 52. The data layer application 154 then causes the data layer server 24 to generate the blockchain data layer 42. The data layer application 154 may optionally call, invoke, and/or apply the hashing algorithm 56 to the data records 44 contained within the blockchain data layer 42. The data layer application 154 may also generate the public blockchain 84. The data layer application 154 may thus generate the public ledger 90 that publishes, records, or documents the digital contract 20, the contract identifier 32, the contractual parameters 34, and/or the verification value 52. Indeed, if the data layer application 154 processes and/or manages the digital contract 20, the data records 44 may document any processing or execution, and the data layer application 154 may optionally apply the hashing algorithm 56 to the data records 44 to generate the cryptographic proof 88 of the digital contract 20.

Figure 12:
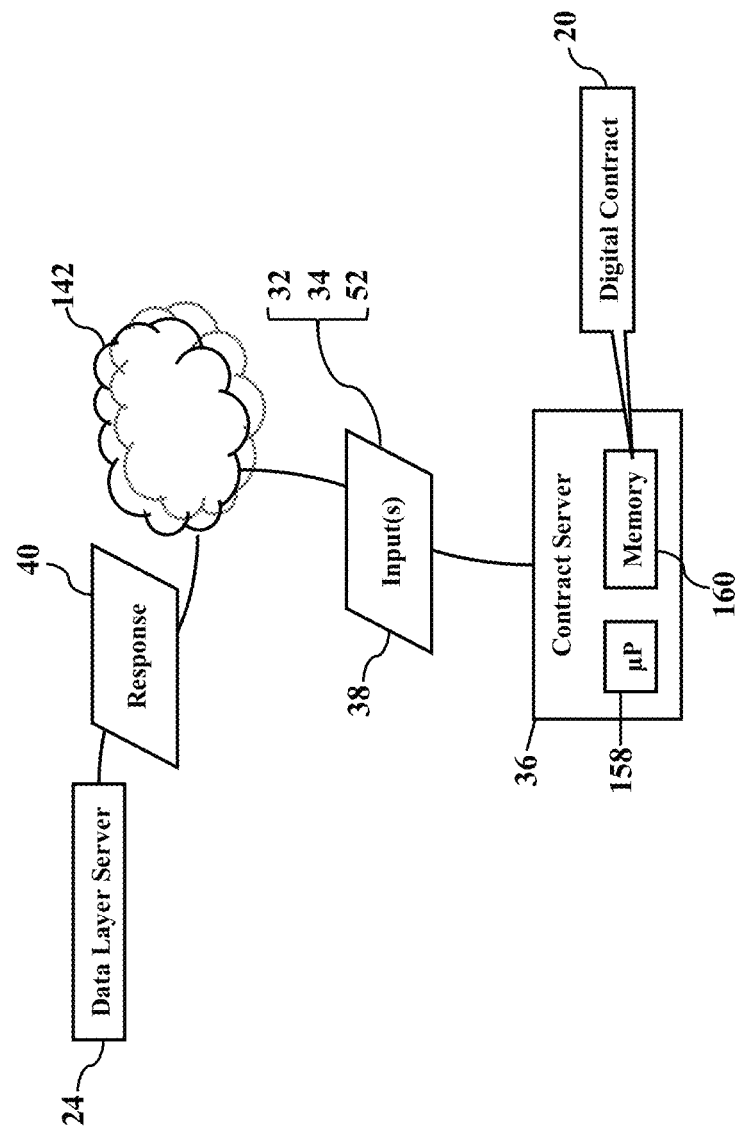

FIG. 12 illustrates the contract server 36. The contract server 36 has a processor 158 (e.g., "μP"), application specific integrated circuit (ASIC), or other component that executes the digital contract 20 stored in a local solid-state memory device 160. The data layer server 24 has a network interface to the communications network 142. The digital contract 20 may also include instructions, code, and/or programs that cause the contract server 36 to perform operations, such as receiving the inputs specified by the service request 38, applying the inputs to the programming or code representing the digital contract 20, and sending the service response 40 back to the network address assigned to or associated with the data layer server 24.

Figure 13:
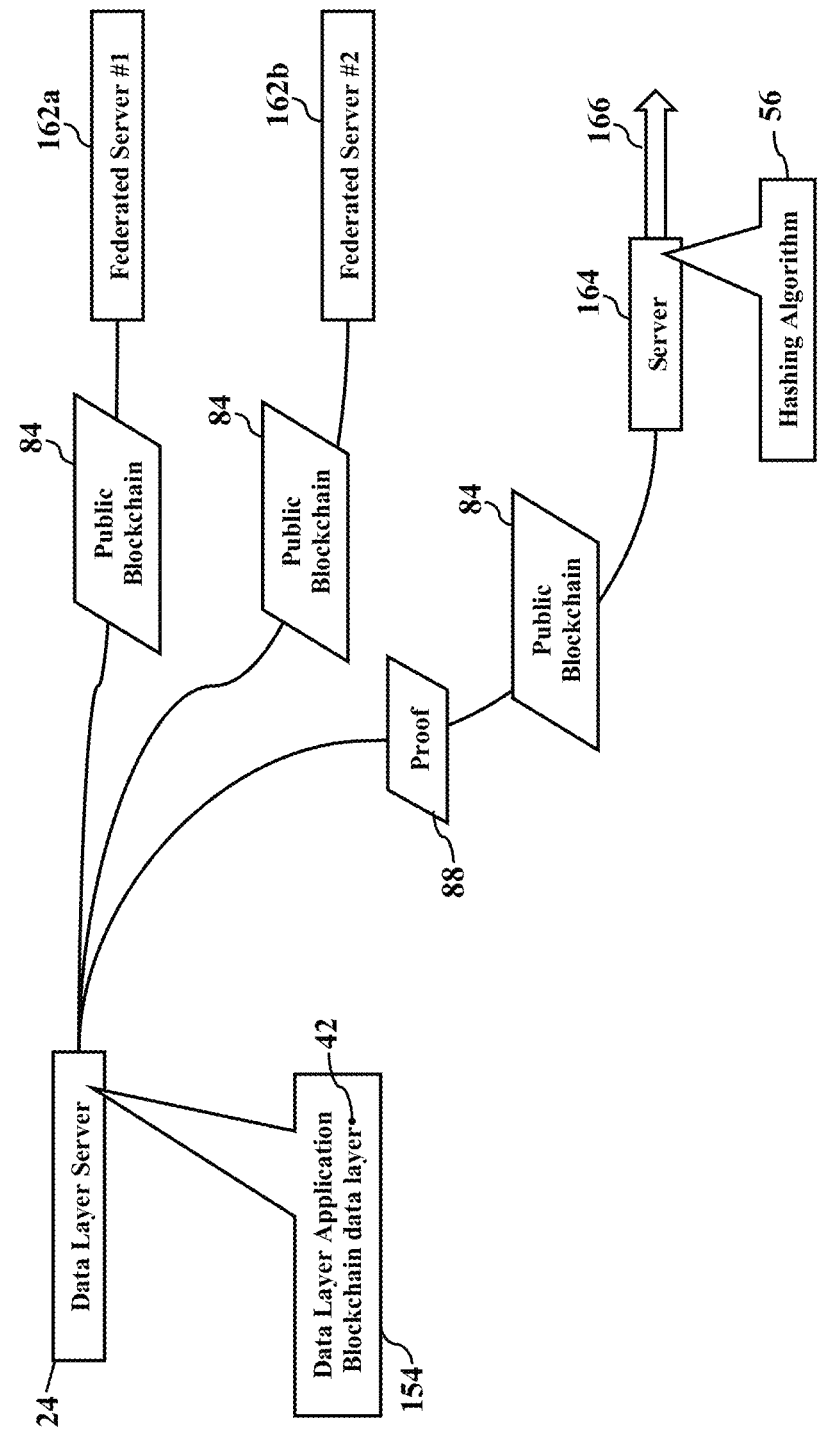

FIG. 13 illustrates additional publication mechanisms. Once the blockchain data layer 42 is generated, the blockchain data layer 42 may be published in a decentralized manner to any destination. The data layer server 24, for example, may generate and distribute the public blockchain 84 (via the communications network 142 illustrated in FIGS. 11-12) to one or more federated servers 162. While there may be many federated servers 162, for simplicity FIG. 13 only illustrates two (2) federated servers 162*a* and 160*b*. The federated servers 162*a* and 162*b* provide a service and, in return, they are compensated according to a compensation or services agreement or scheme.

Exemplary embodiments include still more publication mechanisms. For example, the cryptographic proof 88 and/or the public blockchain 84 may be sent (via the communications network 142 illustrated in FIGS. 11-12) to a server 164. The server 164 may then add another, third layer of cryptographic hashing (perhaps using the hashing algorithm 56) and generate another or second public blockchain 166. While the server 164 and/or the public blockchain 166 may be operated by, or generated for, any entity, exemplary embodiments may integrate another cryptographic coin mechanism. That is, the server 164 and/or the public blockchain 166 may be associated with BITCOIN®, ETHEREUM®, RIPPLE®, or other cryptographic coin mechanism. The cryptographic proof 88 and/or the public blockchain 84 may be publicly distributed and/or documented as evidentiary validation. The cryptographic proof 88 and/or the public blockchain 84 may thus be historically and publicly anchored for public inspection and review.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When the entity server 140 and the data layer server 24 communicate via the communications network 142, the entity server 140 and the data layer server 24 may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Figure 14:
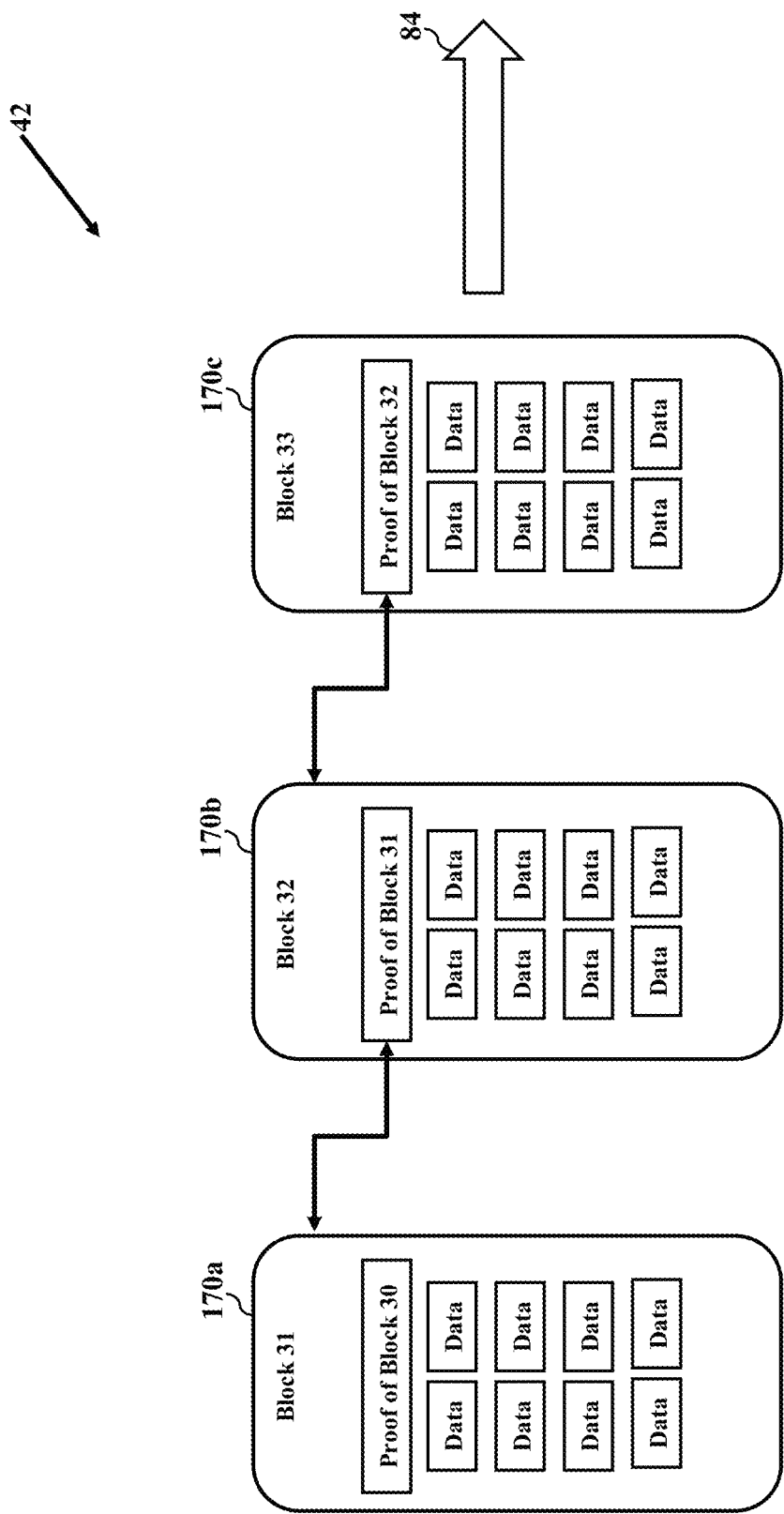
FIGS. 14-18 illustrate a blockchain data layer, according to exemplary embodiments.

FIGS. 14-18 further illustrate the blockchain data layer 42, according to exemplary embodiments. The blockchain data layer 42 chains hashed directory blocks 170 of data into the public blockchain 84. For example, the blockchain data layer 42 accepts input data (such as the entity's private blockchain 28 illustrated in FIGS. 1-10) within a window of time. While the window of time may be configurable from fractions of seconds to hours, exemplary embodiments use ten (10) minute intervals. FIG. 14 illustrates a simple example of only three (3) directory blocks 170*a-c* of data, but in practice there may be millions or billions of different blocks. Each directory block 184 of data is linked to the preceding blocks in front and the following or trailing blocks behind. The links are created by hashing all the data within a single directory block 184 and then publishing that hash value within the next directory block.

Figure 15:
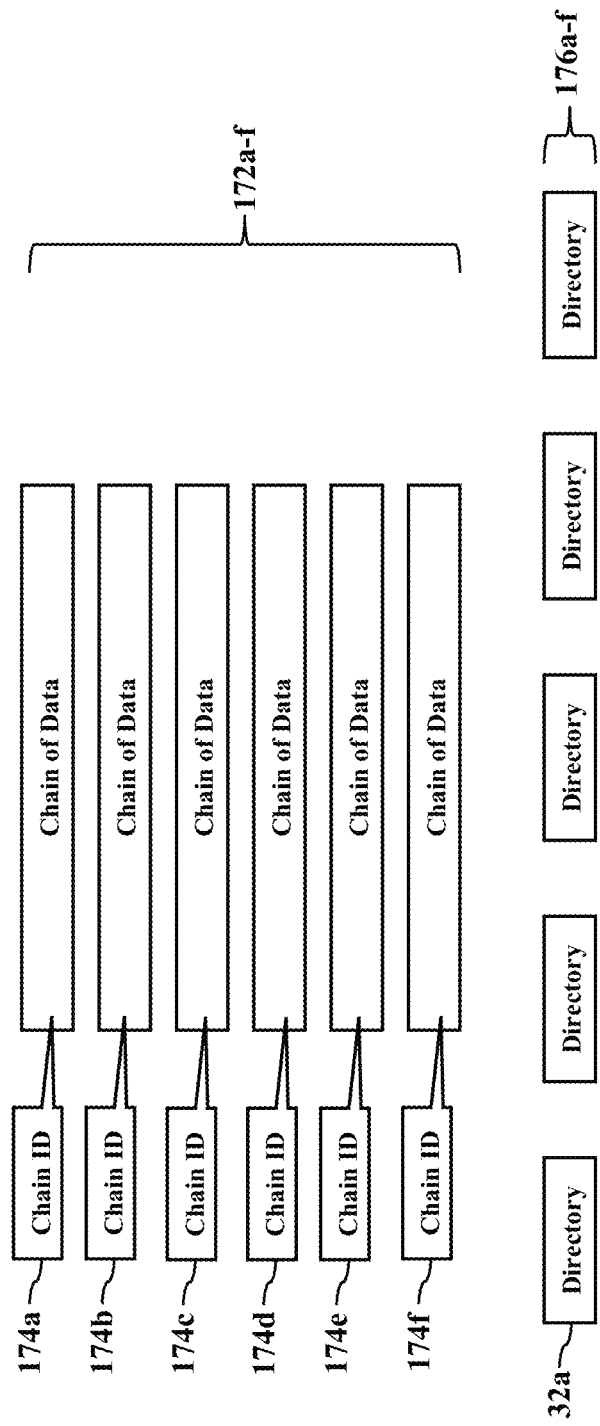

As FIG. 15 illustrates, published data may be organized within chains 172. Each chain 172 is created with an entry that associates a corresponding chain identifier 174. Each entity 30a-f, in other words, may have its corresponding chain identifier 174a-d. The blockchain data layer 42 may thus track any data associated with the entity 30a-f with its corresponding chain identifier 174a-d. New and old data in time may be associated with, linked to, identified by, and/or retrieved using the chain identifier 174a-d. Each chain identifier 174a-d thus functionally resembles a directory 176a-d (e.g., files and folders) for organized data entries according to the entity 30a-f.

Figure 16:
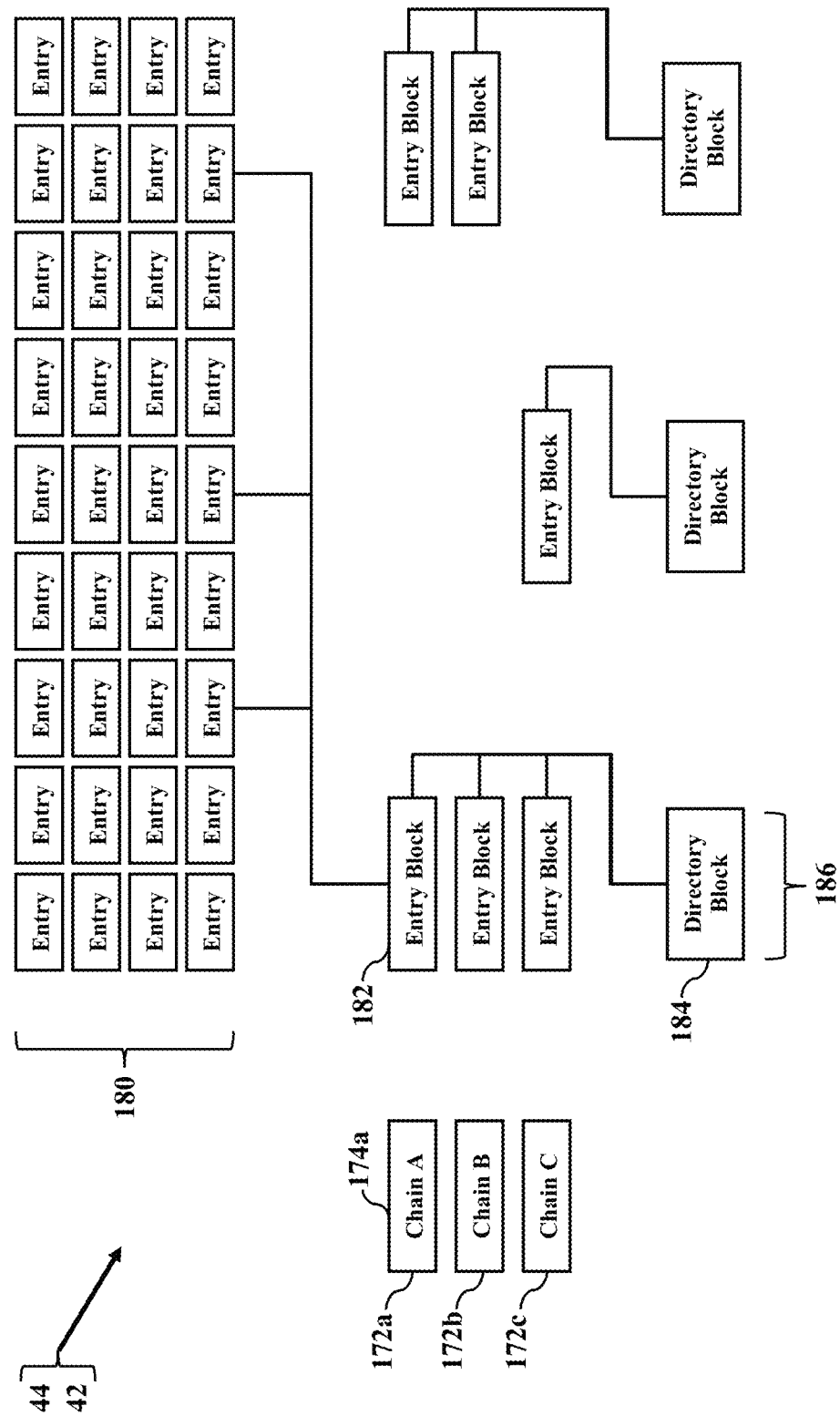

FIG. 16 illustrates the data records 44 in the blockchain data layer 42. As data is received as an input (such as the private blockchain 28 and/or the digital contract 20 illustrated in FIGS. 1-11), data is recorded within the blockchain data layer 42 as an entry 180. While the data may have any size, small chunks (such as 10 KB) may be pieced together to create larger file sizes. One or more of the entries 180 may be arranged into entry blocks 182 representing each chain 172 according to the corresponding chain identifier 174. New entries for each chain 172 are added to their respective entry block 182 (again perhaps according to the corresponding chain identifier 174). After the entries 180 have been made within the proper entry blocks 182, all the entry blocks 182 are then placed within in the directory block 184 generated within or occurring within a window 186 of time. While the window 186 of time may be chosen within any range from seconds to hours, exemplary embodiments may use ten (10) minute intervals. That is, all the entry blocks 182 generated every ten minutes are placed within in the directory block 184.

Figure 17:
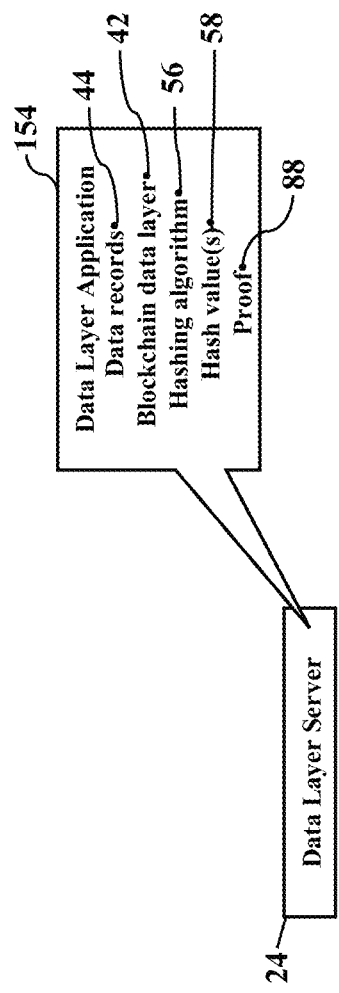

FIG. 17 illustrates cryptographic hashing. The data layer server 24 executes the data layer application 154 to generate the data records 44 in the blockchain data layer 42. The data layer application 154 may then instruct the data layer server 24 to execute the hashing algorithm 56 on the data records 44 (such as the directory block 184 illustrated in FIGS. 14-16). The hashing algorithm 56 thus generates the one or more hash values 58 as a result, and the hash values 58 represent the hashed data records 44. As one example, the blockchain data layer 42 may apply a Merkle tree analysis to generate a Merkle root (representing a Merkle proof 88) representing each directory block 184. The blockchain data layer 42 may then publish the Merkle proof 88 (as this disclosure explains).

Figure 18:
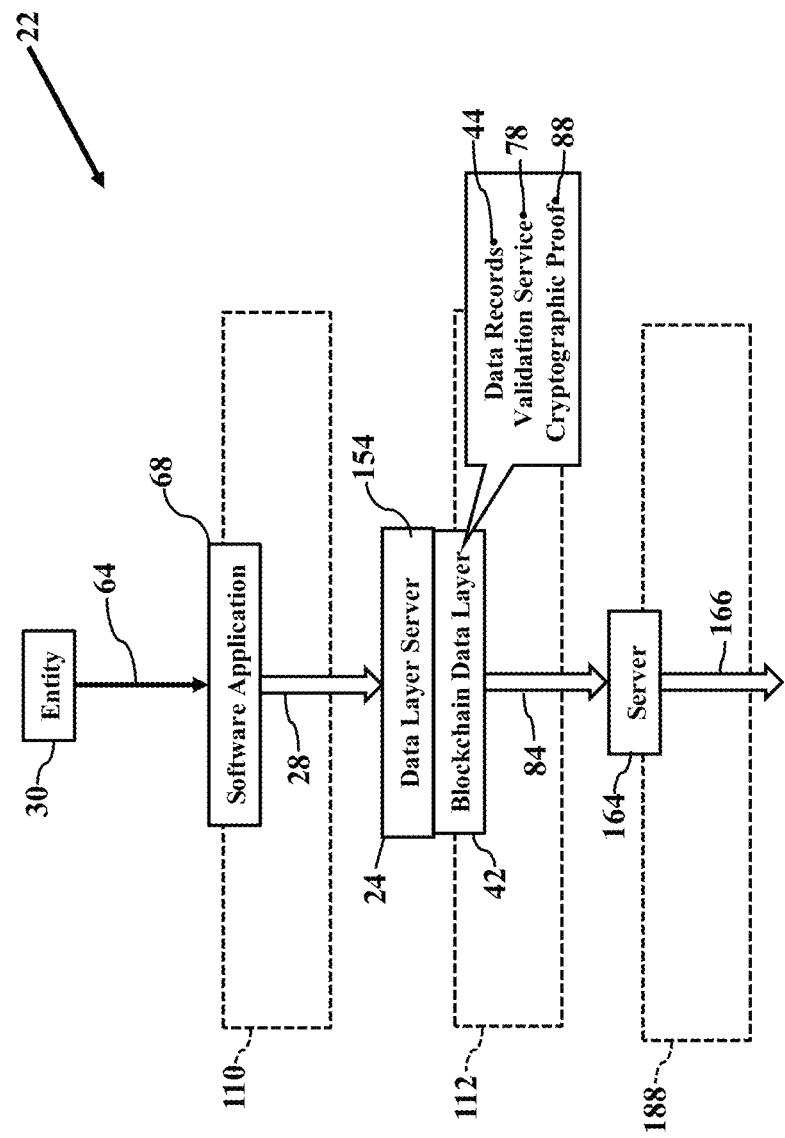

FIG. 18 illustrates hierarchical hashing. The entity's private software application 68 provides the first layer 110 of cryptographic hashing and generates the private blockchain 28. The entity 30 then sends its private blockchain 28 (perhaps referencing or specifying the digital contract 20) to the data layer server 24. The data layer server 24, executing the data layer application 154, generates the blockchain data layer 42. The data layer application 154 may optionally provide the second or intermediate layer 112 of cryptographic hashing to generate the cryptographic proof 88. The data layer application 154 may also publish any of the data records 44 as the public blockchain 84, and the cryptographic proof 88 may or may not also be published via the public blockchain 84. The public blockchain 84 and/or the cryptographic proof 88 may be optionally sent to the server 164 as an input to yet another public blockchain 166 (again, such as BITCOIN®, ETHEREUM®, or RIPPLE®) for a third layer 188 of cryptographic hashing and public publication. The first layer 110 and the second layer 112 thus ride or sit atop a conventional public blockchain 166 (again, such as BITCOIN®, ETHEREUM®, or RIPPLE®) and provide additional public and/or private cryptographic proofs 88.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

Figure 19:
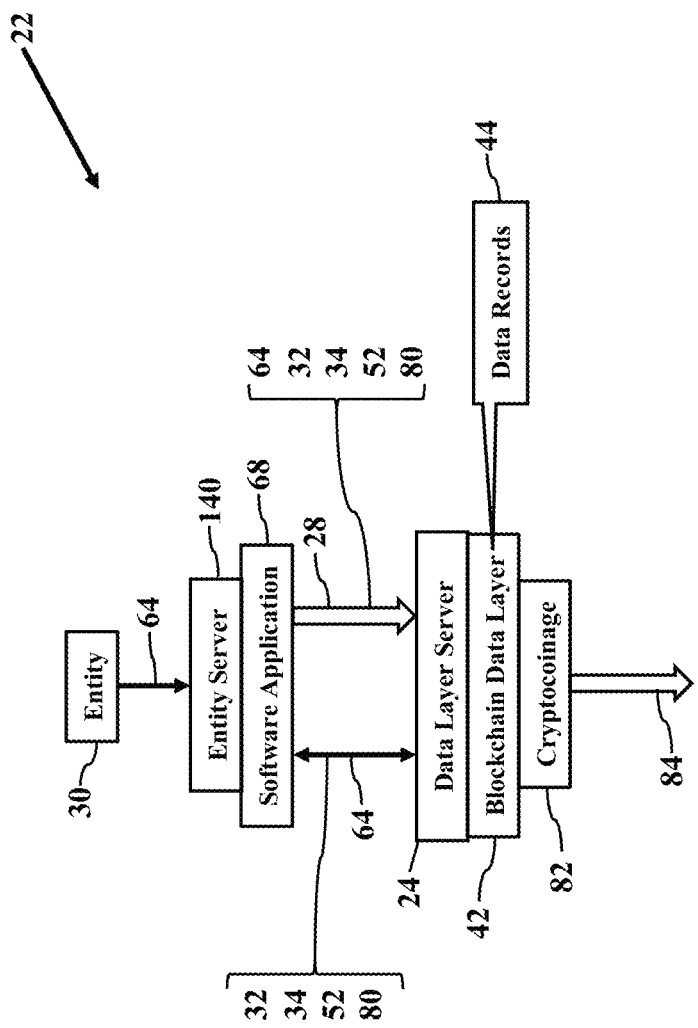
FIGS. 19-20 are more detailed illustrations of the digital contract, according to exemplary embodiments.
Figure 20:
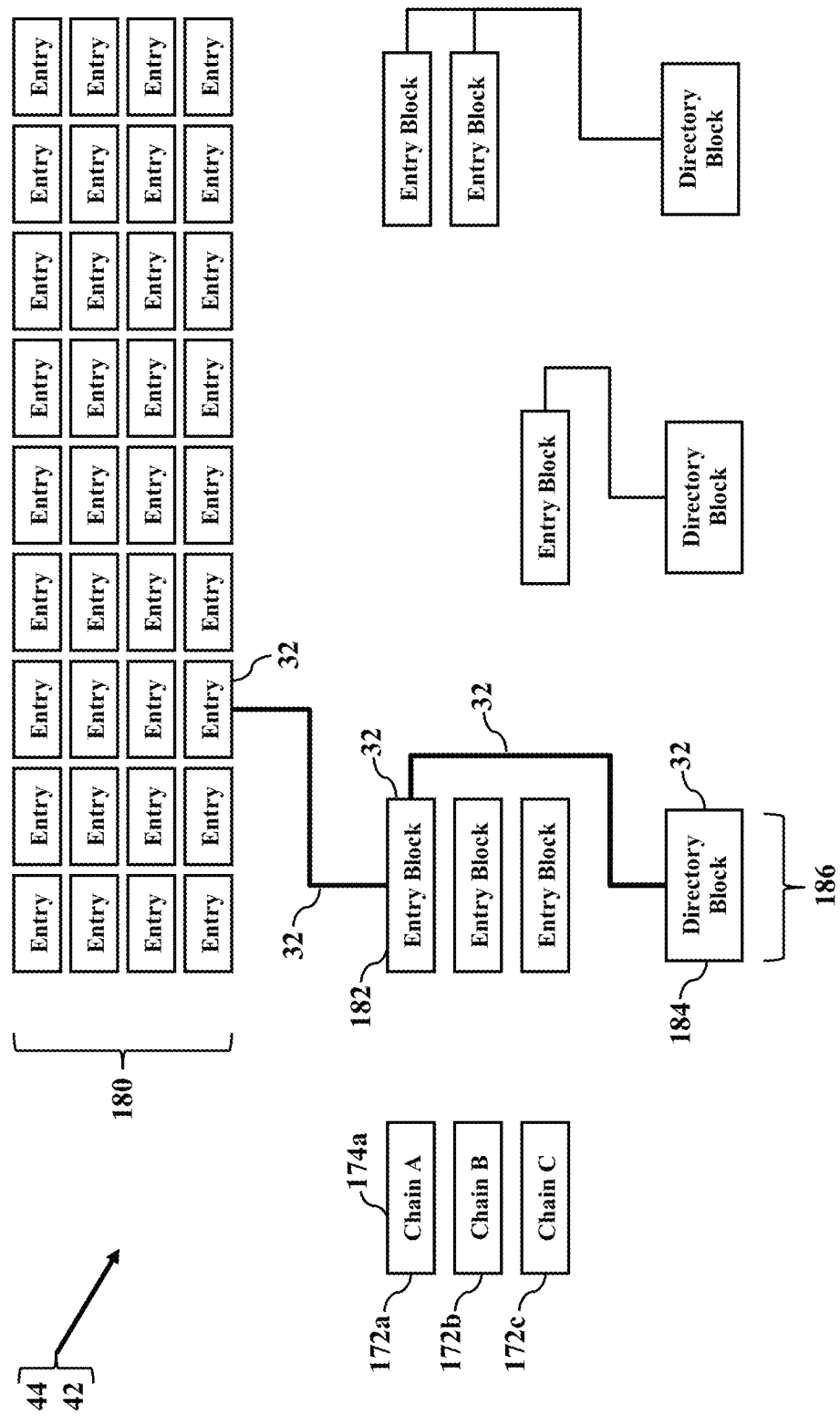

FIGS. 19-20 are more detailed illustrations of the digital contract 20, according to exemplary embodiments. The private entity 30 sends its private blockchain 28 to the network address associated with the data layer server 24 that generates the blockchain data layer 42. The private blockchain 28 may contain information representing the entity's private data 64, the contract identifier 32, the contractual parameters 34, and/or the verification value 52. The entity's private data 64, the contract identifier 32, the contractual parameters 34, and/or the verification value 52 may additionally or alternatively be separately sent from the entity server 140 to the data layer server 24 (perhaps via the communications network 142 illustrated by FIGS. 10-12). Regardless, the entity's private cryptocoinage 80 may be associated with the entity's private data 64, the contract identifier 32, the contractual parameters 34, and/or the verification value 52. The data records 44 and/or their privately hashed blocks of data may thus specify, include, reference, and/or be associated with, and/or identified by, the entity's private data 64, the contract identifier 32, the contractual parameters 34, and/or the verification value 52. Because the contract identifier 32 (and/or its corresponding hash value) is an identifiable input to the data layer server 24 generating the blockchain data layer 42, the data records 44 may also carry or reference the contract identifier 32 and/or the contractual parameters 34. So, should the blockchain data layer 42 create or issue its own cryptocoinage 82, the cryptocoinage 82 may also reference, be identified by, or be associated with the entity's private data 64, the contract identifier 32, the contractual parameters 34, and/or the verification value 52. These data values may thus be common indicators or reference data for tracking the execution of the digital contract 20 and/or the cryptocoinage 80, 82, and/or 114. The data records 44 may thus be commonly mapped or identified to the corresponding entity's private data 64, the contract identifier 32, the contractual parameters 34, the verification value 52, and/or the cryptocoinage 80, 82, and/or 114.

FIG. 20 illustrates a simple illustration. Once the contract identifier 32 (and/or its corresponding hash value) is received, the contract identifier 32 may propagate and be recorded within the blockchain data layer 42. The contract identifier 32, for example, may be recorded in any of the entries 180. The entry 180, and thus the contract identifier 32, may then be recorded and/or arranged as the entry block 182 and placed within the directory block 184. The entry 180, the entry block 182, and the directory block 184 may thus reference, specify, or be associated with, the contract identifier 32. The contract identifier 32 has thus propagated as informational content from the private blockchain 28 and into and through the blockchain data layer 42. The contract identifier 32 thus hierarchically moves through the multiple layers of cryptographic hashing for public publication. The blockchain data layer 42 thus tracks the transaction records involving the contract identifier 32. In simple words, the blockchain data layer 42 may track contractual performance of the digital contract 20 via the data records 44 that reference or contain the contract identifier 32. Moreover, the blockchain data layer 42 may also track ownership and transfer of the cryptocoinage 80, 82, and/or 114.

Figure 21:
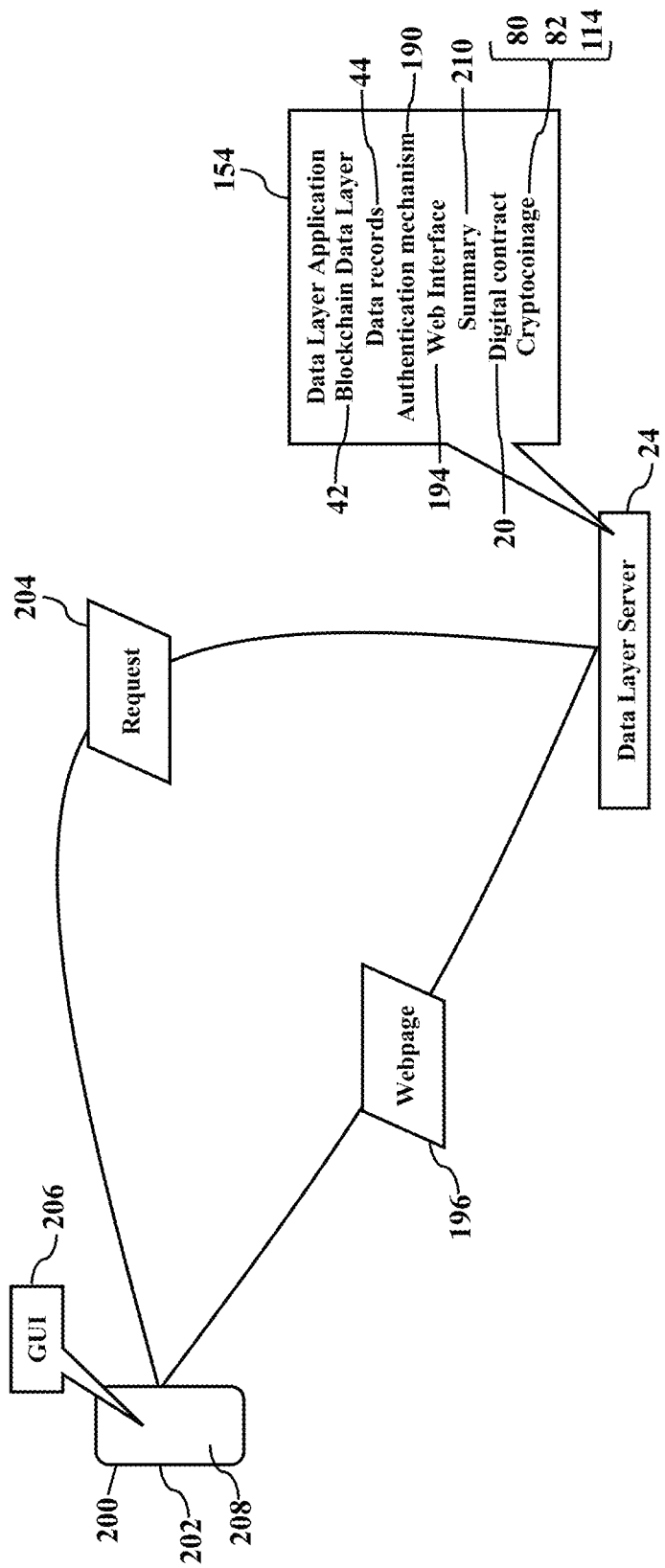
FIGS. 21-22 illustrate an access mechanism, according to exemplary embodiments.
Figure 22:
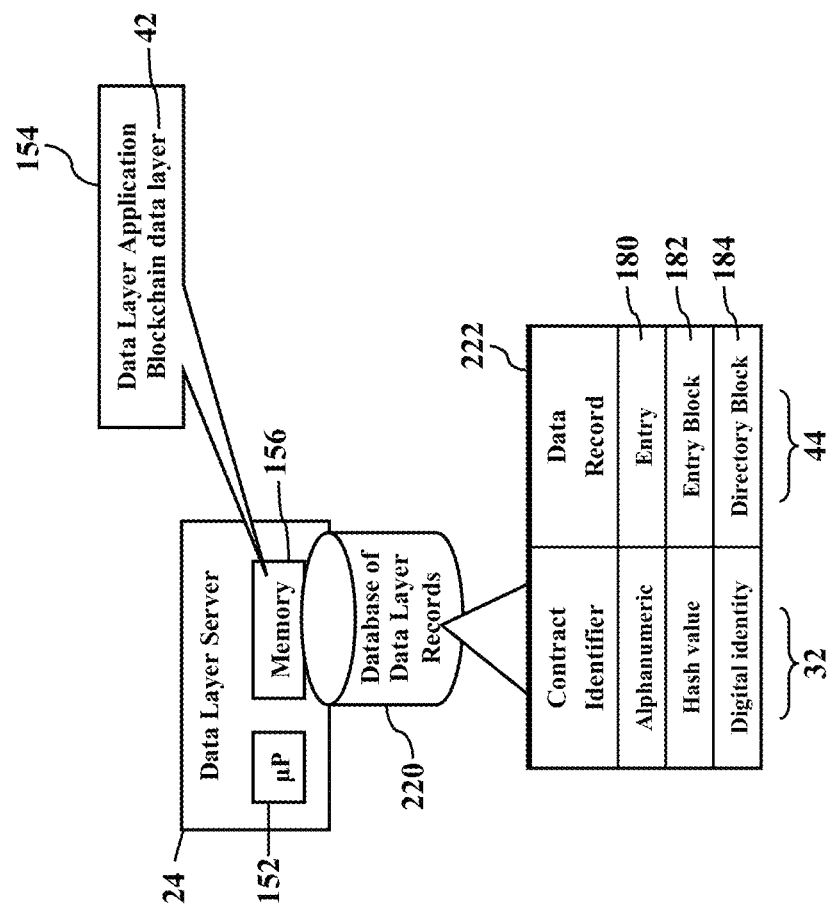
Figure 23:
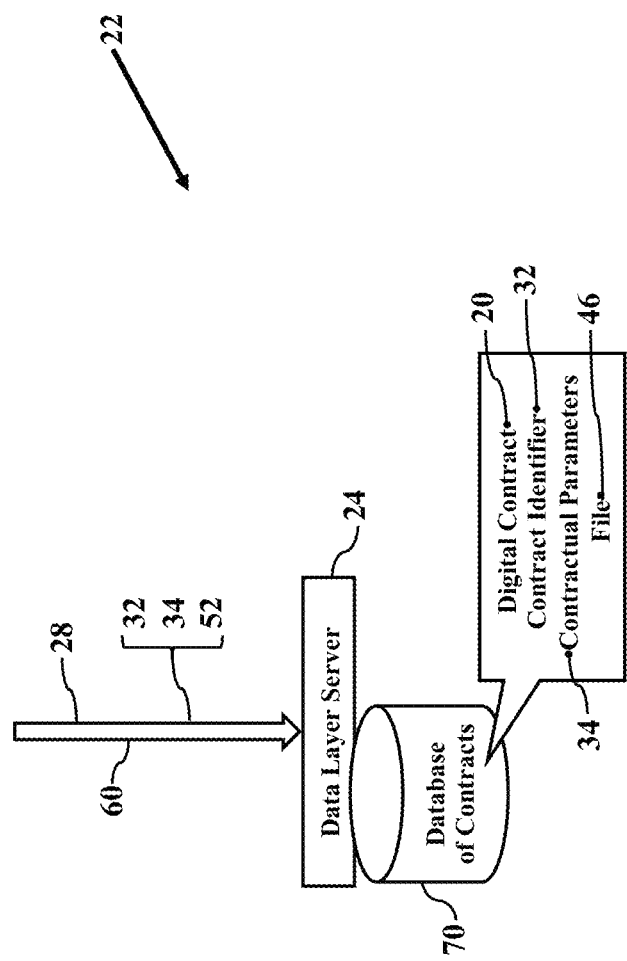
FIGS. 23-26 illustrate contractual execution, according to exemplary embodiments.

FIGS. 21-22 illustrate an access mechanism, according to exemplary embodiments. The blockchain data layer 42 may be a public and/or private service for transactions involving the cryptocoinage 80, 82, and/or 114 and/or the digital contract 20. FIG. 21 illustrates the blockchain data layer 42 as a software-as-a-service offered by the secure data layer server 24 for accessing the blockchain data layer 42. A user accesses the blockchain data layer 42 to conduct transactions involving the cryptocoinage 80, 82, and/or 114 and/or the digital contract 20. While the blockchain data layer 42 may have any user interface, FIG. 21 illustrates a web interface 194. That is, the data layer server 24 and/or the blockchain data layer 42 may be accessed via a webpage 196. The webpage 196 prompts the user to input her authentication credentials according to an authentication mechanism 190 (such as a username, passphrase, or biometric entered or input into a data field or audibly speaking the passphrase).

Mobile technology is illustrated. The user accesses the data layer server 24 and/or the blockchain data layer 42 using a user device 200. While the user device 200 may be any processor-controlled device, most readers are familiar with a smartphone 202. If the smartphone 202 correctly sends authentication credentials, then the smartphone 202 may utilize the web interface 194 to the data layer server 24 and/or the blockchain data layer 42. The smartphone 202 executes a web browser and/or a mobile application to send a request 204 specifying an address or domain name associated with or representing the data layer server 24 and/or the blockchain data layer 42. The web interface 194 to the data layer server 24 thus sends the webpage 196 as a response, and the user's smartphone 202 downloads the webpage 196. The smartphone 202 has a processor and memory device (not shown for simplicity) that causes a display of the webpage 196 as a graphical user interface (or "GUI") 206 on its display device 208. The GUI 206 may generate one or more prompts or fields for specifying the authentication mechanism 190 and transactional options. For example, the user preferably enters, speaks, or otherwise provides inputs. Exemplary embodiments may then search the blockchain data layer 42 for the data records 44. That is, exemplary embodiments may query the blockchain data layer 42 for a query parameter (such as the contract identifier 32 and/or its hashed value) and the blockchain data layer 42 identifies the data records 44 that match or reference the query parameter. The data layer application 154 may then process the data records 44 to provide a transactional summary 210 of the digital contract 20. The webpage 196 may also allow the user to replenish an amount or value of the cryptocoinage 80, 82, and 114, even allowing the user to exchange, trade, or spend for services (such as accessing to the blockchain data layer 42).

FIG. 22 illustrates a query mechanism. Here the data layer server 24 may access a database 220 of data layer records. The database 220 of data layer records provides a referential record of the informational content contained within the blockchain data layer 42. FIG. 22 illustrates the data layer server 24 locally storing the database 220 of data layer records in its local memory device 156, but the database 220 of data layer records may be remotely stored and accessed via the communications network 142. Regardless, the data layer server 24 may query the database 220 of data layer records for any query parameter (such as the contract identifier 32) and identify and/or retrieve any corresponding data records 44. While the database 220 of data layer records may have any logical structure, FIG. 22 illustrates the database 220 of data layer records as a table 222 that maps, converts, or translates the contract identifier 32 to its corresponding entry 180, entry block 182, and/or directory block 184 within the blockchain data layer 42. Whenever the data layer server 24 generates the entry 180, entry block 182, and/or directory block 184, the data layer server 24 may add an entry to the database 220 of data layer records. Over time, then, the database 220 of data layer tracks a comprehensive historical repository of information that is electronically associated with its corresponding contract identifier 32. The data layer server 24 may then read or retrieve the entry 180, entry block 182, and/or directory block 184 containing or corresponding to the contract identifier 32.

Exemplary embodiments thus present the cryptocoinage 80, 82, and 114. The entity 30, the data layer server 24, and the contract layer 26 may create their own cryptocoinage 80, 82, and 114 and define or offer digital contracts 20. The cryptocoinage 80, 82, and 114 may be associated with the contract identifier 32, thus allowing a faster and simpler accounting scheme for machine executable contractual terms.

Exemplary embodiments may thus create coinage on top of coinage. The hierarchical scheme (explained with reference to FIG. 18) allows the entity 30, the data layer server 24, and the contract layer 26 to establish its private cryptocoinage 80, 82, and 114 hierarchically above the traditional BITCOIN®, ETHEREUM®, or RIPPLE® coinage. The entity's private data 64 remains private, but the data records 44 may be publicly documented or proved via the traditional BITCOIN®, ETHEREUM®, or RIPPLE® environment. The private entity 30 and the contract layer 26, in other words, need to worry about or concern itself with public publication. The private entity 30 and the contract layer 26 need only subscribe (e.g., pay for read/write access) to the blockchain data layer 42. The digital contract 20 may also be offered, executed, and documented by the data records 44.

FIGS. 23-26 further illustrate contractual execution, according to exemplary embodiments. When the data layer server 24 receives the blockchain 28, exemplary embodiments inspect the blockchain 28 to identify the contract identifier 32, the contractual parameters 34, and/or the verification value 52. The contract identifier 32, the contractual parameters 34, and/or the verification value 52 may be contained within the block 60 of data within the blockchain 28. The contract identifier 32, the contractual parameters 34, and/or the verification value 52 may be additionally or alternatively be metadata contained within the block 60 of data, and/or the contract identifier 32, the contractual parameters 34, and/or the verification value 52 may be data, a data field, and/or a file attachment. The contract identifier 32, the contractual parameters 34, and/or the verification value 52 may be information or data specified by the blockchain 28 and/or by a packet header or body. The contract identifier 32, the contractual parameters 34, and/or the verification value 52 may be separately sent from the blockchain 28 as data or information in a message sent to the data layer server 24. Regardless, once the contract identifier 32, the contractual parameters 34, and/or the verification value 52 are determined, exemplary embodiments may consult the electronic database 70 of contracts.

Figure 24:
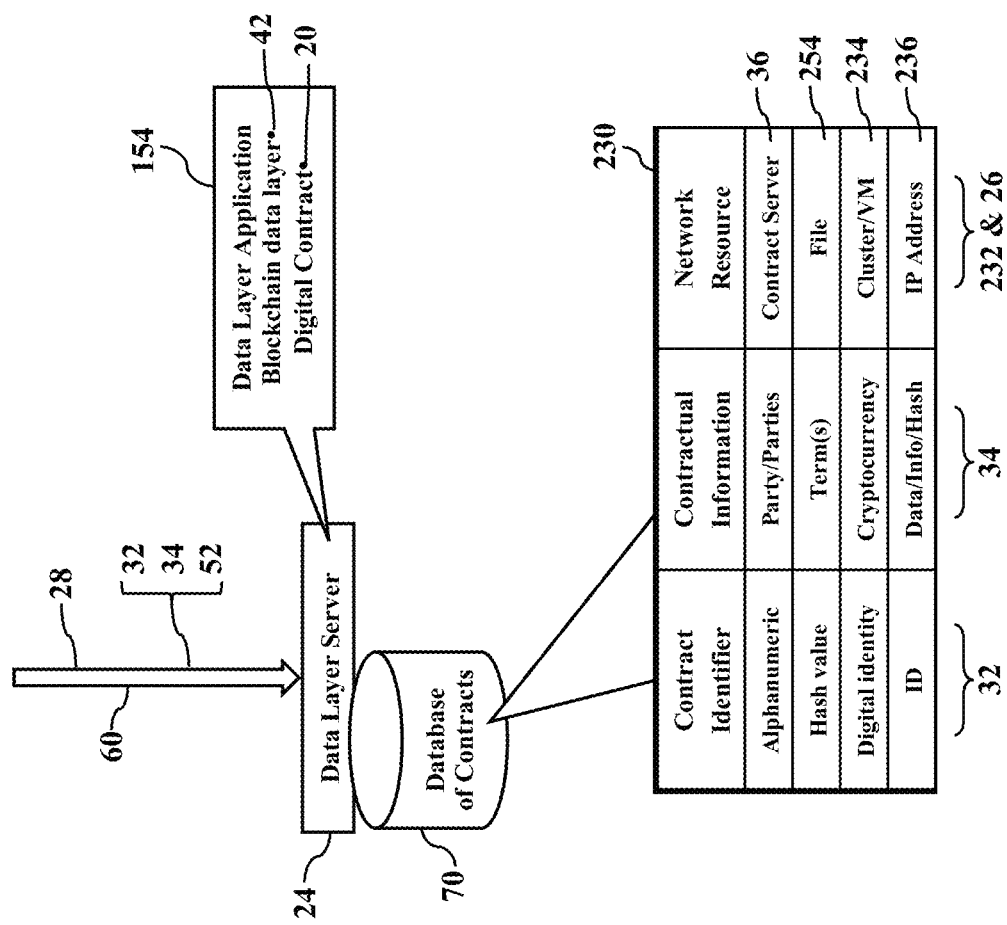

FIG. 24 illustrates the database 70 of contracts. While the database 70 of contracts may have any logical structure, a relational database is perhaps easiest to understand. FIG. 24 thus illustrates the database 70 of contracts as an electronic table 230 that maps, converts, or translates the contract identifier 32 and/or the contractual parameters 34 to their corresponding network resource(s) 232 operating within, or associated with or assigned to, the contract layer 26. The database 70 of contracts may thus be preconfigured or preloaded with entries that assign or associate different contract identifiers 28 and/or contractual parameters 34 to their corresponding network resource 232 that provides, processes, and/or executes the corresponding digital contract 20. As the data layer server 24 receives any blockchain 28, the data layer server 24 may inspect the blockchain 28 for the contract identifier 32 and/or the contractual parameters 34. The data layer server 24 may separately receive the contract identifier 32, the contractual parameters 34, and/or the verification value 52 as one or more data messages. Regardless, the data layer server 24 may then query the database 70 of contracts for the contract identifier 32 and/or the contractual parameters 34 to identify the network resource 232 that is responsible for executing the digital contract 20. As a simple example, the database 70 of contracts may map or relate the contract identifier 32 and/or the contractual parameters 34 to the contract server 66 that is assigned to, or responsible for, receiving the inputs to the digital contract 20. As other examples, the database 70 of contracts may have database entries that specify the network resource 232 as a virtual machine 234, Internet protocol address 236, or other network resource 232 that is responsible for executing the digital contract 20. The database 70 of contracts may optionally contain entries that relate hashed values of the contract identifier 32 and/or the contractual parameters 34. Regardless, once the network resource 232 is identified, the data layer server 24 may direct, assign, or outsource the contractual information 30 to the network resource 232 for processing.

Figure 25:
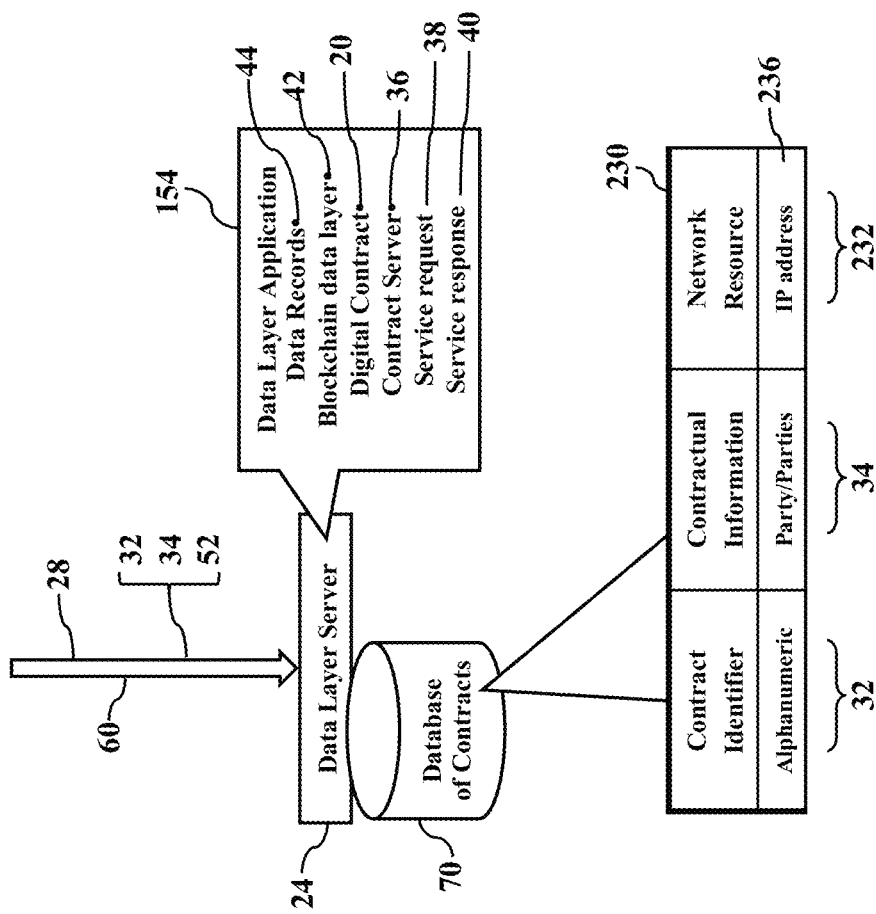

FIG. 25 illustrates the blockchain data later 42. Assume the entries in the database 70 of contracts relate the contract identifier 32 and/or the contractual parameters 34 to the Internet protocol address 236 assigned to the contract server 66. Once the network resource 232 is identified, the data layer server 24 may outsource the execution of the digital contract 20 to the contract server 66. That is, the data layer server 24 gathers, generates, and/or formats the contract identifier 32 and/or the contractual parameters 34 as the inputs specified by the service request 38, and the data layer server 24 sends the service request 38 to the Internet protocol address 236 specified by the database 70 of contracts. The data layer server 24 then receives the service response 40 sent from the contract server 36, and the service response 40 specifies or details the contractual result generated by the digital contract 20. Moreover, the data layer server 24 may generate the data records 44 in the blockchain data layer 42 time-stamping and describing the service request 38, the service response 40, and any execution details of the digital contract 20. For example, the data records 44 may sequentially and/or serially track the execution of the digital contract 20, perhaps logging or documenting periodic or random updates as the digital contract 20 executes, perhaps along with timestamps toward completion. The data records 44 may also log or document a final step or outcome of the programming language representing the digital contract 20. Again, then, the blockchain 28 need only referenced the digital contract 20 (using the contract identifier 32 and/or the contractual parameters 34). The actual execution of the digital contract 20 may be offloaded or outsourced to the contract layer 26.

Figure 26:
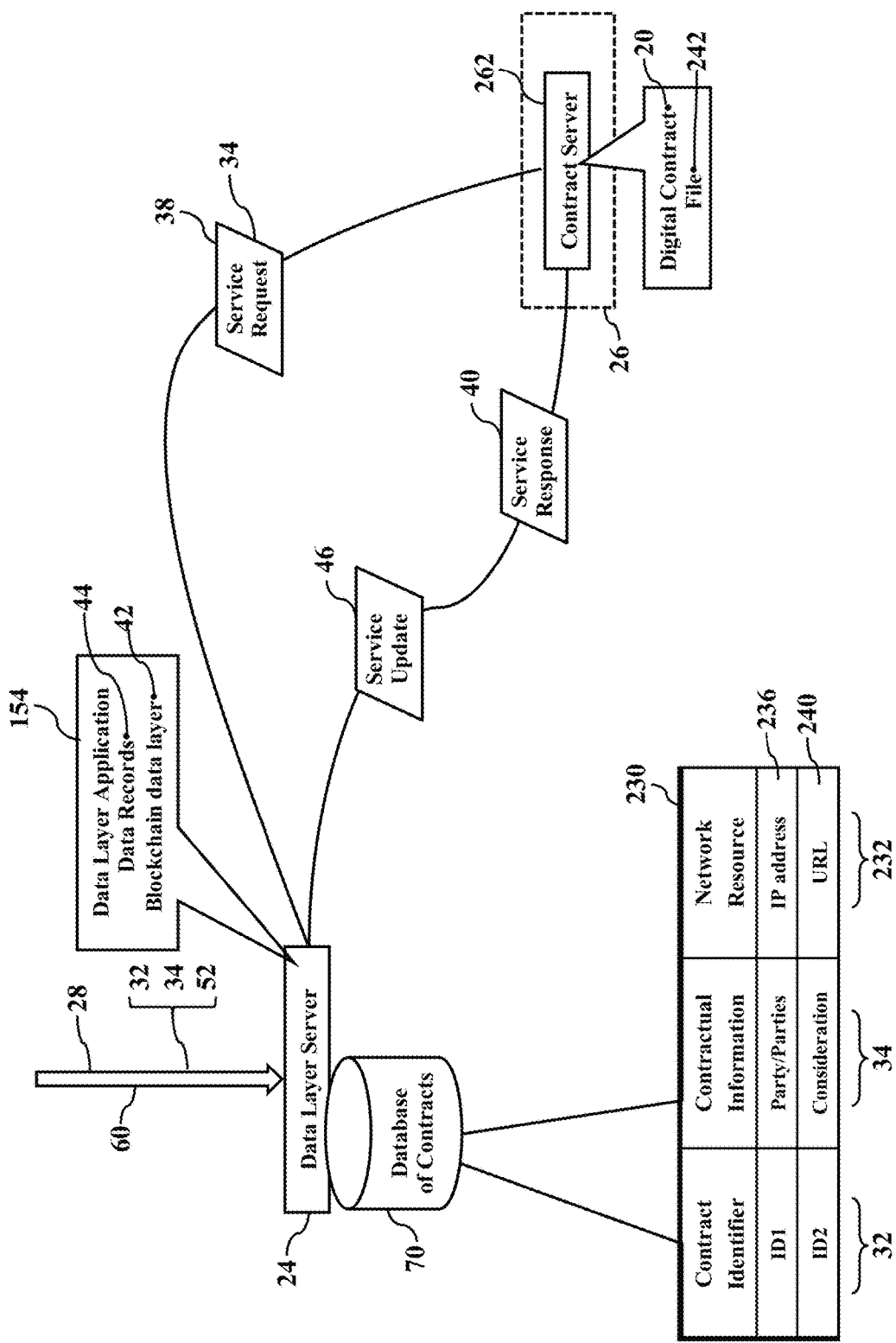

FIG. 26 illustrates more details. The data layer server 24 may again only manage the execution of the digital contract 20 referenced by the contract identifier 32 and/or the contractual parameters 34. That is, the data layer server 24 may outsource the execution of the digital contract 20 to the contract later 26 as a vendor, supplier, or subcontractor process. Again, when the data layer server 24 receives the contract identifier 32 and/or the contractual parameters 34, the data layer server 24 may consult the database 70 of contracts. Here, though, the database 70 of contracts has entries that map or relate the contract identifier 32 to contract server 36 that executes the digital contract 20 as a cloud-based service (perhaps as a software-as-a-service or SAAS). The database 70 of contracts may thus associate the contract identifier 32 to the Internet protocol address 236 representing the contract server 36 that executes the digital contract 20. The database 70 of contracts may additionally or alternatively associate the contract identifier 32 to a uniform resource locator (or "URL") 240 representing the contract server 36 that executes the digital contract 20. Regardless, once the contract server 36 is determined, the data layer server 24 may retrieve and send the service request 38 to the contract server 36 (via the Internet protocol address 236 and/or the URL 240 representing the contract server 36). The service request 38 specifies the contract identifier 32 and requests an execution of the corresponding digital contract 20. The service request 38 may also specify the contractual parameters 34. When the contract server 36 (perhaps operated on behalf of a third party) receives the service request 38, the contract server 36 applies the parameters defined or described by the contractual parameters 34 to the programming code (such as a computer file 242) representing the digital contract 20. Once the digital contract 20 is executed, the contract server 36 may then send the service response 40 back to the data layer server 24, and the service response 40 comprises data or information describing an outcome or result of the digital contract 20 (such as consideration, payment, or performance terms).

The data layer server 24 may generate the data records 44 in the blockchain data layer 42. For example, the data records 44 may document the date and time that the service request 38 was sent to the contract server 36. Moreover, as the contract server 36 provides the digital contract 20 as a service, the contract server 36 may send periodic or random service updates 46 as the service is provided along with timestamps toward completion. The data layer server 24 may thus generate the data records 44 describing the service updates 46 received from the contract server 36. The data layer server 24 may also generate the data records 44 describing the service response 40 sent from the contract server 36 describing an outcome of the digital contract 20.

Figure 27:
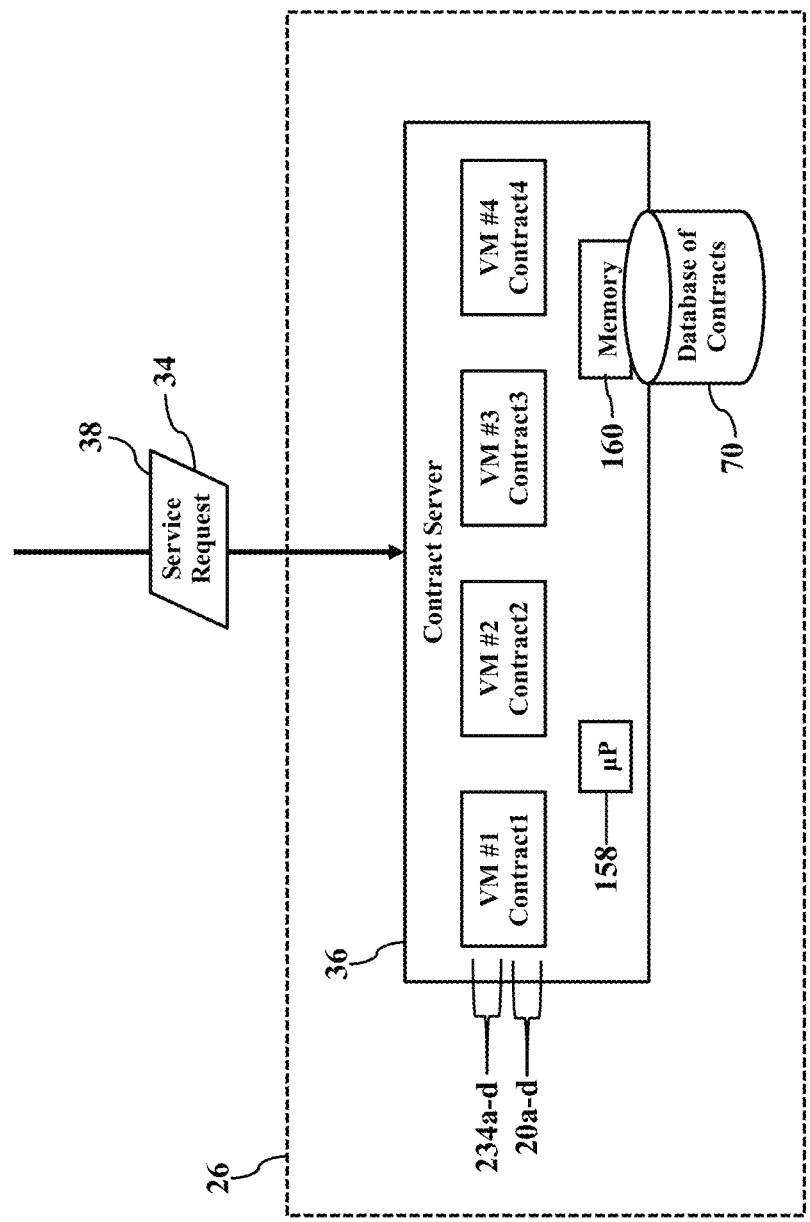
FIGS. 27-28 illustrate virtual execution, according to exemplary embodiments.
Figure 28:
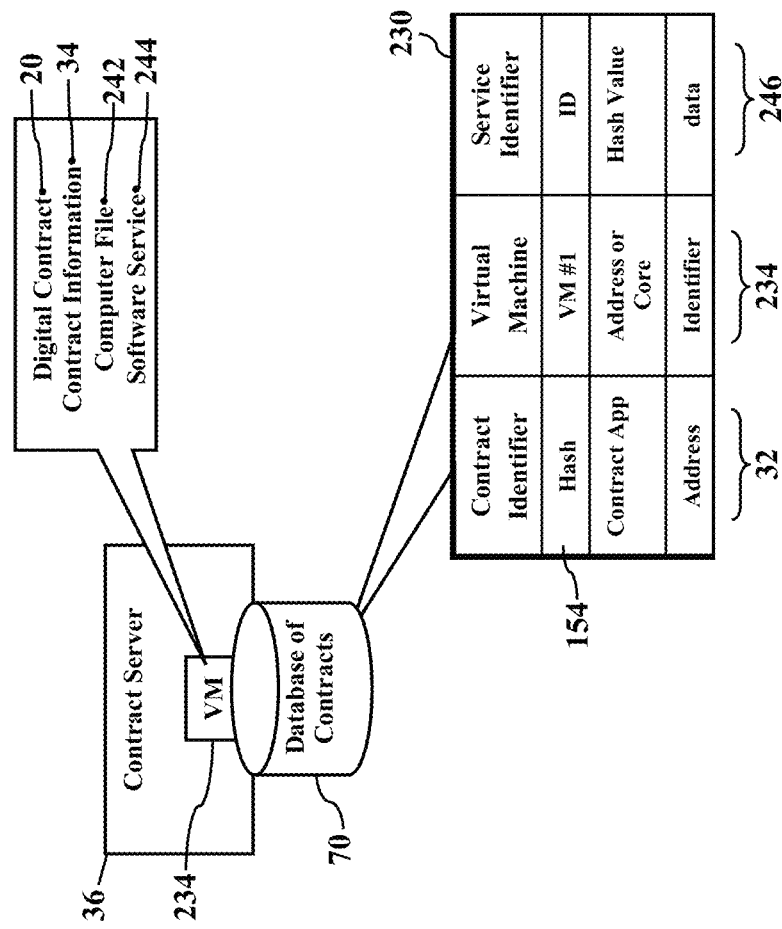

FIGS. 27-28 illustrate virtual execution, according to exemplary embodiments. Here the contract layer 26 may outsource or subcontract the execution of the digital contract 20 to the virtual machine (or "VM") 234. For example, the contract server 36 may implement different virtual machines 234, with each virtual machine 234 processing and/or executing a particular digital contract 20, perhaps as a software service. The contract server 36 may provide virtual computing and/or virtual hardware resources to client devices, thus lending or sharing its hardware, computing, and programming resources. The contract server 36 may thus operate or function as a virtual, remote resource for providing contractual execution as software services. Suppose, for example, that the contract server 36 implements four (4) virtual machines 234a-d. In practice, though, the contract server 36 may implement any number or instantiations of different virtual machines 234 and/or digital contracts 20, depending on complexity and resources. Moreover, as a further simplification, assume that each virtual machine 234a-d executes a different corresponding digital contract 20a-d. So, when the contract server 36 receives the service request 38, the contract server 36 may inspect the service request 38 to read, retrieve, or otherwise obtain each contract identifier 32a-d and/or the corresponding contractual information 34a-d and consult the database 70 of contracts.

FIG. 28 further illustrates the database 70 of contracts. Here the database 70 of contracts may include entries that map the contract identifier 32 to the corresponding virtual machine 234. The database 70 of contracts may thus be preconfigured or preloaded with entries that assign or associate each virtual machine 234 to its corresponding contract identifier 32. Once the virtual machine 234 is identified, the contract server 36 may then coordinate and/or manage the execution of the corresponding digital contract 20, perhaps based on the contract information 30. Suppose, for example, that the contract server 36 has programming or code that functions or performs as a query handler. The contract server 36 inspects for the contract identifier 32 and queries the database 70 of contracts (as above explained). The contract server 36 thus identifies and/or retrieves the corresponding virtual machine 234. Exemplary embodiments may thus determine whether contract identifier 32 matches or satisfies any of the entries specified by the database 70 of contracts. FIG. 28 illustrates entries that map the contract identifier 32 to its corresponding virtual machine 234 (e.g., an address, processor core, identifier, or other indicator).

The digital contract 20 may then be executed. For example, once the contract identifier 32 and the virtual machine 234 are determined, the virtual machine 234 may then call, retrieve, and/or execute the computer file 242 that provides the digital contract 20 as a virtual service or process. FIG. 28 illustrates the computer file 242 locally stored and executed by the contract server 36, but the computer file 242 may be remotely stored, retrieved, and/or executed. Regardless, the virtual machine 234 may be instructed to retrieve, execute, and/or apply the computer file 242, perhaps based on the contractual information 30.

FIG. 28 also illustrates software services. Here the database 70 of contracts may include entries that map the contract identifier 32 to a corresponding software service 244 provided by the virtual machine 234. Exemplary embodiments, in other words, may relate the contract identifier 32 to a service identifier 246. The service identifier 246 is any alphanumeric combination, data, or hash value that uniquely identifies the software service 244 provided by the virtual machine 234. Once the contract identifier 32, the software service 244, and/or the virtual machine 234 are determined, the virtual machine 234 may then provide the software service 244. The software service 244 may execute the digital contract 20, perhaps based on the contractual information 30.

Figure 29:
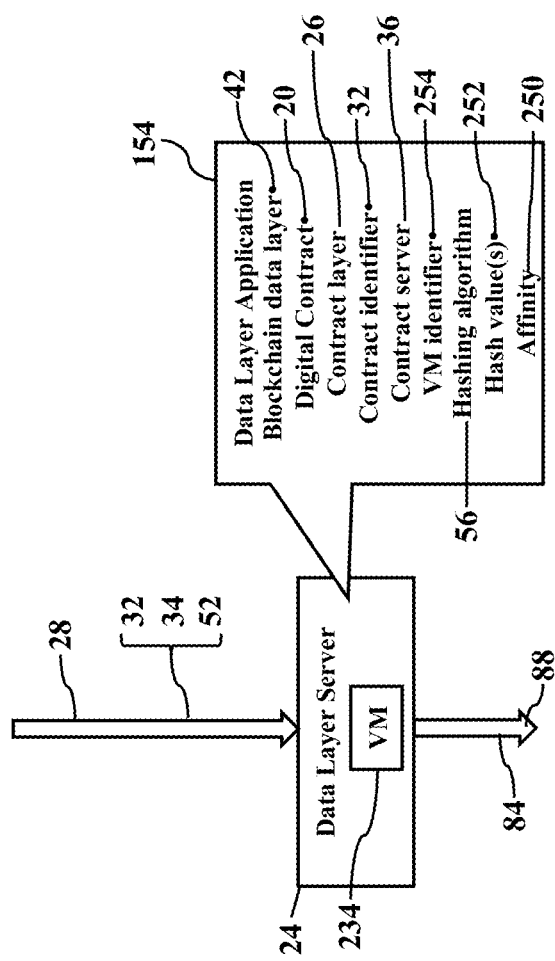
FIG. 29 illustrates cryptographic affinities, according to exemplary embodiments.

FIG. 29 illustrates cryptographic affinities, according to exemplary embodiments. Here the data layer server 24 may create or generate a cryptographic affinity 250 describing contractual execution. This disclosure above explained how the data layer server 24 may generate the data records 44 in the blockchain data layer 42. This disclosure also above explained how the data records 44 may document execution of the digital contract 20. Here, then, the cryptographic affinity 250 may uniquely identify the digital contract 20 executed by the contract layer 26, the contract server 36, and/or the virtual machine 234. For example, once the contract identifier 32 and the virtual machine 234 are determined (as above explained), the hashing algorithm 56 may generate a unique hash value 252. That is, the hashing algorithm 56 may hash the contract identifier 32 with a virtual machine ("VM") identifier 254 to generate the cryptographic affinity 250. The virtual machine identifier 254 is any alphanumeric combination, data, or hash value that uniquely identifies the virtual machine 234. The cryptographic affinity 250 may then be documented by the data records 44 in the blockchain data layer 42, thus evidencing the execution of the digital contract 20. Indeed, the cryptographic affinity 250 may be published via the public blockchain 84 as the cryptographic proof 88, thus further publicly evidencing the execution of the digital contract 20.

The cryptographic affinity 250 may be a detailed registration. describing contractual execution. Because the virtual machine 234 nests within the contract server 26 operating within the contract layer 26, the virtual machine ("VM") identifier 254 may uniquely identify the nested combination. For example, the virtual machine identifier 254 may be an alphanumeric combination, data, or hash value that uniquely identifies the virtual machine 234, the contract server 26, and the contract layer 26. Different virtual machines and different contract servers may operate within the contract layer 26, so different virtual machine identifiers 254 may be assigned to the different combinations. The resulting cryptographic affinities 250 may be registered by the data records 44 in the blockchain data layer 42, thus evidencing the precise execution of the digital contract 20 by the network resource 232 operating within the contract layer 26.

Exemplary embodiments thus include a service environment. Exemplary embodiments may manage and/or execute many different digital contracts 20 offered by many different vendors or suppliers. Indeed, the data layer server 24 may manage or even execute the digital contracts 20 while also generating the blockchain data layer 42 as still another service. The data layer server 24 may thus acts as a subcontractor or service provider, perhaps in a subscription or other compensation scheme. Any customer or client (such as the entity server 140 explained with reference to FIGS. 10-11) may thus send or forward its private blockchain 28 (generated from its private data 64) to the data layer server 24 for management or execution of any digital contract 20. The data layer server 24 may generate the data records 44 of the blockchain data layer 42 that document the management or execution of any digital contract 20. Moreover, the data layer server 24 may publicly publish the cryptographic proof 88 within the public blockchain 84, thus further documenting immutable evidence of the management or execution of any digital contract 20. Indeed, the entity server 140 may also generate the blocks 60 of data within the private blockchain 28 that also document the date and time that the management or execution of any digital contract 20 was sent/requested. The entity server 140 may then pay or reward the data layer server 24 in exchange for the digital contract 20 and/or the data records 44 in the blockchain data layer 42 (such as granting its crytpocoinage 80 and 114, as explained with reference to FIG. 9).

The data layer server 24 may thus serve many blockchains 28 requesting many different contractual services. The financial institution 62, for example, may send or forward its private blockchain 28a (as illustrated with reference to FIG. 9) to the data layer server 24 for application or execution of any digital contract 20 (by specifying the contract identifier 32, as above explained). The retailer 100 may similarly send or forward its private blockchain 28b to the data layer server 24 for application or execution of any digital contract 20. The online website 102 may also send or forward its private blockchain 28c to the data layer server 24 for application or execution of any digital contract 20. The data layer server 24 may generate the data records 44 of the blockchain data layer 42 that document the management and/or execution of any digital contract 20, and the data layer server 24 may publicly publish each cryptographic proof 88 within the public blockchain 84, thus further documenting immutable evidence of the management and/or execution of any digital contract 20. The entity 30 may then pay or reward the data layer server 24 via their respective crytpocoinage 80 and 114.

Exemplary embodiments thus only need to identify the digital contract 20. The contract identifier 32 and the contractual parameters 34 need only be informational content in the private blockchain 28. The contract identifier 32 and the contractual parameters 34, additionally or alternatively, may be sent as packetized data messages. The contract identifier 32 is any digital identifying information that uniquely identifies or references the digital contract 20. The contract identifier 32 may be an alphanumeric combination that uniquely identifies a party, a vendor, and/or version of the digital contract 20 and/or a processor or executioner of the digital contract 20. The contract identifier 32 may be expressed as a unique hash value that is included within, or specified by, the private blockchain 28. Similarly, the contractual parameters 34 may identify the parties to the digital contract 20, their respective performance obligations and terms, and consideration.

Exemplary embodiments may thus exchange inputs and outputs. When the data layer server 24 sends the service request 38 to the contract server 36, the service request 38 may include or specify one or more of the contract identifiers 28 and/or the contractual parameters 34. Suppose, for example, that the contract identifiers 28 and/or the contractual parameters 34 are represented as hash values. The hash values may be identified from, or specified by, the private blockchain 28. The hash values may additionally or alternatively be generated by the data layer application 154 (such as by calling, invoking, or executing the hashing algorithm 56, as above explained). Regardless, the service request 38 may thus include or specify the hash values representing the contract identifiers 28 and/or the contractual parameters 34. When the contract server 36 receives the service request 38, the contract server 36 and/or the digital contract 20 may use or accept the hash values as inputs to generate the contractual result as an output. The contract server 36 and/or the digital contract 20 may further encrypt the contractual result (such as calling, invoking, or executing the hashing algorithm 56) to generate another hash value representing the contractual result.

Exemplary embodiments provide contractual proofs. When the data layer server 24 sends the service request 38 to the contract server 36, the data records 44 may document the service request 38 as one of the cryptographic proofs 88. When the data layer server 24 receives the service response 40, the data records 44 document that receipt and the contractual result as another one of the cryptographic proofs 88. The data records 44 thus prove that at least the portion of the digital contract 20 was outsourced to the contract layer 26 as a vendor, supplier, or subcontractor process or assignment. The data records 44 also prove that at least the portion of the digital contract 20 was executed to provide the contractual result. The data layer server 24 may then compare the contractual result (such as its hash value) to a predefined or expect value. If the contractual result matches or equals the predefined or expect value, then the data layer application 154 may be programmed or coded to infer that the contract successfully executed and/or the vendor or supplier performed as obligated. However, if the contractual result fails to match or equal the predefined or expect value, then the data layer application 154 may be programmed or coded to infer that the contract is not satisfied and/or the vendor or supplier failed to perform as obligated.

Figure 30:
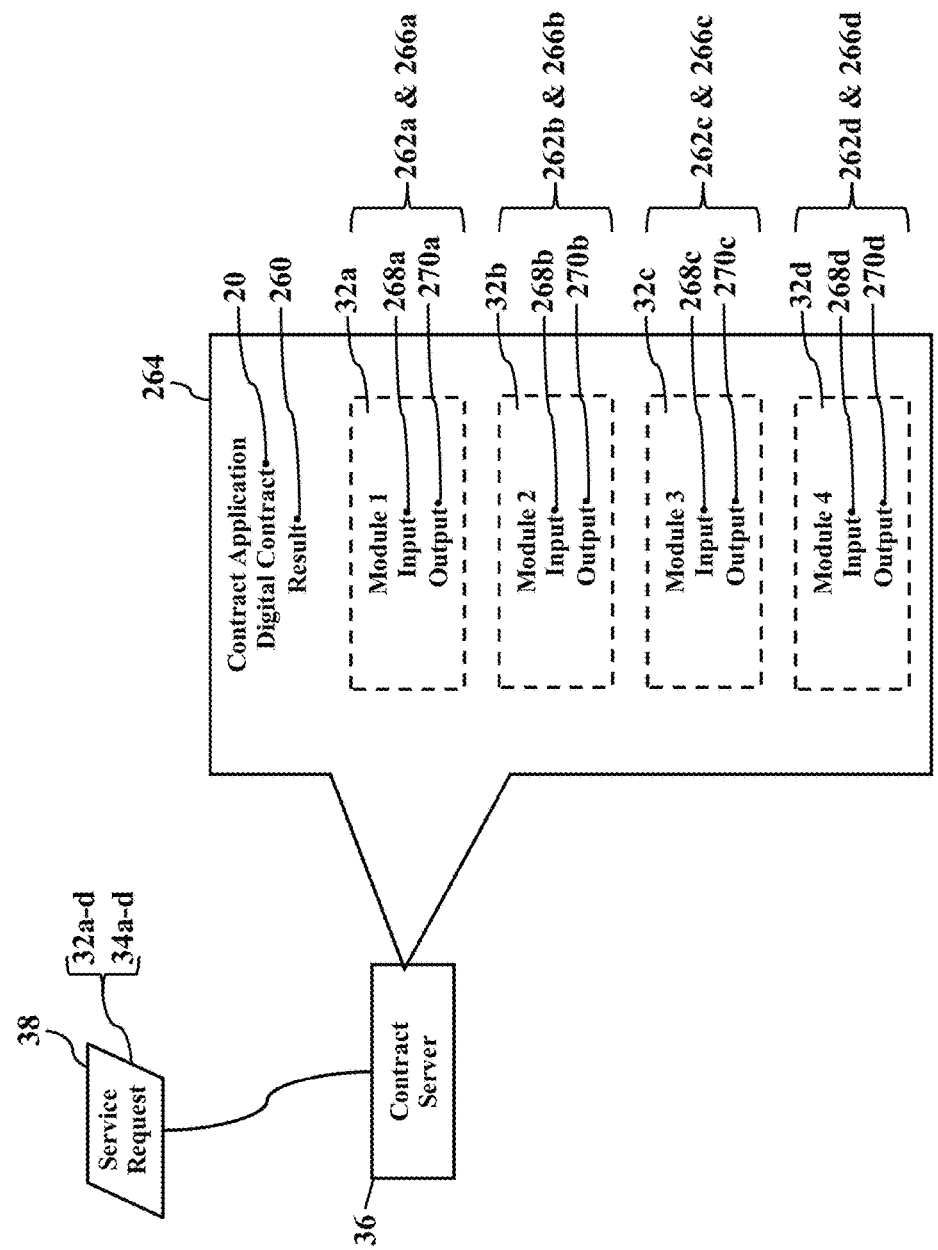
FIGS. 30-34 illustrate a contractual process, according to exemplary embodiments.

FIGS. 30-34 illustrate a contractual process, according to exemplary embodiments. Here the digital contract 20 may have different or individual components, portions, or sub-parts that cumulatively combine to produce a contractual result 260. The different components, portions, or sub-parts may be software modules 262 that can be separately executed to generate the overall or final contractual result 260. A simple digital contract 20, for example, may only have a few or several software subroutines or modules 262, while a complex or complicated digital contract 20 may have many or hundreds of different software subroutines or modules 262. As the reader likely understands, such a complicated software structure is too difficult to illustrate. For simplicity, then, FIG. 30 illustrates the digital contract 20 having four (4) software modules 262a-d. The entire contract application 264, in other words, may have four (4) different application layers 266a-d. Each componentry module 262a-d or layer 266a-d may have its own corresponding contract identifier 32a-d. When the contract server 36 receives the service request 38, exemplary embodiments may then feed the contractual parameters 34 as inputs 268a-d to the software modules 262a-d. Each different software module 262 may thus generate its respective or corresponding output 270a-d, which may be combined or processed to generate the overall or final contractual result 260.

Figure 31:
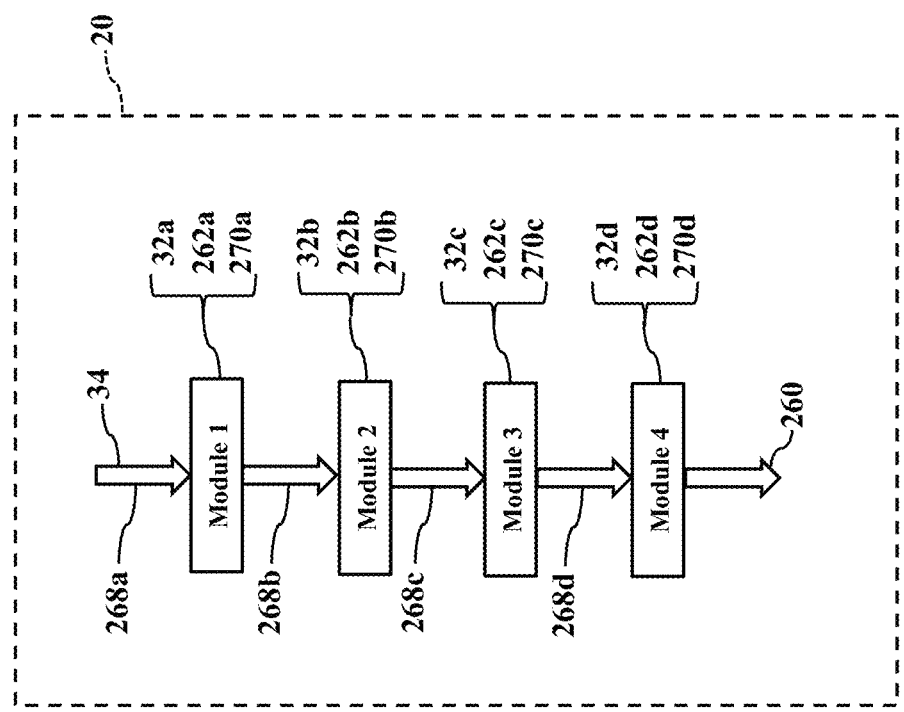

FIG. 31 illustrates hierarchical execution. Here the different software modules 262 may be serially or sequentially executed to generate the overall or final contractual result 260. For example, the software module 262a may accept at least some of the contractual parameters 34 as the input 268a, execute its respective programming code, and generate its corresponding output 270a. Here, though, the output 270a may then be routed or sent to the software module 262b as its input 268b. Its respective programming code is then executed to generate its corresponding output 270b, based on the output 270a generated by or received from the software module 262a. Similarly, software module 262c accepts the output 270b and generates output 270c, which is received by software module 262d as input 268d and used to generate the output 270d. While exemplary embodiments may continue processing the outputs 270a-d to generate any desired outcome, for simplicity FIG. 31 illustrates the output 270d as the final contractual result 260. Exemplary embodiments may thus use the software modules 262a-d as feedback mechanisms to monitor or even enforce contractual rule-based obligations defined or specified by the digital contract 20.

Figure 32:
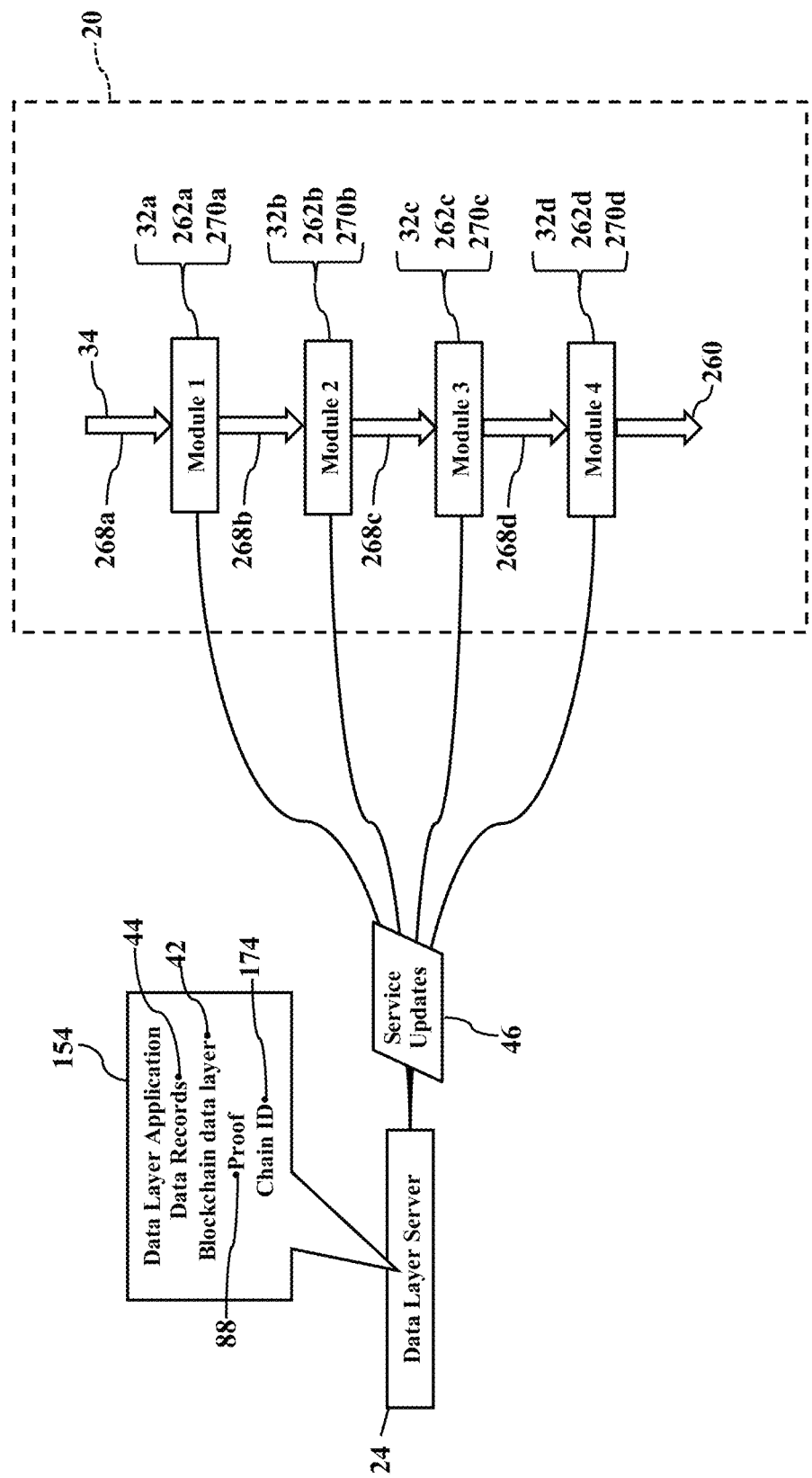

FIG. 32 illustrates the blockchain data layer 42. Here the blockchain data layer 42 may document the processing and/or execution of each software module 262a-d, its respective input(s) 268a-d, its respective output(s) 270a-d, and perhaps a corresponding timestamp (not shown for simplicity). The data records 44 may further document or record the corresponding contract identifier 32a-d and/or the chain identifier 174. The data layer server 24 may thus receive the service updates 46 (via the communications network 142) as each software module 262a-d performs or executes its corresponding contractual service. The data layer server 24 may then generate the data records 44 in the blockchain data layer 42, thus documenting each software component's contribution toward the overall or final contractual result 260. The data records 44 may also be hashed to generate the cryptographic proofs 88, as above explained.

Figure 33:
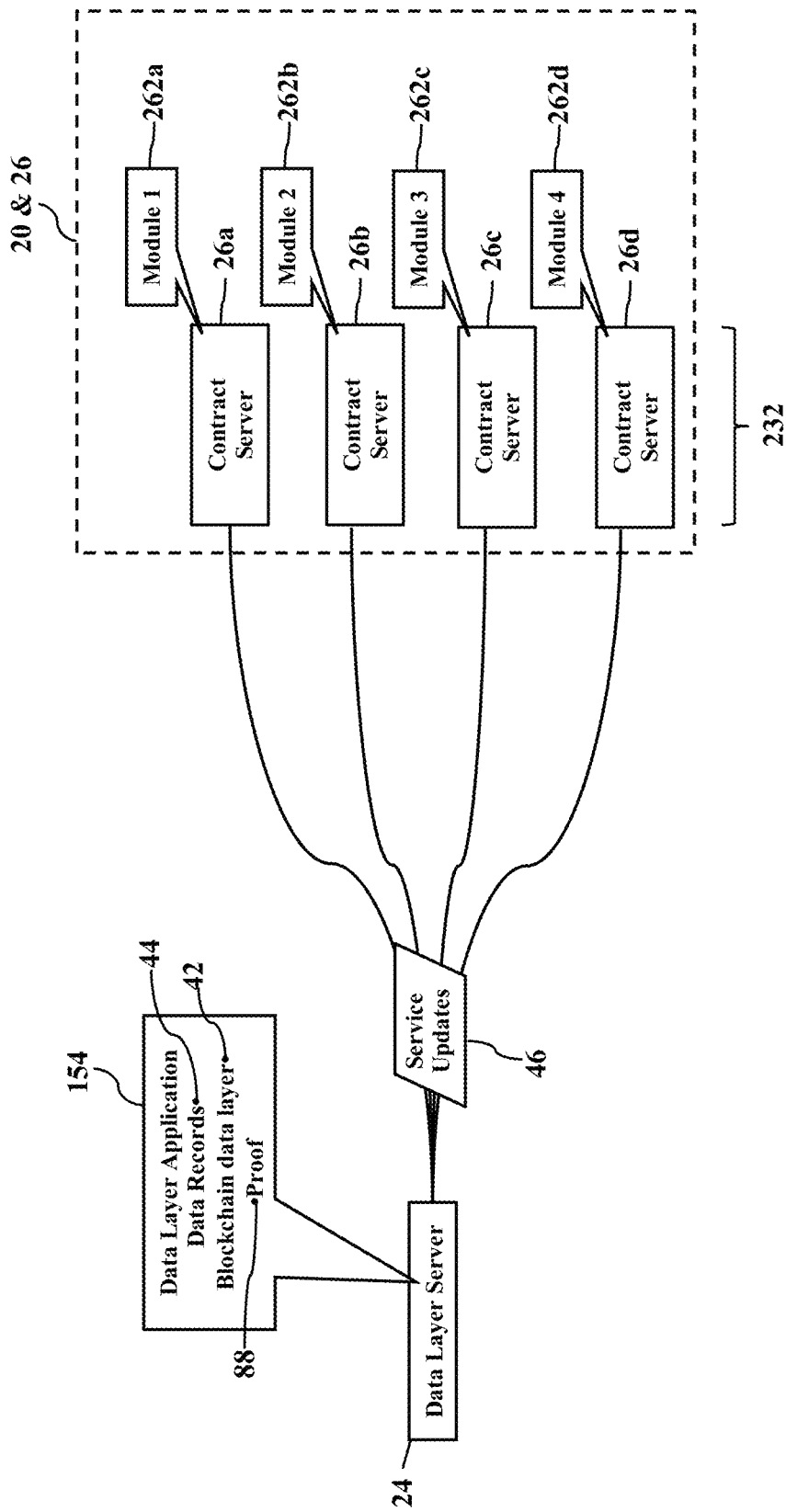

FIG. 33 also illustrates contractual execution. Here, though, the different software modules 262 may be executed by different network resources 232 within the contract layer 26. Suppose, for example, that the contract server 36a locally stores and executes the software module 262a, while a different contract server 36b locally stores and executes the software module 262b. Suppose also that the contract server 36c locally stores and executes the software module 262c and the contract server 36d locally stores and executes the software module 262d. Exemplary embodiments may thus source or subcontract the different portions of the digital contract 20 to different machines for execution. The contract server 36a, for example, may specialize in the software module 262a. The contract server 36a may thus accept the service request 38 from clients, execute the software module 262a, and return send the service response 40 (as explained with reference to FIG. 26). The contract server 36a may also send the service update(s) 46 to the data layer server 24, thus allowing the blockchain data layer 42 to document the contractual service provided by the software module 262a. The remote servers 262b-d may similarly specialize in the software modules 262b-d to provide their respective contractual services.

Figure 34:
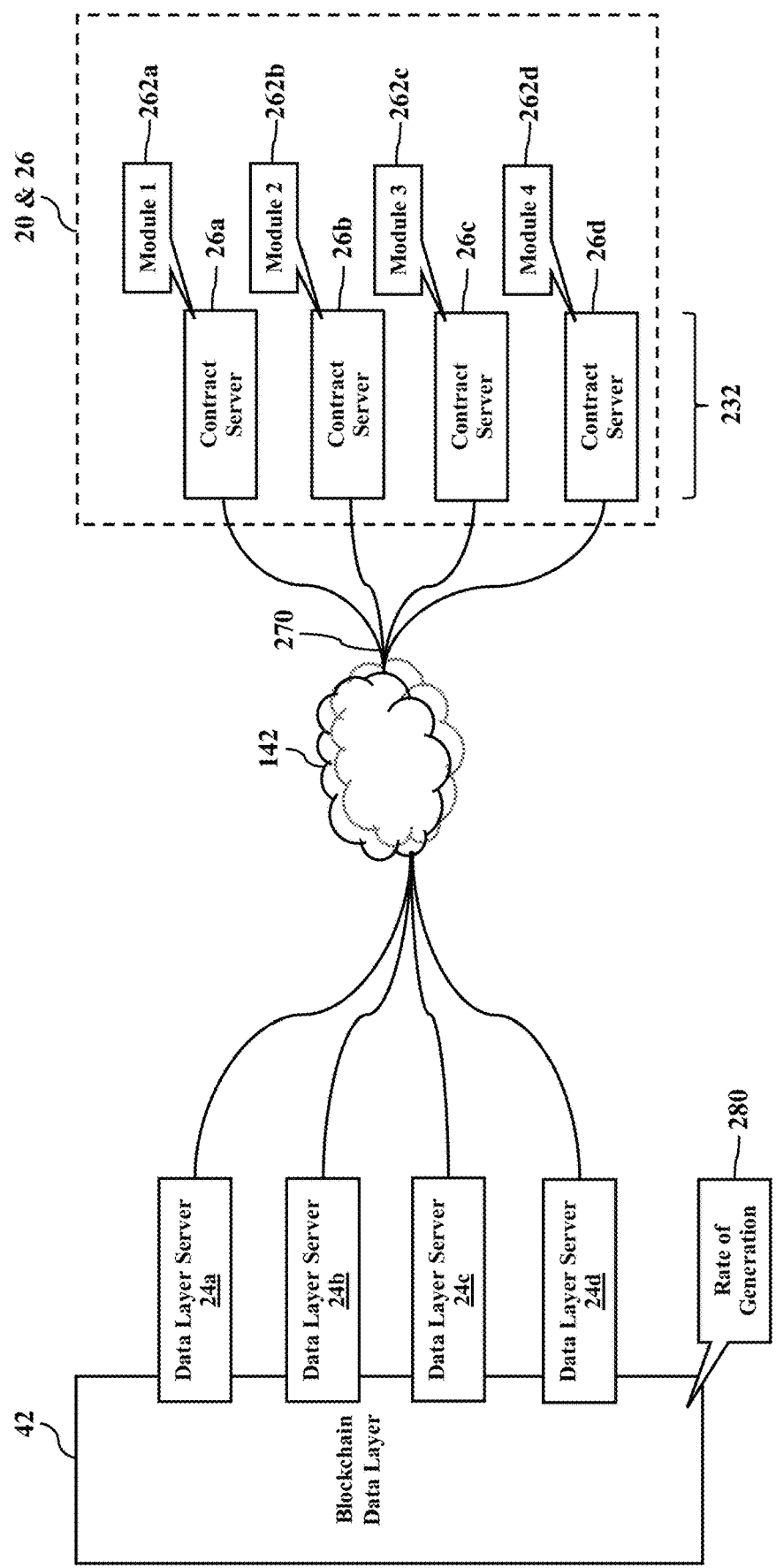

FIG. 34 illustrates an overall architectural scheme. As the reader may envision, there may be hundreds, thousands, millions, or even billions of contractual relationships between many different parties. As smart, digital contracts grow in acceptance and usage, the blockchain data layer 42 is expected to exponentially grow, thus requiring ever-increasing hardware and software resources. In plain words, there may be many data layer servers 24 generating the data records 44 in the blockchain data layer 42. While there may be hundreds or even thousands of data layer servers 24, FIG. 34 simply illustrates four (4) data layer servers 24a-d that cooperate to generate and grow the blockchain data layer 42. As the processing load increases or grows (such as according to a rate 280 of generation), the number of data layer servers 24 may also grow.

The blockchain data layer 42 may thus be separate from an implementation and execution of the digital contract 20. The data layer servers 24, in other words, may be separately networked and/or addressed from the contract servers 26 providing the contractual services representing the software modules 262 of the digital contract 20. Any of the data layer servers 24 may send data or information as inputs to any one of the contract servers 26, and the corresponding software module 262 performs its contractual service and sends its output 270 back to the blockchain data layer 42 (perhaps via the service request 38, the service response 40, and the service update 46 as earlier explained and illustrated). Some of the contract servers 26 may provide virtual services, such as a virtual machine (as above explained) that executes any of the software modules 262.

Figure 35:
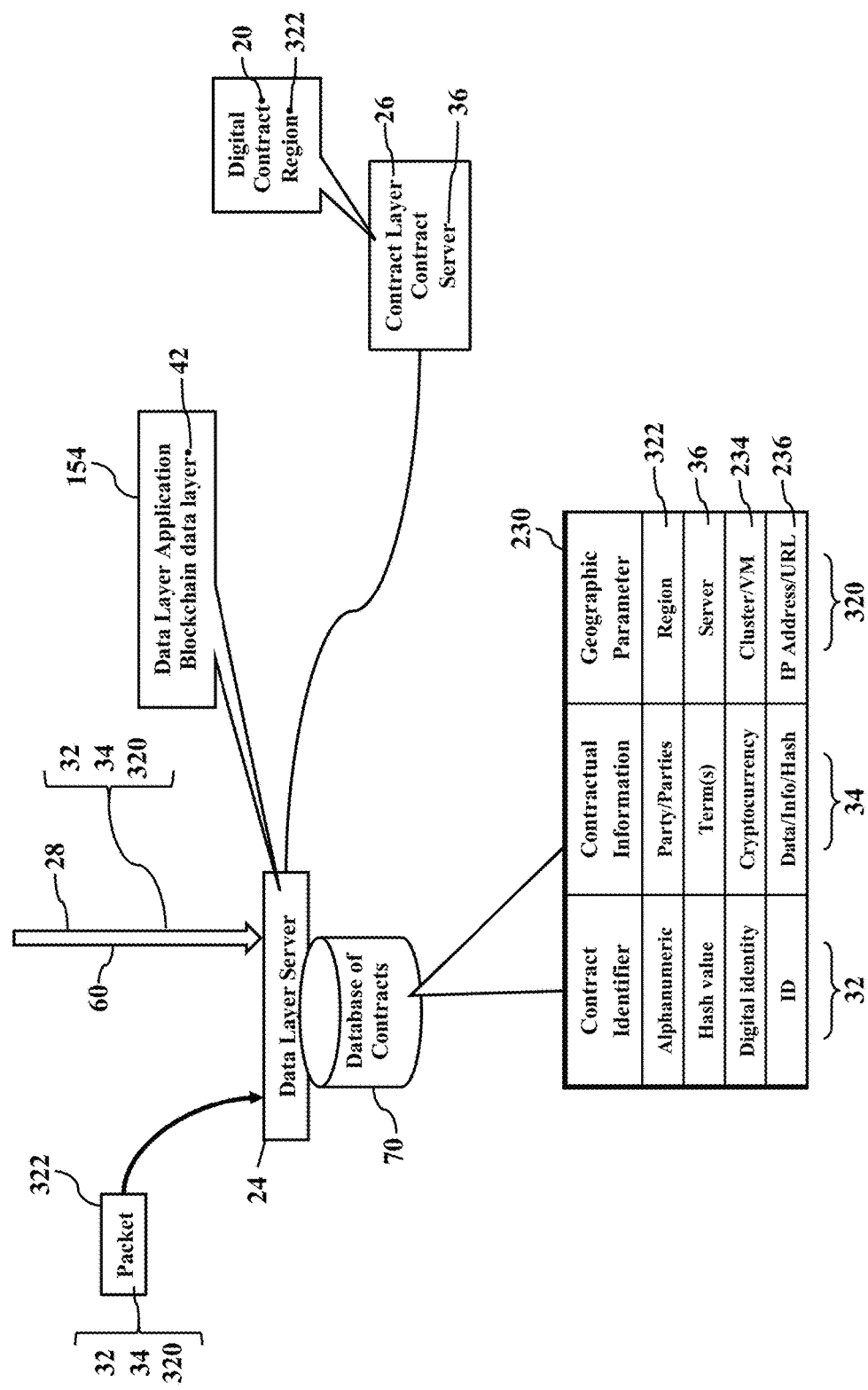
FIG. 35 illustrates a compliance scheme, according to exemplary embodiments.

FIG. 35 illustrates a compliance scheme, according to exemplary embodiments. As the reader may understand, some smart, digital contracts have jurisdictional requirements. For example, the digital contract 20 may have programming code that requires an execution or processing in a particular region or country. That is, the digital contract 20 may have contractual rules and/or provisions that must be enforced in the United States, the European Union, or the Isle of Man. Components or portions of the digital contract 20 may require execution or location in the Cayman Islands, Idaho, or Hong Kong. The digital contract 20, in other words, may have a geographic parameter 320. The geographic parameter 320 may be a locational requirement, restriction, or preference for at least some portion of the digital contract 20. The geographic parameter 320 can be any data, information, field, metadata, or code for enforcing the locational requirement, restriction, or preference. Indeed, the geographic parameter 320 may even be finely expressed or defined as global positioning system ("GPS") information or coordinates at which at least some portion of the digital contract 20 must be processed or executed.

The geographic parameter 320 may be an input value. As FIG. 35 illustrates, the geographic parameter 320 may be read or received via the private blockchain 28 (perhaps along with the contract identifier 32 and/or the contractual parameter 34). The data layer server 24, in other words, may identify the geographic parameter 320 as data, information, or a hash value contained within the block 60 of data. However, the geographic parameter 320 may additionally or alternatively be received and/or identified within a header of body/payload of a packet 322 of data (packetized according to the Internet Protocol, just as the contract identifier 32 and/or the contractual parameter 34 may be identified).

Regardless, once the geographic parameter 320 is determined, exemplary embodiments may again consult the database 70 of contracts. The database 70 of contracts may have entries that electronically associate the contract identifier(s) 32 and/or the contractual parameter(s) 34 to the geographic parameter 320. The data layer application 154 may instruct the data layer server 24 to query the database 70 of contracts for either, any, or all of the contract identifiers 28, the contractual parameters 34, and/or the geographic parameters 320 to identify and/or retrieve the corresponding database entries. As a simple example, suppose a file component of the digital contract 20 must be processed in a particular geographic region (such as the British Virgin Islands or Canada). The corresponding contract identifier 32, in other words, may be electronically associated with a particular geographic region 322, as defined by a tabular entry in the database 70 of contracts. Once the region 322 is determined, the data layer server 24 may then route the contract identifier 32, the contractual parameter 34, and/or the geographic parameter 320 to the contract layer 26 and/or the contract server 36 that is associated with, or even located within, the region. Exemplary embodiments, for example, may implement the service request 38, the service response 40, and the service update 46 (as earlier explained). The contract server 36 may then process or execute the digital contract 20 using the contract identifier 32 and/or the contractual parameter 34 (as this disclosure earlier explained).

Other examples explain the geographic parameter 320. Suppose that the contract identifier 32 and/or the contractual parameter 34 map(s) to a particular server, cluster of servers, and/or a particular virtual machine ("VM") 234. The data layer server 24 may then route the contract identifier 32, the contractual parameter 34, and/or the geographic parameter 320 to the contract server 36 that is associated with the cluster of servers and/or the virtual machine 234. The contract server 36 may then process or execute the digital contract 20 using the contract identifier 32 and/or the contractual parameter 34 (as this disclosure earlier explained). More likely, though, the contract identifier 32 and/or the contractual parameter 34 will relate to a particular IP address or uniform resource locator ("URL") 236. The data layer server 24 may then route the contract identifier 32, the contractual parameter 34, and/or the geographic parameter 320 to the contract server 36 that is associated with the IP address or URL 236 for processing (again, as this disclosure earlier explained).

Exemplary embodiments may thus implement contractual provisions. Some digital contracts 20 may require a particular server, perhaps implementing or hosting a particular website, network, authentication scheme, programming, or other geographic parameter 320. Some parties to the digital contract 20 may also require a particular server, perhaps as specified by the geographic parameter 320. Some digital contracts 20 may have compliance obligations, perhaps defined by a particular jurisdiction and expressed as the geographic parameter 320. Servers, webpages, networks and other resources may be dedicated to specific jurisdictions, as expressed by the geographic parameter 320.

Figure 36:
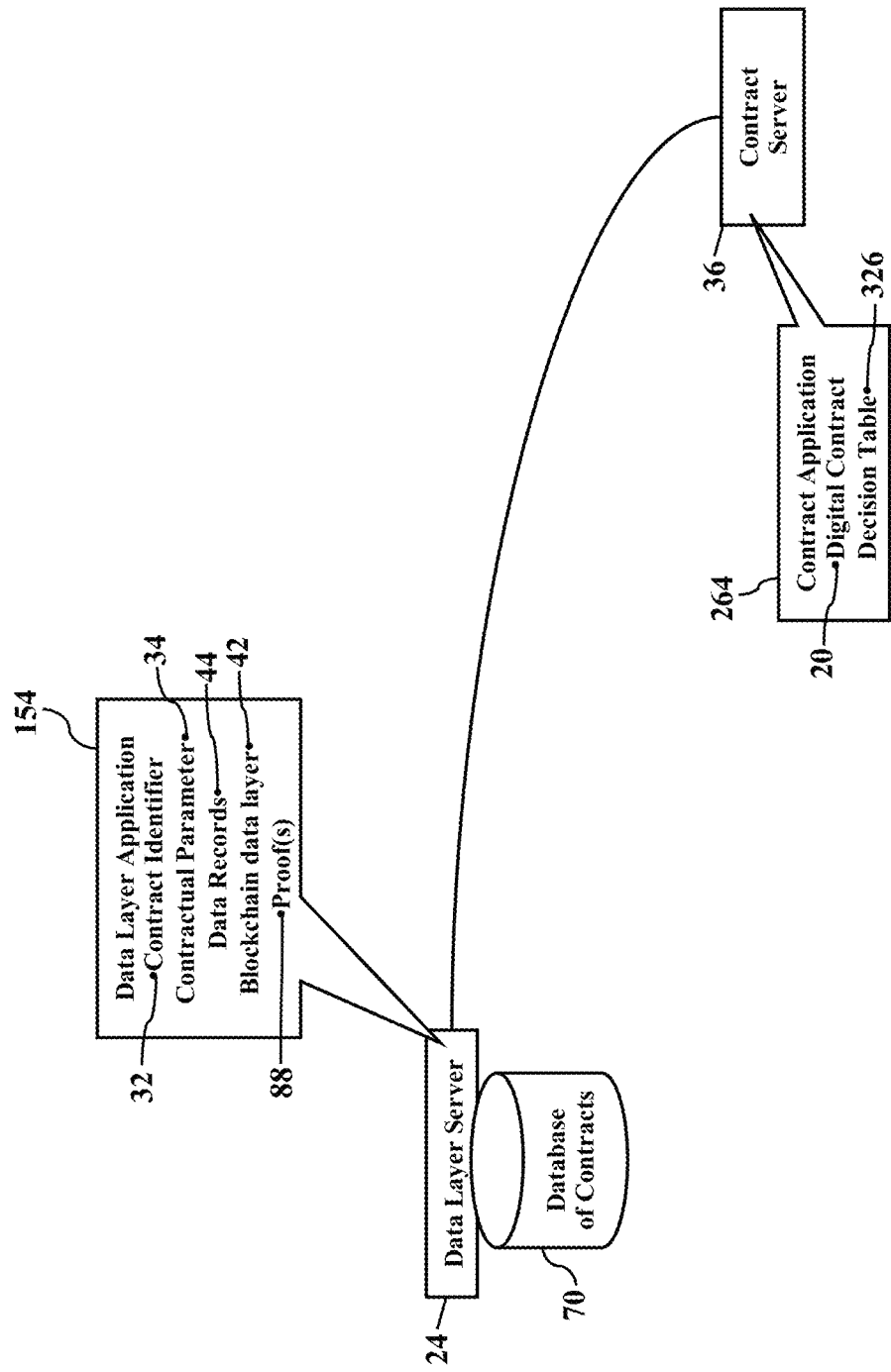
FIGS. 36-38 illustrate contractual management, according to exemplary embodiments.
Figure 37:
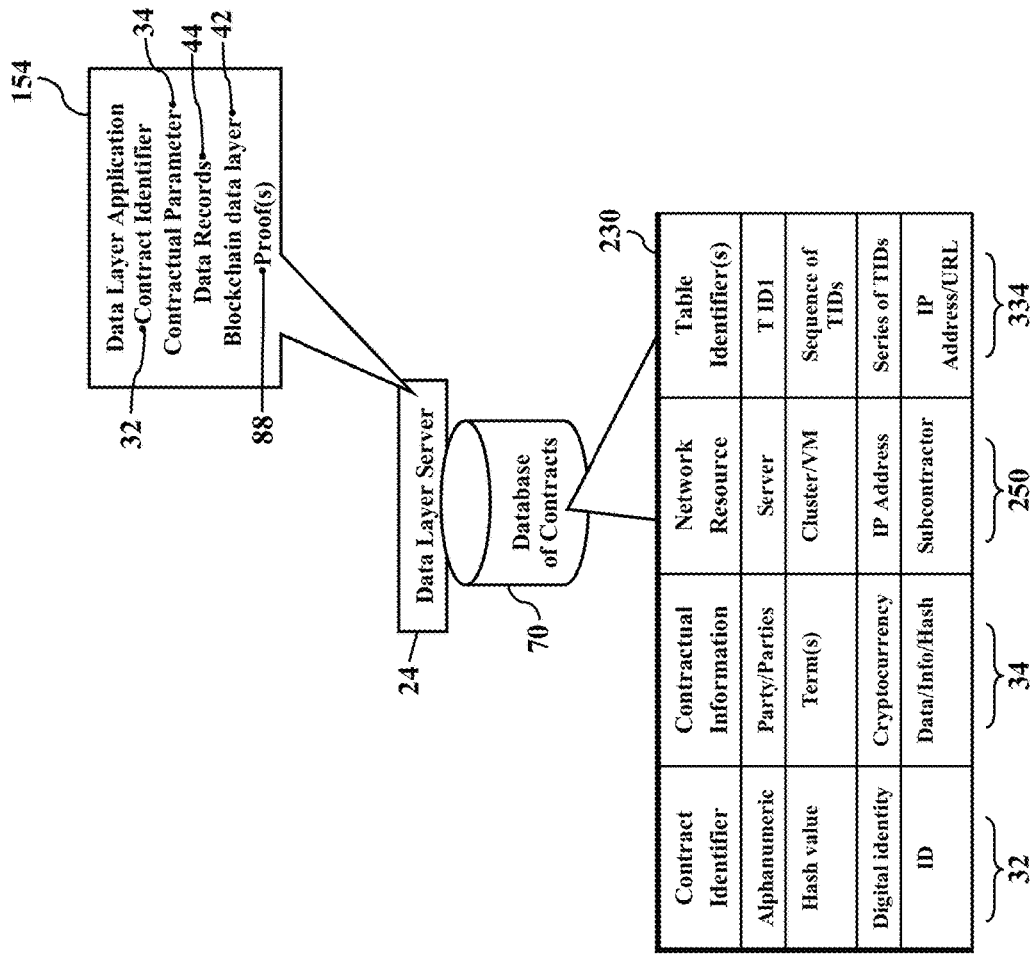
Figure 38:
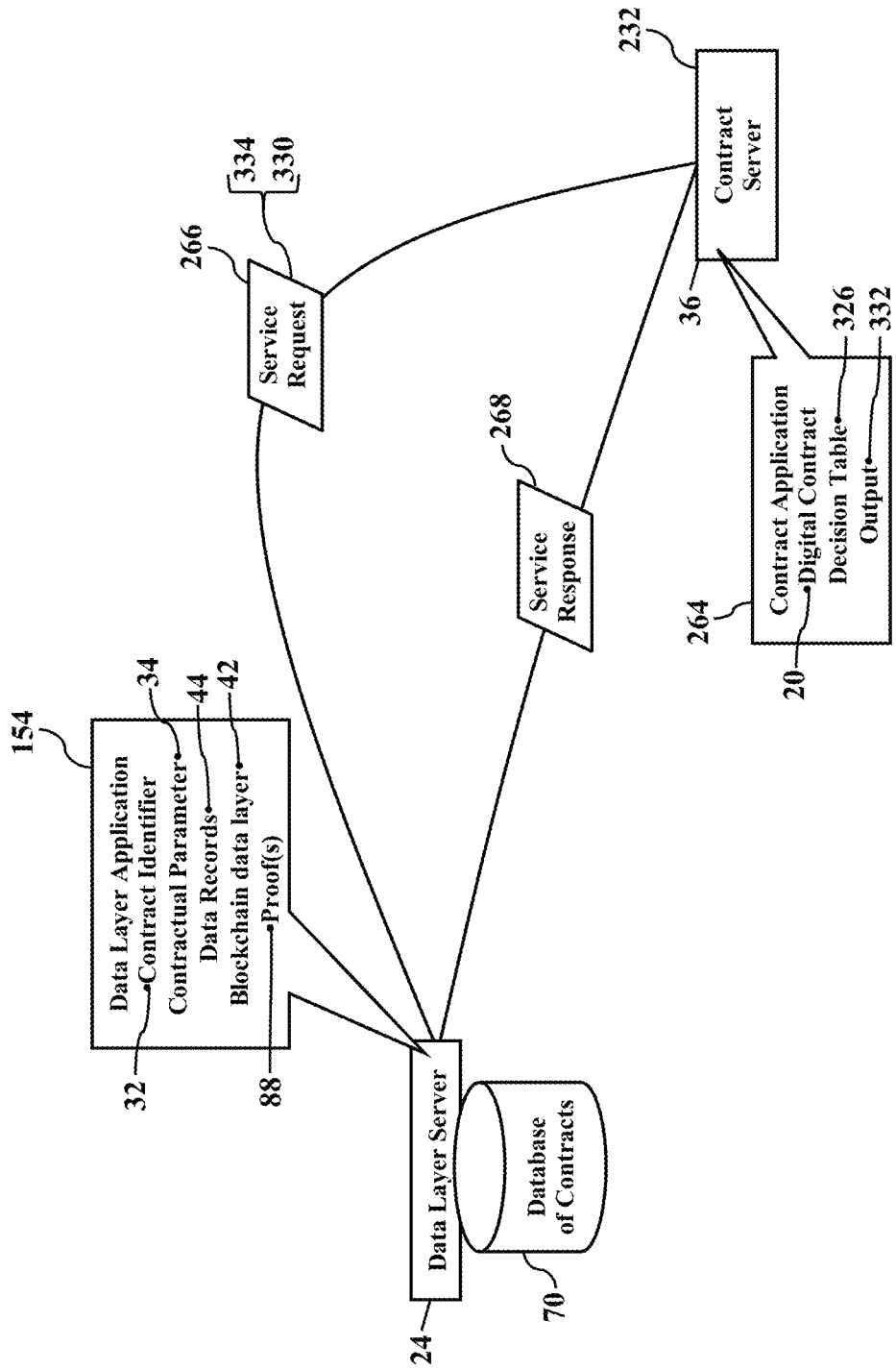

FIGS. 36-38 illustrate contractual management, according to exemplary embodiments. Here again the data layer server 24 may manage the execution of the digital contract 20. When any party, participant, or subcontractor performs a portion or component of the digital contract 20, the data layer server 24 may coordinate and validate the contractual components. Suppose again that the data layer server 24 receives the contract identifier 32 and/or the contractual parameters 34 (as earlier explained). The contract identifier 32 may represent a single, large digital contract 20. The contract identifier 32, however, may represent only a single or a few contractual components of the digital contract 20. The contract identifier 32, in other words, may map or relate to a sequence or series of one or more table identifiers 334. Each table identifier 334 may be an alphanumeric combination or a unique hash value. Regardless, each table identifier 334 uniquely identifies a corresponding decision table 326 that decides a componentry portion of the digital contract 20. When the data layer server 24 receives the one or more contract identifiers 28, the data layer server 24 may then consult the database 70 of contracts.

FIG. 37 further illustrates the database 70 of contracts. Here the database 70 of contracts may have additional entries that map or relate the contract identifier 32 to the table identifier 334 and/or to the network resource 250 that executes the corresponding componentry portion of the digital contract 20 (perhaps again as a cloud-based service). The contract identifier 32, in other words, may map or relate to a sequence or series of one or more table identifiers 334. Each table identifier 334 may be an alphanumeric combination or a unique hash value. Regardless, each table identifier 334 uniquely identifies the corresponding decision table 326 that decides a componentry portion of the digital contract 20. When the data layer server 24 receives the one or more contract identifiers 28, the data layer server 24 may then consult the database 70 of contracts to determine any corresponding entry (as this disclosure above explains).

FIG. 38 illustrates outsourcing. Once the network resource 232 is determined (recall that the network resource 232 may execute the corresponding componentry portion of the digital contract 20), the data layer server 24 may utilize the request mechanism. Suppose, for example, that the database 70 of contracts identifies the contract server 36 as the network resource 232. The data layer server 24 may thus instruct the contract server 36 to execute the corresponding decision table 326. The data layer server 24, for example, sends the service request 38 (as earlier explained), and the service request 38 may specify the table identifier 334 and/or the input 330 as the contractual parameters 34. When the contract server 36 receives the service request 38, the contract server 36 applies the input 330 to the decision table 326 representing the digital contract 20. Once the decisional output 332 is determined, the contract server 36 may then send the service response 40 back to the data layer server 24, and the service response 40 comprises data or information describing the decisional output 332. The data layer server 24 may generate the data records 44 in the blockchain data layer 42 that document the service request 38 and the service response 40, perhaps including any service updates 46 as the decision table 326 is executed.

Exemplary embodiments thus include a service environment. Exemplary embodiments may manage and/or execute many different decision tables 326 offered by many different vendors or suppliers. Indeed, the data layer server 24 may manage or even execute the digital contracts 20 while also generating the blockchain data layer 42 as still another service. The data layer server 24 may thus acts as a subcontractor or service provider, perhaps in a subscription or other compensation scheme. Any customer or client may thus send or forward its input 330 and/or its decisional output 332 to the data layer server 24 for management or execution of any digital contract 20. The data layer server 24 may generate the data records 44 of the blockchain data layer 42 that document the management or execution of any portion of component of the digital contract 20. Moreover, the data layer server 24 may publicly publish the cryptographic proof 88 within the public blockchain 84, thus further documenting immutable evidence of the management or execution of any digital contract 20. Any party, participant, or vendor/subcontractor may then pay or reward the data layer server 24 (such as granting its crytpocoinage 80, 82, and/or 114, as explained with reference to FIG. 9).

The data layer server 24 may thus provide contractual services. The financial institution 62, for example, may send or forward its input 330 and/or its decisional output 332 to the data layer server 24 for contractual documentation. Similarly, the retailer 100, the online website 102, and the manufacturer 128 may also send its input 330 and/or its decisional output 332 to the data layer server 24 for contractual documentation. The data layer server 24 may generate the data records 44 of the blockchain data layer 42 that document the management and/or execution of any decision table 326 representing any portion of the digital contract 20. The data layer server 24 may also publicly publish each cryptographic proof 88 within the public blockchain 84, thus further documenting immutable evidence of the management and/or execution of any digital contract 20. The data layer server 24 may be paid or rewarded via their respective crytpocoinage 80, 82, and/or 114.

Exemplary embodiments may thus create factored decision tables driven by a table engine. Smart, digital contracts are notoriously dangerous. Decision tables are significantly easier to verify and validate. However, decision tables may be large and perhaps cannot be placed on a blockchain. Exemplary embodiments may thus put smaller contractual components of the digital contract 20 on any blockchain (such as the private blockchain 28 or the public blockchain 84), validate the contractual components (perhaps via the cryptographic proof 88), incorporate the cryptographic proof 88 into a larger component of the digital contract 20, and then validate the larger component.

Exemplary embodiments thus may separate the blockchain data layer 42 from contractual execution. The data layer server 24 (generating the blockchain data layer 42) may thus accept inputs from the servers (such as the contract server 36) executing any component of the digital contract 20. The servers (such as the contract server 36) executing any component of the digital contract 20 may also send data to the data layer server 24. The data layer server 24 may thus execute the decision table. The contract server 36 may additionally or alternatively execute the decision table when processing the digital contract 20. The decision table may thus be sent and/or received as an input/output. Even a virtual machine may access and use the decision table.

Exemplary embodiments thus establish the digital contract 20 as an identity. Because only the contract identifier 32 is needed, the digital contract 20 may be separated into various smaller components (such as the software modules 262 and/or layers 266, as above explained). Each software module 262 and/or layer 266 may have its own contract identifier 32. The digital contract 20 is thus transformed to an identity, which may be easily updated after software bugs are found and consensus is documented by stake holders. Exemplary embodiments thus provide an ability to repair bugs and to claw back or backup spurious results. The separation of the blockchain data layer data 72 thus isolates and protects the data records 44.

Exemplary embodiments thus describe a novel smart contract architecture to be run outside, external, or off-blockchains. The digital contract 20, and/or its contractual components, may each have its own digital identity defined within the blockchain data layer data 72. The contract identifier 32, in other words, may uniquely identity a version, thus allowing stakeholders (using their digital identities) to approve updates to respond to changes in business, to approve bug resolution, and to accommodate new participants in the digital contract 20, without having to dissolve the original version and without redeploying or requiring the blockchain to be reversed and modified to avoid an incorrect, improper, or unacceptable result by perhaps a majority of users. As the reader may understand, modifying a blockchain to resolve an issue involves many more stakeholders with an interest in the blockchain but having no interest in the smart contract. This has been a problem with conventional blockchain architectures.

Exemplary embodiments may separate the blockchain data layer data 72 from the rules engine architecture that executes the digital contract 20. Exemplary embodiments allow for light weight, secure, and extendible digital identity. Digital identity can be applied to implementation of the virtual machine that runs the digital contract 20. Digital identity can be applied to any smart contract and/or to any stakeholder(s). Stakeholders may thus be paid (perhaps via the cryptocurrencies 80, 82, and/or 114) for who they are, such as to a particular blockchain address, meaning if a stakeholder's address is compromised, then the stakeholder can update the address without having to modify the digital contract 20. This virtual address modification is similar to the real world for when a business moves from one geographic location to another, the business does not invalidate all its contracts. In the real world, the business merely informs parties of its new physical address and contact information. Exemplary embodiments allow management of the digital contract 20 in a flexible fashion, similar to management of contracts in the real world, but with blockchain security and data integrity of the actual digital contract 20, automation of provisions in the digital contract 20, and cryptopayment support.

Exemplary embodiments are also scalable. Layers or modules can be created in the digital contract 20 and/or in the private blockchain 28 or the public blockchain 84 for improved flexibility and management via hardware computers. The data records 44 in the blockchain data layer 24 are safely separated from the servers that execute the digital contract 20. Contract servers 36 (e.g., the contractual application layer) may perform a decentralized evaluation of digital contract 20, using the proper virtual machine and proper rules, and manage interests of majority or all stakeholders. Values of cryptotokens may be defined and/or distributed, but allowing greater scalability.

Exemplary embodiments provide numerous advantages. Because the contractual execution is separate from the blockchain data layer data 72, the results of the digital contract 20 are securely documented and may be exported to other contractual components or to other digital contracts. Exemplary embodiments may thus implement and offer multiple modules 262, layers 266, or instances of different contractual components that can exchange inputs and outputs to build a networking effect between different layers, modules, and smart contracts. A first server running a first application layer (and perhaps executing a first smart contract) can be entirely separate a second server running a second smart contract and a third server running a third smart contract. The blockchain data layer 42, though, exchanges and thus documents their respective inputs and outputs. The various servers may thus manage and/or share the same cryptotokens, or different entity tokens may be exchanged within each layer. Regardless, exemplary embodiments may coordinate exchanges of value for services performed. Great flexibility in defining the value of cryptotokens and the value into and out of smart contract.

Exemplary embodiments may also have jurisdictional advantages. Particular servers may be specific to particular jurisdictions and/or particular smart contracts. For example, some application layers may cross jurisdictional servers with different compliances. As another example, suppose that one application layer may require qualified investors with full know your client (or "KYC") compliance. Another application layer may be anonymous and/or allow all corners. Even if the blockchain data layer 42 has a small set of users/clients, large smart contracts may be managed, implemented, and/or documented.

The digital contract 20 may utilize conventional programming languages and/or decision tables. In particular, some programming languages and decision tables, like purely functional languages, may mathematically prove contractual algorithms. These mathematical proofs may yield much more secure smart contracts than conventional languages that run on today's blockchains. Previously, smart contracts were often too big in size to execute on a blockchain. The separate blockchain data layer 42, though, allows scaling and implementing smart contracts "off chain." The proof 88 of the digital contract 20, for example, is a hash value, perhaps in association with the contract identifier 32 and/or the chain identifier 174, as documented by the data records 44 in the blockchain data layer 42. The hash value of the proof 88, in other words, is a very small value (in relation to the size of the smart contract). The digital contract 20 may thus be provided to any or all parties and/or any or all stakeholders for validation of its terms, obligations, and performance. The cryptographic proof 88 thus verifies execution without stuffing large amounts of data onto the private blockchain 28 or the public blockchain 84.

Exemplary embodiments may use decision tables for smart contracts. Decision tables are well understood, perform well, and are verifiable relative to brute-force code writing. Simply put, custom programming code introduces many variables and software bugs are inevitable. Decision tables are also very amenable to domain-specific languages. As the reader may understand, domain-specific languages accept near-English statements as inputs and generate computer code as outputs. Subject matter experts may thus define the functionality of the digital contract 20, perhaps without relying on the skills of computer programmers (who may not fully understand the subject matter). Decision tables are thus approachable to subject matter experts and easily implemented. Decision tables may also be combined with other decision tables, which allows performance proven and validated functions may be incorporated into smart contracts for many objectives and outcomes. Decision tables may thus be mixed and matched as components to a composite digital contract 20, and a collection of decision tables representing the digital contract 20 may still be validated to ensure correct operation. Decision tables define much smaller numbers of programming paths through the software code representing the digital contract 20, which ensures that all contractual combinations may be enumerated and proper results can be expected for a range of values. On blockchains, though, decision tables may be big in size, so some decision tables may not be feasible as a smart contract on a conventional blockchain. But, because the blockchain data layer 74 is separate from the contract layer 26 executing the digital contract 20, the digital identity (e.g., the contract identifier 32) for the digital contract 20 (that allows the smart contract to exist off chain) provides the servers (each perhaps having its own identity) to certify execution of the digital contract 20. Exemplary embodiments may also define the mechanism for cryptotoken-based payments that incentivize the contract server 36 to perform the digital contract 20 and to verify and validate the digital contract 20. Component and composite performance may be tracked, recorded, and proved. For example, if a virtual machine runs the digital contract 20 (as above explained), execution in the virtual environment can be tracked. Virtual machines may often have software bugs that affect an interpretation of the decision tables. The virtual machine may thus have its own digital identity, as defined by the database 70 of contracts (as above explained). Different versions of the virtual machine and/or the decision table may thus be mapped within the database 70 of contracts, thus allowing redirection after software bugs have been resolved. The database 70 of contracts, in other words, may be updated with entries that point to different versions for different parties and/or to corrected or improved versions.

Digital identities extend to engines and decision tables. The database 70 of contracts may map or point to servers, domains, decision tables, and their respective versions. The digital contract 20 (and/or its components, as represented by their respective contract identifiers 28) ensures execution, regardless of the environment. Because the blockchain data layer 42 documents all this component processing, the data records 44 may prove (via the cryptographic proof 88) that the correct contractual component was used, the correct decision table(s) was/were used, the correct virtual machine was used, and the correct input or output data was used. Verification may driven from the contractual components, the data components, and the hardware components at the correct time for the correct time period.

Figure 39:
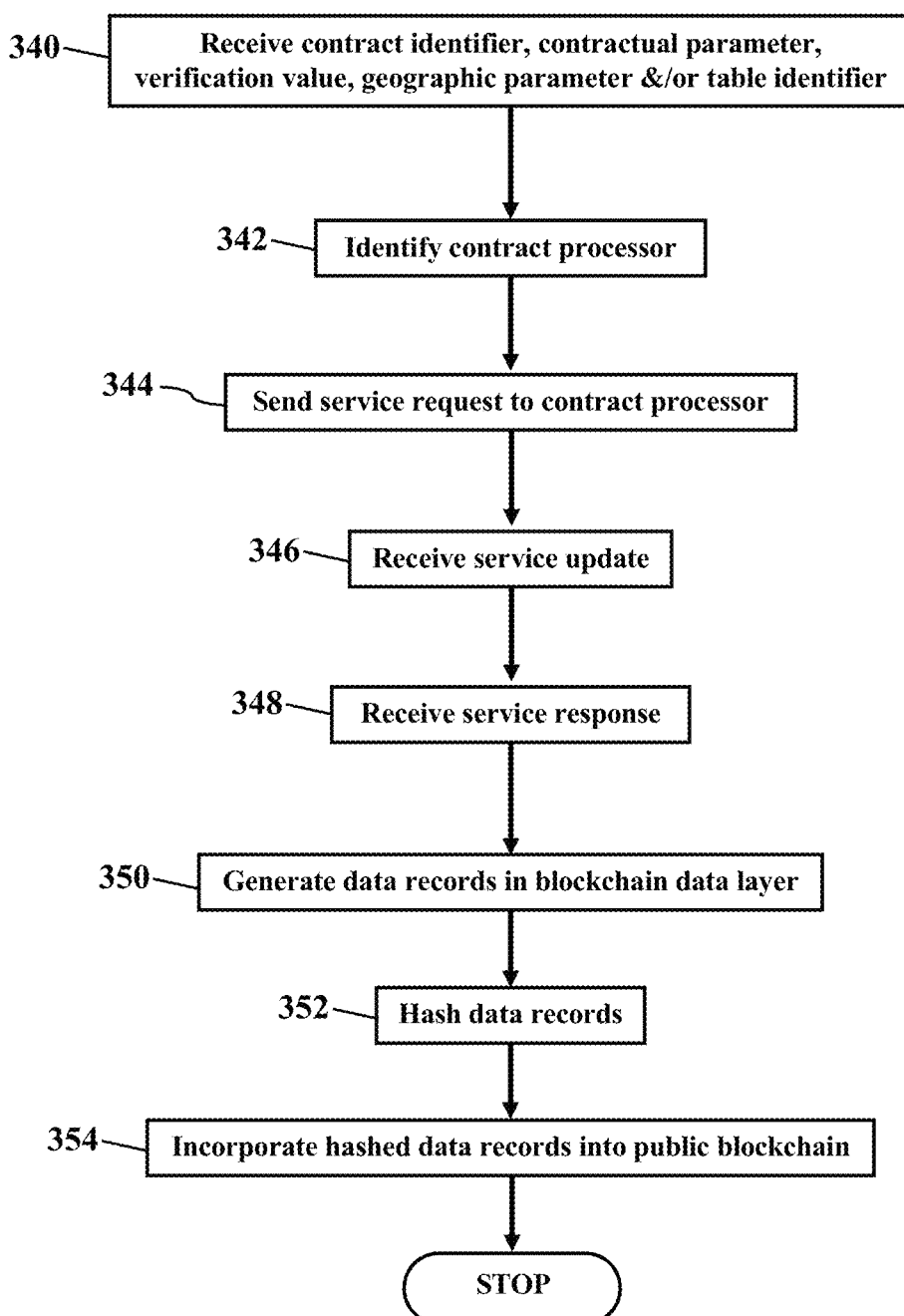
FIG. 39 is a flowchart illustrating a method or algorithm for processing of the digital contract 20, according to exemplary embodiments.

FIG. 39 is a flowchart illustrating a method or algorithm for processing of the digital contract 20, according to exemplary embodiments. The contract identifier 32, the contractual parameter 34, the verification value 52, the geographic parameter 320, and/or the table identifier 334 is/are received (Block 340). The network resource 232 is identified (Block 342), and the contract processor may be an IP address, URL, virtual machine, or other network destination representing a vendor, contractor, server, or service that executes the decision table 326 and/or the digital contract 20. The service request 38 is sent (Block 344), the service update 46 is received (Block 346), and the service response 40 is received (Block 348). The data records 44 in the blockchain data layer 42 are generated (Block 350), and the data records 44 describe the execution of the digital contract 20. The data records 44 may be hashed (Block 352) and incorporated into the public blockchain 84 (Block 354).

Figure 40:
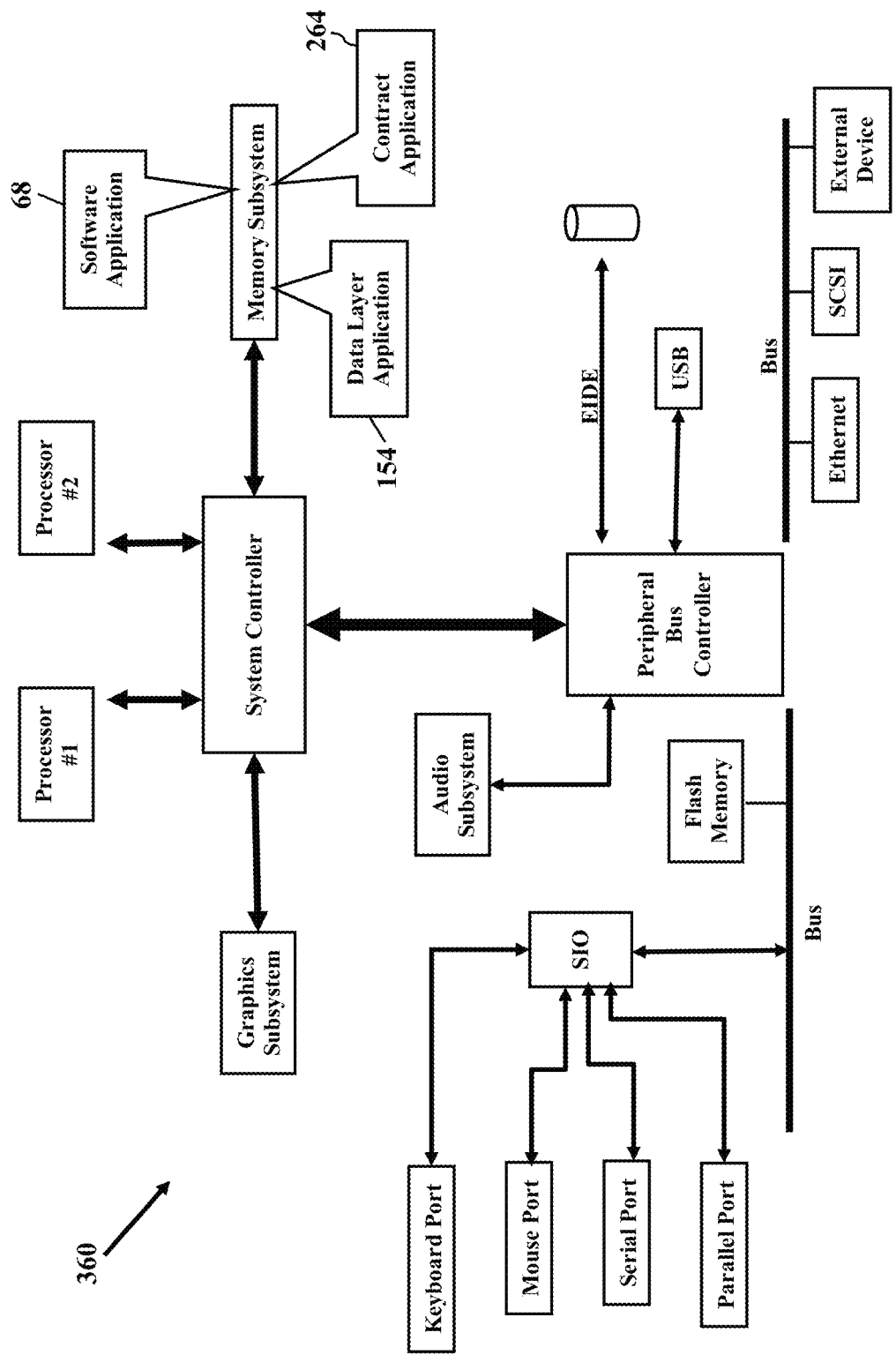
FIGS. 40-41 depict still more operating environments for additional aspects of the exemplary embodiments.

FIG. 40 is a schematic illustrating still more exemplary embodiments. FIG. 40 is a more detailed diagram illustrating a processor-controlled device 360. As earlier paragraphs explained, the entity's private software application 68, the data layer application 154, and/or the contract application 264 may partially or entirely operate in any mobile or stationary processor-controlled device. FIG. 40, then, illustrates the entity's private software application 68, the data layer application 154, and/or the contract application 264 stored in a memory subsystem of the processor-controlled device 360. One or more processors communicate with the memory subsystem and execute either, some, or all applications. Because the processor-controlled device 360 is well known to those of ordinary skill in the art, no further explanation is needed.

Figure 41:
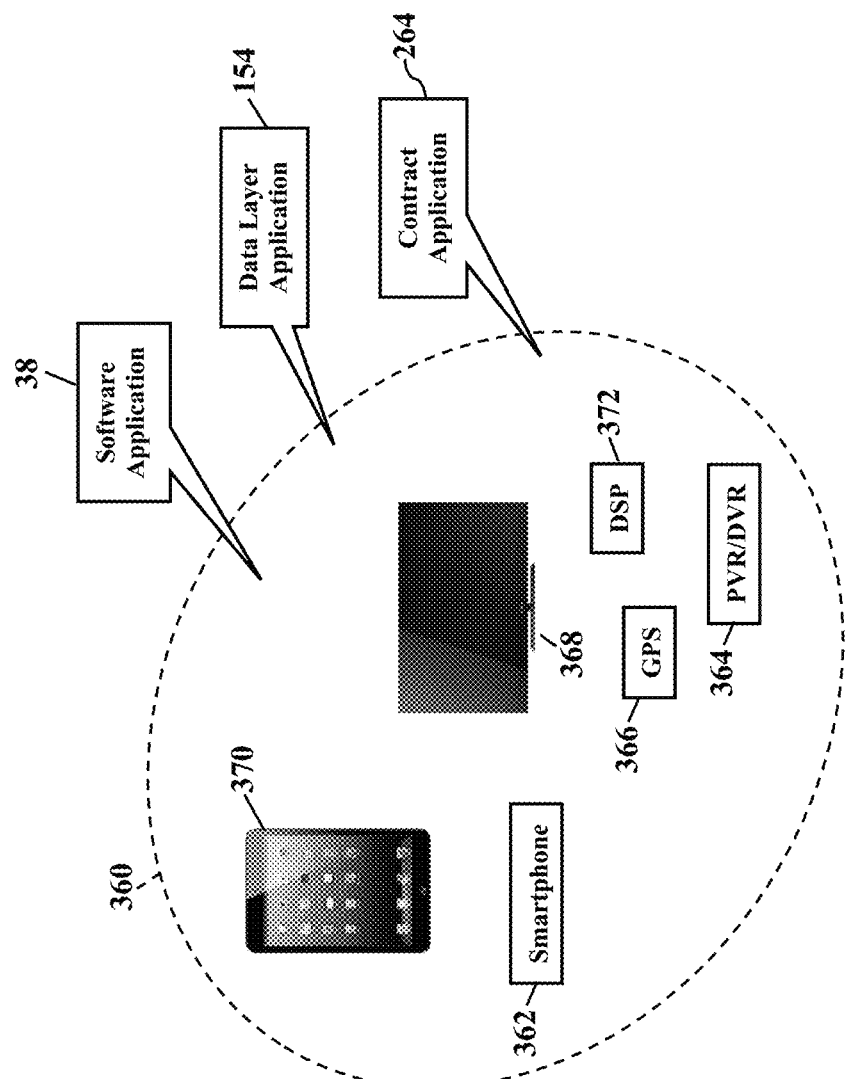

FIG. 41 depicts other possible operating environments for additional aspects of the exemplary embodiments. FIG. 41 illustrates the entity's private software application 68, the data layer application 154, and/or the contract application 264 operating within various other processor-controlled devices 360. FIG. 41, for example, illustrates that the entity's private software application 68, the data layer application 154, and/or the contract application 264 may entirely or partially operate within a smartphone 362, a personal/digital video recorder (PVR/DVR) 364, a Global Positioning System (GPS) device 366, an interactive television 368, a tablet computer 370, or any computer system, communications device, or processor-controlled device utilizing any of the processors above described and/or a digital signal processor (DP/DSP) 372. Moreover, the processor-controlled device 360 may also include wearable devices (such as watches), radios, vehicle electronics, clocks, printers, gateways, mobile/implantable medical devices, and other apparatuses and systems. Because the architecture and operating principles of the various devices 360 are well known, the hardware and software componentry of the various devices 360 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for execution of digital contracts, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method performed by a server that identifies a network resource executing a digital contract, the method comprising:
   identifying, by the server, a contract identifier specified by a blockchain, the contract identifier associated with the digital contract;
   identifying, by the server, a network address associated with the network resource by querying an electronic database that associates the contract identifier to the network resource;
   sending, by the server, a service request to the network address requesting an execution of the digital contract; and
   receiving a service result of the execution of the digital contract.

2. The method of claim 1, further comprising generating a data record in a blockchain data layer that describes the service request sent to the network address requesting the execution of the digital contract.

3. The method of claim 2, further comprising transacting a cryptocoinage in response to the generating of the data record in the blockchain data layer.

4. The method of claim 1, further comprising transacting a cryptocoinage in response to the sending of the service request.

5. The method of claim 1, further comprising generating a data record in a blockchain data layer that describes the service result.

6. The method of claim 1, further comprising transacting a cryptocoinage in response to the receiving of the service result.

7. A system that identifies a network resource executing a digital contract, comprising:
   a hardware processor; and
   a memory device storing instructions that when executed by the hardware processor perform operations, the operations comprising:
   identifying a contract identifier specified by a blockchain, the contract identifier associated with the digital contract;
   identifying a network address associated with the network resource by querying an electronic database having entries associating network addresses to contract identifiers including an entry of the entries that associates the contract identifier to the network address;
   sending a service request to the network address requesting an execution of the digital contract; and
   receiving a service result of the execution of the digital contract.

8. The system of claim 7, wherein the operations further comprise generating a data record in a blockchain data layer that describes the service request sent to the network address requesting the execution of the digital contract.

9. The system of claim 8, wherein the operations further comprise transacting a cryptocoinage in response to the generating of the data record in the blockchain data layer.

10. The system of claim 7, wherein the operations further comprise transacting a cryptocoinage in response to the sending of the service request.

11. The system of claim 7, wherein the operations further comprise generating a data record in a blockchain data layer that describes the service result.

12. The system of claim 7, wherein the operations further comprise transacting a cryptocoinage in response to the receiving of the service result.

13. A memory device storing instructions that when executed by a hardware processor perform operations, the operations comprising:
   identifying a contract identifier specified by a blockchain, the contract identifier associated with a digital contract;
   identifying a network address associated with a network resource by querying an electronic database for the contract identifier, the electronic database electronically associating network addresses to contract identifiers including the network address associated with the contract identifier;
   sending a service request to the network address that is electronically associated with the contract identifier that uniquely identifies the digital contract, the service request requesting an execution of the digital contract; and
   receiving a service result of the execution of the digital contract.

14. The memory device of claim 13, wherein the operations further comprise generating a data record in a blockchain data layer that describes the service request sent to the network address requesting the execution of the digital contract.

15. The memory device of claim 14, wherein the operations further comprise transacting a cryptocoinage in response to the generating of the data record in the blockchain data layer.

16. The memory device of claim 13, wherein the operations further comprise transacting a cryptocoinage in response to the sending of the service request.

17. The memory device of claim 13, wherein the operations further comprise generating a data record in a blockchain data layer that describes the service result.

* * * * *